United States Patent
Hiratsuka et al.

(10) Patent No.: US 10,318,715 B2
(45) Date of Patent: Jun. 11, 2019

(54) INFORMATION PROCESSING DEVICE, INFORMATION PROCESSING METHOD, PROGRAM, AND SERVER

(71) Applicant: Sony Corporation, Tokyo (JP)

(72) Inventors: Yosuke Hiratsuka, Tokyo (JP); Kazuya Yokoyama, Chiba (JP)

(73) Assignee: Sony Corporation, Tokyo (JP)

( * ) Notice: Subject to any disclaimer, the term of this patent is extended or adjusted under 35 U.S.C. 154(b) by 217 days.

(21) Appl. No.: 15/100,419

(22) PCT Filed: Nov. 25, 2014

(86) PCT No.: PCT/JP2014/081074
§ 371 (c)(1),
(2) Date: May 31, 2016

(87) PCT Pub. No.: WO2015/118751
PCT Pub. Date: Aug. 13, 2015

(65) Prior Publication Data
US 2016/0306951 A1 Oct. 20, 2016

(30) Foreign Application Priority Data

Feb. 6, 2014 (JP) ................................ 2014-021477

(51) Int. Cl.
*G06F 21/10* (2013.01)
*G06F 21/62* (2013.01)
(Continued)

(52) U.S. Cl.
CPC .............. *G06F 21/10* (2013.01); *G06F 21/44* (2013.01); *G06F 21/629* (2013.01); *G06F 21/64* (2013.01);
(Continued)

(58) Field of Classification Search
CPC ........ G06F 21/10; G06F 21/44; G06F 21/629; G06F 21/64; G06F 2221/2115; G06F 2221/2129; G06F 21/83; H04L 63/0428
See application file for complete search history.

(56) References Cited

U.S. PATENT DOCUMENTS 6,647,495 B1 * 11/2003 Takeuchi .............. G06F 21/126
705/57
8,844,026 B2 * 9/2014 Truskovsky ............ G06F 21/44
713/168
(Continued)

FOREIGN PATENT DOCUMENTS

JP 10-083310 A 3/1998
JP 2005-092275 A 4/2005
(Continued)

OTHER PUBLICATIONS

Gail L. Grant "Understanding Digital Signatures" 1998, McGraw-Hill, pp. 35-35 (Year: 1998).*
(Continued)

*Primary Examiner* — Catherine Thiaw
(74) *Attorney, Agent, or Firm* — Michael Best & Friedrich LLP

(57) ABSTRACT

An information processing device includes an acquisition unit configured to acquire developer identification information associated with an application program possessed by a user terminal, from the user terminal. A determination unit determines whether a developer of the application program indicated by the developer identification information is a developer who has made an advance request for authorization for use. A control unit controls execution of a function possessed by the information processing device, according to an instruction from the user terminal, when the developer of the application program indicated by the developer identification information is a developer who has made an
(Continued)

advance request for authorization for use, and a content processing unit acquires a content based on the execution of the function, and associates the acquired content with information of the developer on which the determination has been performed.

14 Claims, 31 Drawing Sheets

(51) Int. Cl.
| | |
|---|---|
| H04L 29/06 | (2006.01) |
| G06F 21/44 | (2013.01) |
| G06F 21/64 | (2013.01) |
| G06F 21/83 | (2013.01) |

(52) U.S. Cl.
CPC .......... *G06F 21/83* (2013.01); *H04L 63/0428* (2013.01); *H04L 63/08* (2013.01); *G06F 2221/2115* (2013.01); *G06F 2221/2129* (2013.01)

(56) References Cited

U.S. PATENT DOCUMENTS

| | | | |
|---|---|---|---|
| 9,276,934 B2* | 3/2016 | D'Argenio | H04L 63/10 |
| 2008/0155698 A1 | 6/2008 | Round | |
| 2011/0154130 A1* | 6/2011 | Helander | G06F 21/51 |
| | | | 714/48 |
| 2011/0225074 A1* | 9/2011 | Khosravy | G06Q 10/10 |
| | | | 705/34 |
| 2012/0008777 A1* | 1/2012 | Gurel | G06F 21/10 |
| | | | 380/255 |
| 2013/0033379 A1* | 2/2013 | Jentoft | H04N 7/185 |
| | | | 340/541 |
| 2013/0227424 A1* | 8/2013 | Hall | H04L 67/025 |
| | | | 715/740 |
| 2014/0035953 A1* | 2/2014 | DuBois | G06T 3/60 |
| | | | 345/659 |
| 2014/0208441 A1* | 7/2014 | Rantala | H04L 63/061 |
| | | | 726/29 |
| 2015/0022666 A1* | 1/2015 | Kay | H04L 67/025 |
| | | | 348/159 |
| 2015/0121082 A1* | 4/2015 | Carapelli | H04L 9/32 |
| | | | 713/176 |
| 2015/0227514 A1* | 8/2015 | Gillett | G06F 17/30011 |
| | | | 707/608 |

FOREIGN PATENT DOCUMENTS

| | | |
|---|---|---|
| JP | 2009-116865 A | 5/2009 |
| JP | 2012-098814 A | 5/2012 |

OTHER PUBLICATIONS

Cole, Eric et al., "Network Security Bible" Dec. 31, 2005, Wiley Publishing Inc., pp. 534-534—Part IV—Communications.
Extended European Search Report issued Apr. 12, 2017 for corresponding European Application No. 14881618.4.

* cited by examiner

INFORMATION PROCESSING DEVICE, INFORMATION PROCESSING METHOD, PROGRAM, AND SERVER

TECHNICAL FIELD

The present disclosure relates to information processing devices, information processing methods, programs, and servers.

BACKGROUND ART

The function of operating a device such as a digital camera, a television device, etc. or an information processing device such as a personal computer (PC) etc. using a user terminal such as a smartphone has in recent years been provided.

The function of operating an information processing device using a user terminal is, for example, implemented by installing a dedicated application program (hereinafter simply referred to as an "application") in the user terminal.

An application programming interface (API) which is a program for controlling an operation of an information processing device may be provided to general developers in order to allow them to develop an application which controls the operation of the information processing device.

CITATION LIST

Patent Literature

Patent Literature 1: JP H10-83310A

SUMMARY OF INVENTION

Technical Problem

In some cases, it is desirable that the API thus provided should be published only to particularly licensed developers or developers who pay fees for the use of the API. Therefore, there has been a demand for a scheme which can limit the use of an API, i.e., the use of a function corresponding to the API, depending on the developer.

Meanwhile, if an application produced by a developer who is not authorized to use an API may have information indicating a developer (hereinafter also referred to as a "developer identification information") in which the developer pretends to be another developer who is authorized to use the API, the application can use, without authorization, the API which the developer is not authorized to use.

Under the above circumstances, the present disclosure proposes a novel and improved information processing device, information processing method, program, and server which can limit the use of a function, depending on developers, and deter the unauthorized use of the function.

Solution to Problem

According to the present disclosure, provided is an information processing device including an acquisition unit configured to acquire developer identification information associated with an application program possessed by a user terminal, from the user terminal, a determination unit configured to determine whether or not a developer of the application program indicated by the developer identification information is a developer who has made an advance request for authorization for use, a control unit configured to control execution of a function possessed by the information processing device, according to an instruction from the user terminal, when the developer of the application program indicated by the developer identification information is a developer who has made an advance request for authorization for use, and a content processing unit configured to acquire a content based on the execution of the function, and associate the acquired content with information of the developer on which the determination has been performed.

Also, according to the present disclosure, provided is an information processing method including acquiring developer identification information associated with an application program possessed by a user terminal, from the user terminal, determining whether or not a developer of the application program indicated by the developer identification information is a developer who has made an advance request for authorization for use, causing a processor to control execution of a function possessed by the information processing device, according to an instruction from the user terminal, when the developer of the application program indicated by the developer identification information is a developer who has made an advance request for authorization for use, and acquiring a content based on the execution of the function, and associating the acquired content with information of the developer on which the determination has been performed.

Provided is a program for causing a computer to execute acquiring developer identification information associated with an application program possessed by a user terminal, from the user terminal, determining whether or not a developer of the application program indicated by the developer identification information is a developer who has made an advance request for authorization for use, controlling execution of a function possessed by the information processing device, according to an instruction from the user terminal, when the developer of the application program indicated by the developer identification information is a developer who has made an advance request for authorization for use, and acquiring a content based on the execution of the function, and associating the acquired content with information of the developer on which the determination has been performed.

Also, according to the present disclosure, provided is a server including a content acquisition unit configured to acquire, from a terminal, a content associated with information of a developer associated with an application program involved in acquisition of the content, and encrypted information obtained by encrypting information of the developer corresponding to a developer that it has been determined is a developer who has made an advance request for authorization for use, and a determination unit configured to determine whether or not the information of the developer associated with the content has been altered, by comparing the information of the developer associated with the content with the information of the developer indicated by the encrypted information.

Advantageous Effects of Invention

As described above, according to the present disclosure, an information processing device, information processing method, program, and server are provided which can limit the use of a function, depending on developers, and deter the unauthorized use of the function.

Note that the effects described above are not necessarily limited, and along with or instead of the effects, any effect

DESCRIPTION OF EMBODIMENT(S)

Figure 1:
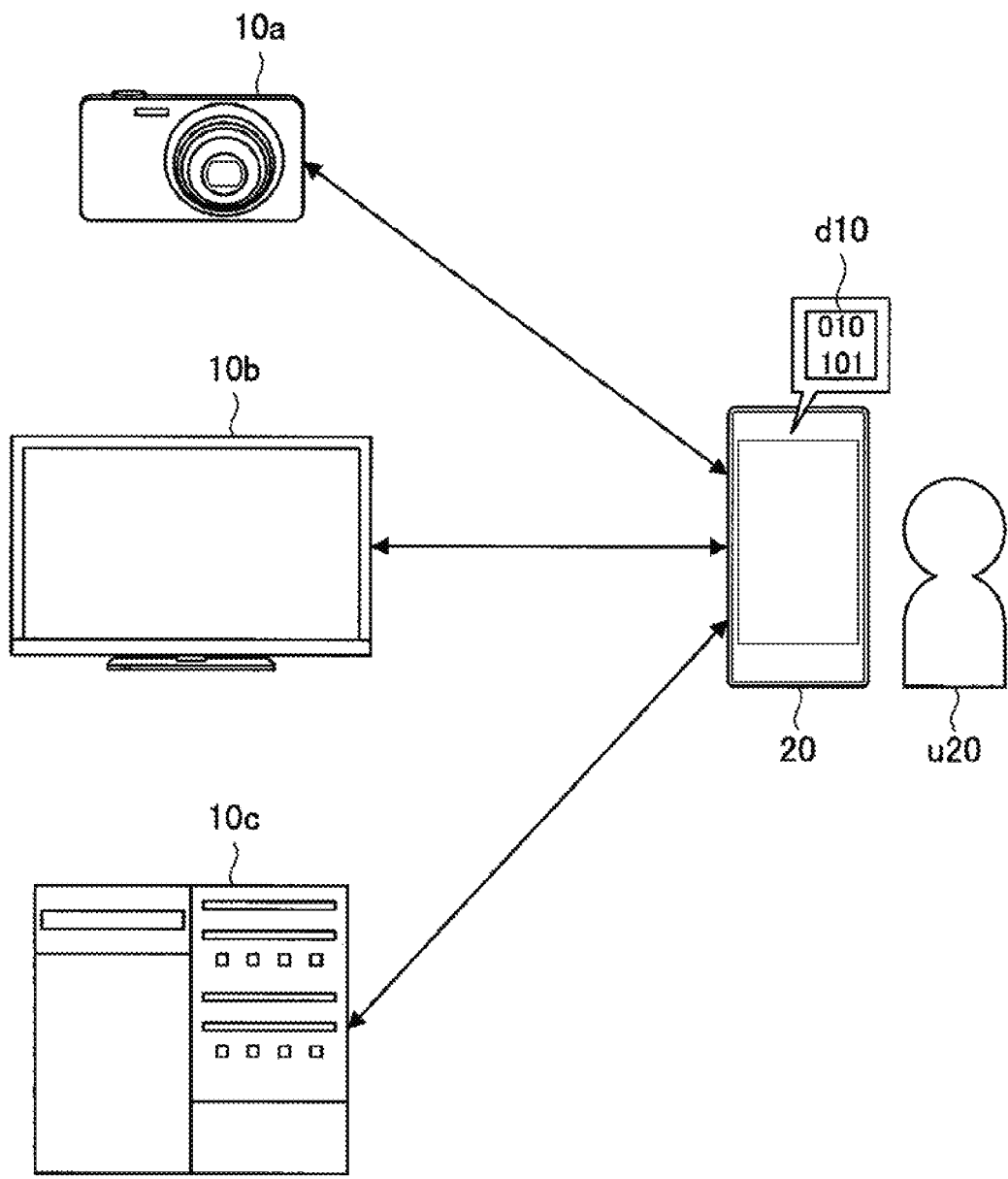
FIG. 1 is a diagram for describing a field to which an information processing system according to an embodiment of the present disclosure can be applied.

Hereinafter, (a) preferred embodiment(s) of the present disclosure will be described in detail with reference to the appended drawings. In this specification and the drawings, elements that have substantially the same function and structure are denoted with the same reference signs, and repeated explanation is omitted.

Note that description will be provided in the following order.

1. Brief Description of Problems
2. Schematic Configuration
2.1. System Configuration
2.2. Configurations of Information Processing Device and User Terminal
3. Control of Access to API
3.1. Overview
3.2. Configuration of Management Server
3.3. Configurations of Information Processing Device and User Terminal
3.4. Processes
3.3.1. Operation Involved in Making Advance Request for Authorization for Use
3.3.2. Operation Involved in Control of Access to API
3.5. Processes of Information Processing Device and User Terminal
4. Acquisition of Contents
5. Examples
5.1. Example 1: a first example in which developer information is recorded as attribute information of a content
5.2. Example 2: a second example in which developer information is recorded as attribute information of a content
5.3. Example 3: an example in which developer information is superimposed on a preview image 5.4. Example 4: an example in which developer information is superimposed on real image 5.5. Example 5: an example in which developer information is recorded as history information 5.6. Example 6: an example in which developer information recorded as history information is displayed 5.7. Example 7: an example in which a plurality of applications are operated 6. Hardware Configuration 7. Conclusion

1. BRIEF DESCRIPTION OF PROBLEMS

Firstly, problems which are overcome by an information processing system according to an embodiment of the present disclosure will be described with reference to FIG. 1. FIG. 1 is a diagram for describing a field to which the information processing system of the embodiment of the present disclosure can be applied.

As shown in FIG. 1, the function of operating a device, such as a digital camera 10a, a television device 10b, etc., or an information processing device 10c, such as a personal computer (PC) etc., using a user terminal 20, such as a smartphone, has in recent years been provided. Note that, in the description that follows, the digital camera 10a, the television device 10b, and the information processing device 10c may be collectively referred to as "information processing devices 10."

The technique of operating the information processing devices 10 using the user terminal 20 is, for example, implemented by installing a dedicated application d10 in the user terminal 20, and controlling an operation of the information processing devices 10 via the application d10.

An API for controlling operations of the information processing devices 10 may be provided to general developers to allow them to develop the application d10 which controls the operation of the information processing devices 10.

Of APIs provided as described above, there may be a variety of APIs including an API for controlling a basic operation, an API for allowing for a fine control, an API for achieving an additional function, etc. Of these APIs, some APIs may be made public to general developers, while some other APIs may be made available only to particularly licensed developers or developers who pay fees for the use of the APIs. Therefore, there has been a demand for a scheme of changing the publishing range of APIs, i.e., a limitation on the use of functions provided by the information processing devices 10, depending on developers.

However, if an application produced by a developer who is not authorized to use APIs may have identification information indicating a developer (hereinafter also referred to as a "developer identification information") in which the developer pretends to be another developer who is authorized to use the APIs, the application can use, without authorization, the APIs which the developer is not authorized to use. Therefore, there has also been a demand for a technology of deterring the unauthorized use of APIs by a developer who pretends to be another developer who is authorized.

An example technique of deterring the unauthorized use of APIs is to encrypt information exchanged between the user terminal 20 and the information processing devices 10 using a key exchange scheme, thereby reducing or preventing eavesdropping on a communication channel. However, an application downloaded to the user terminal 20, such as a smartphone, is likely to be disassembled. The same applies to key information which is stored in the user terminal 20 in order to encrypt information. If the key information is disassembled and published without authorization, protection of information based on encryption may be meaningless.

Alternatively, for example, control of access to APIs may be achieved by managing authorization information for each developer at an external server etc. instead of the information processing devices 10 or the user terminal 20, and allowing the information processing devices 10 to reference the authorization information at the server. However, some information processing devices 10, such as a digital camera etc., do not have an interface for accessing an external network, such as the Internet etc. Thus, it may be difficult to access the external server all the time. It may also be difficult for the user terminal 20 to access the external server all the time. For example, some user terminals 20 cannot access an external network when they are communicating directly with the information processing devices 10, such as a digital camera etc., based on a technology, such as wireless fidelity (Wi-Fi) (registered trademark).

For some information processing devices 10 which are not supposed to access an external network, internal information is updated by, for example, firmware update etc., and therefore, it may be difficult to update the internal information as appropriate. Therefore, for example, the technique of storing, at the information processing devices 10, information for determining authorization to APIs with respect to a particular developer, may not be practical.

Alternatively, a certificate (e.g., a digital certificate) which is given to an application itself to indicate authenticity, and the authenticity of authorization to access APIs may be determined based on the certificate. However, when a certificate attached to an application operated in the user terminal 20 is checked at the information processing devices 10, it is necessary to transmit the application itself to the information processing devices 10, leading to an increase in the effort for launching the application.

Under these circumstances, there has been a demand for a scheme of, even when information in the user terminal 20 is referenced, deterring the unauthorized use of APIs by a developer who pretends to be another developer who is authorized, irrespective of whether or not the information processing devices 10 can be connected to an external network.

Therefore, the present disclosure proposes an information processing system which can limit the use of APIs, depending on developers, and deter the unauthorized use of APIs by a developer who pretends to be another developer who is authorized.

2. SCHEMATIC CONFIGURATION

Next, a schematic configuration of the information processing system of this embodiment will be described. The information processing system of this embodiment provides a scheme for publishing APIs 50 involved in the control of operations of an information processing device 10 to a developer u50 in order to enable the developer u50 to develop an application for controlling an operation of the information processing device 10.

2.1. System Configuration

Figure 2:
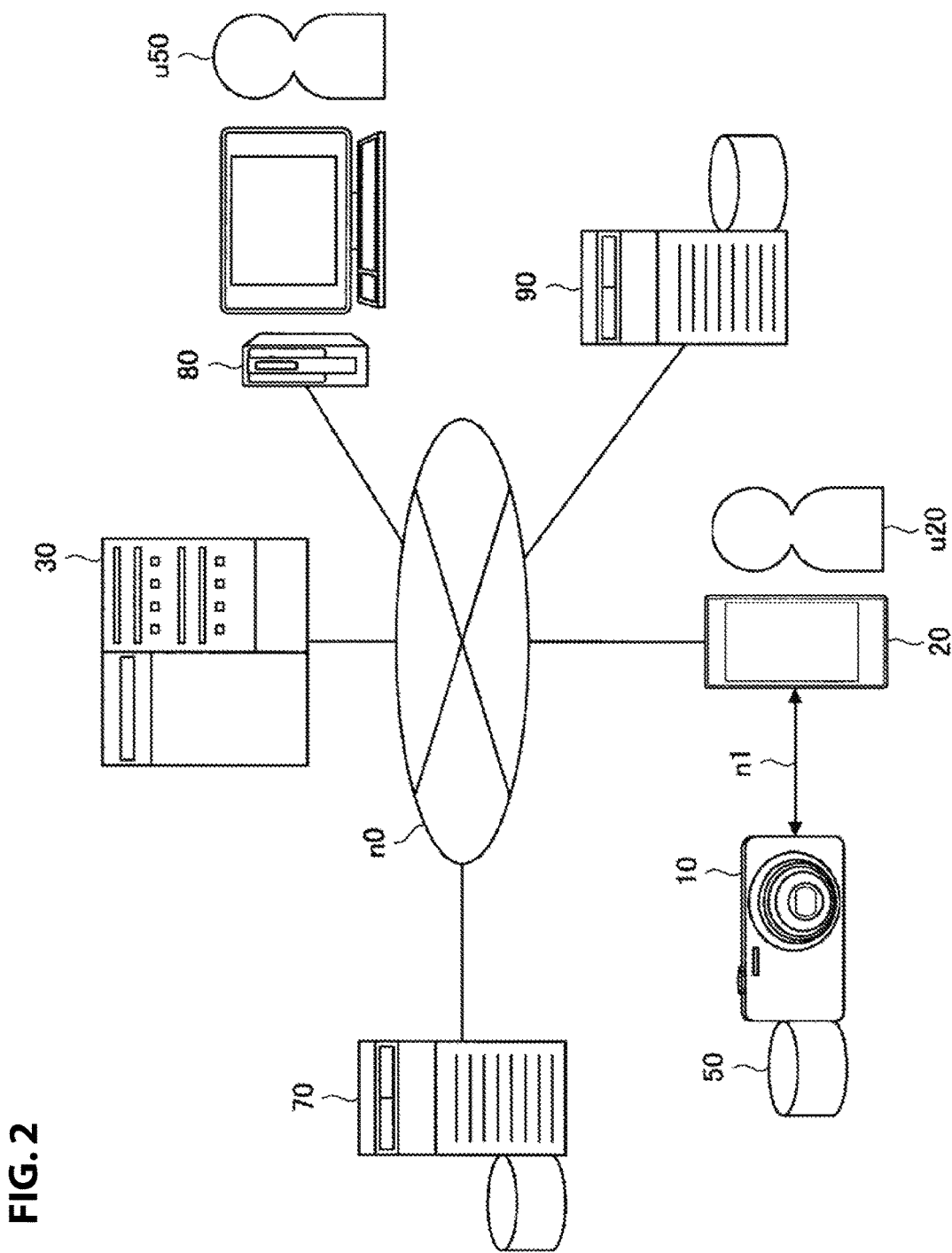
FIG. 2 is a diagram schematically showing an example system configuration of the information processing system of the embodiment.

Firstly, a schematic configuration of the information processing system of this embodiment will be described with reference to FIG. 2. FIG. 2 is a diagram schematically showing an example system configuration of the information processing system of this embodiment.

As shown in FIG. 2, the information processing system of this embodiment includes an information processing device 10, a user terminal 20, a management server 30, a content management server 70, a developer terminal 80, and an application providing server 90.

The developer terminal 80 illustrates a terminal at which the developer u50 develops an application. Note that an application developed by the developer u50 may hereinafter be referred to as an "application d10."

The management server 30 issues control information for controlling (permitting) access to an API whose use is limited, of the APIs 50, to the pre-registered developer u50. The developer u50 associates the control information issued by the management server 30 with a developed application d10 and thereby enables the information processing device 10 to execute the API whose use is limited, as a process of the application d10.

The application providing server 90 simulatively illustrates a server for providing the application d10 developed by the developer u50 to a general user u20 with or without payment. A specific example of the application providing server 90 is a server which provides a delivery channel, such as an application store. For example, the user terminal 20 acquires the application d10 published at the application providing server 90 by downloading it from the application providing server 90.

Note that the technique of providing the application d10 via the application providing server 90 is only for illustrative purposes. The information processing system of this embodiment may have any configuration that allows the user terminal 20 to acquire the application d10 developed by the developer u50. For example, the application d10 may be stored in a portable medium etc., which is provided to the user u20. In this case, the application d10 is stored into the user terminal 20 by the user u20 installing the application d10 stored in the portable medium into the user u20.

The content management server 70 simulatively illustrates a server for managing and storing contents, such as image data etc., acquired by the information processing device 10 or the like. For example, the content management server 70 provides a storage area for storing contents acquired by the information processing device 10, or provides a service for allowing a plurality of users to share the stored contents. As a specific example, the content management server 70 may be configured as a server for providing a service for allowing a plurality of users to share information, such as a social networking service (SNS) etc.

The management server 30, the content management server 70, the developer terminal 80, the application providing server 90, and the user terminal 20 are connected together via a network n0. The network n0 is, for example, configured by the Internet, a dedicated line, a local area network LAN), a wide area network (WAN), etc. Note that the network n0 may be in any form in which different devices are connected together via the network.

Some of the management server 30, the developer terminal 80, the application providing server 90, and the user terminal 20 may be connected together via a network which is physically or logically different from another network for the other devices. As a specific example, the connection between the management server 30 and the developer terminal 80 may be separated from an external network, such as the Internet, by using the virtual private network (VPN) technology.

The information processing device 10 illustrates a control object whose operation is controlled by the application d10 being executed at the user terminal 20. The information processing device 10 and the user terminal 20 are connected together via a network n1. The network n1 is, for example, a wireless communication channel in direct communication between devices, such as Wi-Fi. Although, in the description that follows, the network n1 is described as a wireless communication channel in direct communication between the information processing device 10 and the user terminal 20, the network may be in any form that allows communication to be established between the information processing device 10 and the user terminal 20.

The information processing device 10 stores APIs 50 for controlling operations thereof, and executes a corresponding program (API) of the APIs 50 according to an instruction from the user terminal 20 which is based on execution of the application d10.

2.2. Configurations of Information Processing Device and User Terminal

Figure 3:
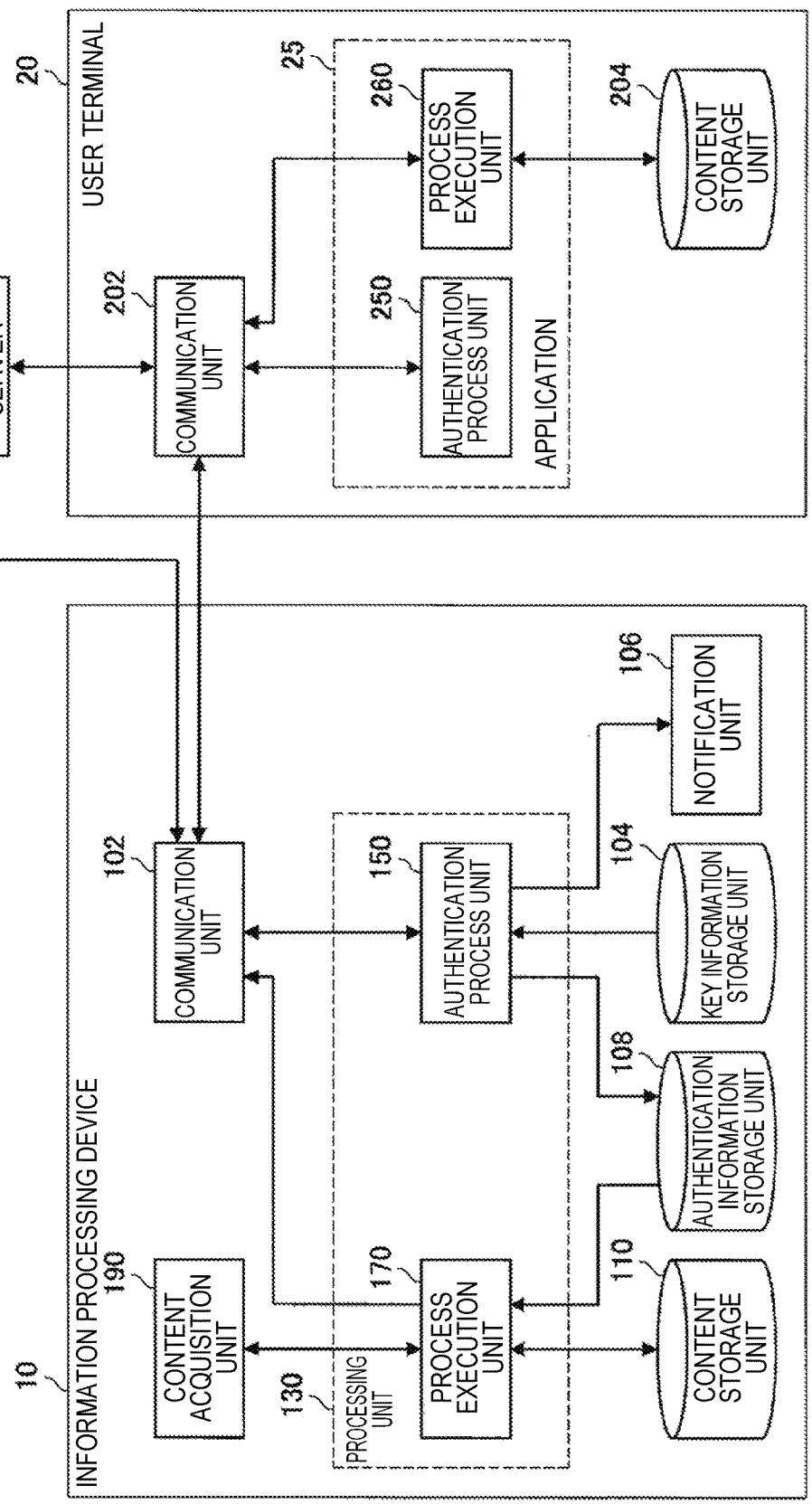
FIG. 3 is a block diagram showing an example of schematic functional configurations of an information processing device and a user terminal according to the embodiment.

Next, schematic functional configurations of the information processing device 10 and the user terminal 20 of this embodiment will be described with reference to FIG. 3. FIG. 3 is a block diagram showing an example of schematic functional configurations of the information processing device 10 and the user terminal 20 of this embodiment.

Firstly, the user terminal 20 will be described. As shown in FIG. 3, the user terminal 20 includes a communication unit 202 and a content storage unit 204. An application 25 is installed in the user terminal 20. Note that the application 25 schematically illustrates a function which is achieved by executing the above application d10 for controlling an operation of the information processing device 10. The application 25 contains an authentication process unit 250 and a process execution unit 260.

The communication unit 202 is an interface for communicating with the information processing device 10. The communication unit 202 may be for example, a device for establishing wireless communication, such as Wi-Fi etc., between the user terminal 20 and the information processing device 10. Note that the communication unit 202 may be in any form that allows any communication including wireless communication to be established between the user terminal 20 and the information processing device 10. The user terminal 20 exchanges data with the information processing device 10 via the communication unit 202. Note that, in the description that follows, when each component of the user terminal 20 exchanges data with components of the information processing device 10, data is exchanged via the communication unit 202 even when not explicitly recited.

Also, the communication unit 202 may be configured to be capable of communicating with the content management server 70. In this case, the communication unit 202 may be a device which establishes communication between the user terminal 20 and the content management server 70 via a communication channel such as the Internet. Although, in the example shown in FIG. 3, the communication unit 202 is assumed to be capable of communicating with both the information processing device 10 and the content management server 70 for ease of understanding, the present invention is not necessarily limited to this configuration. For example, of course, different devices for establishing communication may be provided for different cases, i.e., the case where communication with the information processing device 10 is established and the case where communication with the content management server 70 is established.

The authentication process unit 250 is a schematic illustrative configuration for making a request for access to an API whose use is limited, to the information processing device 10. Note that the authentication process unit 250 will be described in detail in "3. Control of Access to API" below.

The process execution unit 260 is a schematic illustrative configuration for controlling operations of the information processing device 10 by executing processes specified in the installed application 25. If the authentication process unit 250 makes an advance request for access to an API whose use is limited, the process execution unit 260 can access the API and controls operations of the information processing device 10 as each process specified in the application 25.

Note that the operations of the information processing device 10 which are achieved by the process execution unit 260 accessing APIs as processes specified in the application 25 are not necessarily limited to acquisition of a content.

For example, when the information processing device 10 configured as a camera is controlled to capture an image, the process execution unit 260 may access an API to perform control involved in image capture (i.e., acquisition of a content), such as exposure conditions, white balance, exposure sensitivity, etc. Also, as another example, the process execution unit 260 may access an API to cause the information processing device 10 to notify the process execution unit 260 of management information, such as a list of APIs supported by the information processing device 10, etc. Note that, in the description that follows, in the case of the wording "acquire a content in response to access to an API," the API is not limited to a function directly indicating acquisition of a content, and is assumed to include functions executed in a series of processes involved in acquisition of a content, as in the above example.

The process execution unit 260 may also control an operation of the information processing device 10 so that the information processing device 10 acquires a content, and may acquire the acquired content from the information processing device 10 via the network n1. In this case, the process execution unit 260 may store the acquired content in the content storage unit 204.

The content storage unit 204 is a storage unit for storing acquired contents. The content storage unit 204 may be configured as a storage device storage) provided in the user terminal 20. Also, as another example, the content storage unit 204 may be configured as a portable medium which is removably attached to the user terminal 20.

Note that the process execution unit 260 may be configured to be capable of transmitting (transferring) a content stored in the content storage unit 204 to the content management server 70 via the communication unit 202. Also, other applications installed in the user terminal 20 may be used instead of the application 25 to transmit (transfer) a content stored in the content storage unit 204 to the content management server 70.

Next, the information processing device 10 will be described. As shown in FIG. 3, the information processing device 10 includes a communication unit 102, a processing unit 130, a content acquisition unit 190, a key information storage unit 104, a notification unit 106, an identification information storage unit 108, and a content storage unit 110. Also, the processing unit 130 includes an authentication process unit 150 and a process execution unit 170.

The communication unit 102 is an interface for communicating with the user terminal 20. Note that the configuration of the communication unit 102 is similar to that of the communication unit 202 described above and therefore will not be described in detail. Also, in the description that follows, when the components of the information processing device 10 transmit and receive data to and from the components of the user terminal 20, the data transmission and reception are assumed to be mediated by the communication unit 102 even when not explicitly described.

The communication unit 102 may also be configured to be capable of communicating with the content management server 70. Even in this case, the configuration of the communication unit 102 may be similar to that of the communication unit 202 described above. Specifically, although, in the example shown in FIG. 3, the communication unit 102 is assumed to be capable of communicating with both the user terminal 20 and the content management server 70 for ease of understanding, the present invention is not necessarily limited to this configuration.

The content acquisition unit 190 is configured to acquire various contents according to an instruction from the process execution unit 170 described below. The content acquisition unit 190 outputs an acquired content to the process execution unit 170.

Note that specific examples of the contents acquired by the content acquisition unit 190 include image data, such as still images and moving images. When image data is acquired as a content, the content acquisition unit 190 may include, for example, an imaging element capable of capturing an image, or a device (e.g., a camera) including the imaging element.

Also, as another example, the content acquisition unit 190 may acquire audio data as a content. When audio data is thus acquired as a content, the content acquisition unit 190 may include, for example, a device capable of picking up sounds, such as a microphone.

Note that the content examples described above are only for illustrative purposes, and do not limit the type of contents acquired by the content acquisition unit 190, or the method of acquiring the contents. Also, of course, the configuration of the content acquisition unit 190 may vary depending on the type of acquired contents or the method of acquiring the contents.

The notification unit 106 is configured to notify the use re (i.e., the user u20) of the information processing device 10 of information. For example, the notification unit 106 notifies the user u20 of notification information specified by the authentication process unit 150 described above.

Note that specific examples of the notification information of which the user u20 is notified by the notification unit 106 include text information and image information. When the user u20 is notified of text information or image information, the notification unit 106 may include, for example, a display unit capable of displaying the text information or image information, or a device (e.g., a display) including the display unit.

Also, as another example, the notification unit 106 may notify the user u20 of audio information as notification information. When the user u20 is thus notified of audio information, the notification unit 106 may include, for example, a device capable of outputting audio, such as a loudspeaker.

The authentication process unit 150 determines whether or not the developer of the application 25 installed in the user terminal 20 is a developer who has made an advance request for authorization for use, based on key information stored in the key information storage unit 104. Thereafter, the authentication process unit 150 limits or permits access from the application 25 to an API whose use is limited, depending on the determination result.

The key information storage unit 104 previously stores key information for determining whether or not the developer of the application 25 is a developer who has made an advance request for authorization for use. Note that the process of the authentication process unit 150 of determining whether or not the developer of the application 25 is a developer who has made an advance request for authorization for use, based on the key information stored in the key information storage unit 104, will be described in detail in "3. Control of Access to API" below.

The identification information storage unit 108 is a storage unit for storing identification information for identifying a developer that the authentication process unit 150 determines has made an advance request for authorization for use.

The content storage unit 110 is, for example, a storage unit for storing contents acquired by the content acquisition unit 190 or information related to the contents (e.g., history information involved in acquisition of contents). The content storage unit 110 may be configured as a storage device (storage) provided in the information processing device 10. Also, as another example, the content storage unit 110 may be configured as a portable medium which is removably attached to the information processing device 10.

Note that the components of the information processing device 10, i.e., the communication unit 102, the processing unit 130, the content acquisition unit 190, the key information storage unit 104, the notification unit 106, the identification information storage unit 108, and the content storage unit 110 may include a circuit for executing various calculation processes. These components may be implemented by, for example, a device such as an integrated circuit (IC) including such a circuit, or the like, or a portion of the components may be implemented by another device.

3. CONTROL OF ACCESS TO API

3.1. Overview

In the information processing system of this embodiment, the information processing device 10 controls access to each of the APIs 50 from the application d10, based on the status of the developer u50's request for authorization to use the APIs 50 for control of operations thereof.

Figure 4:
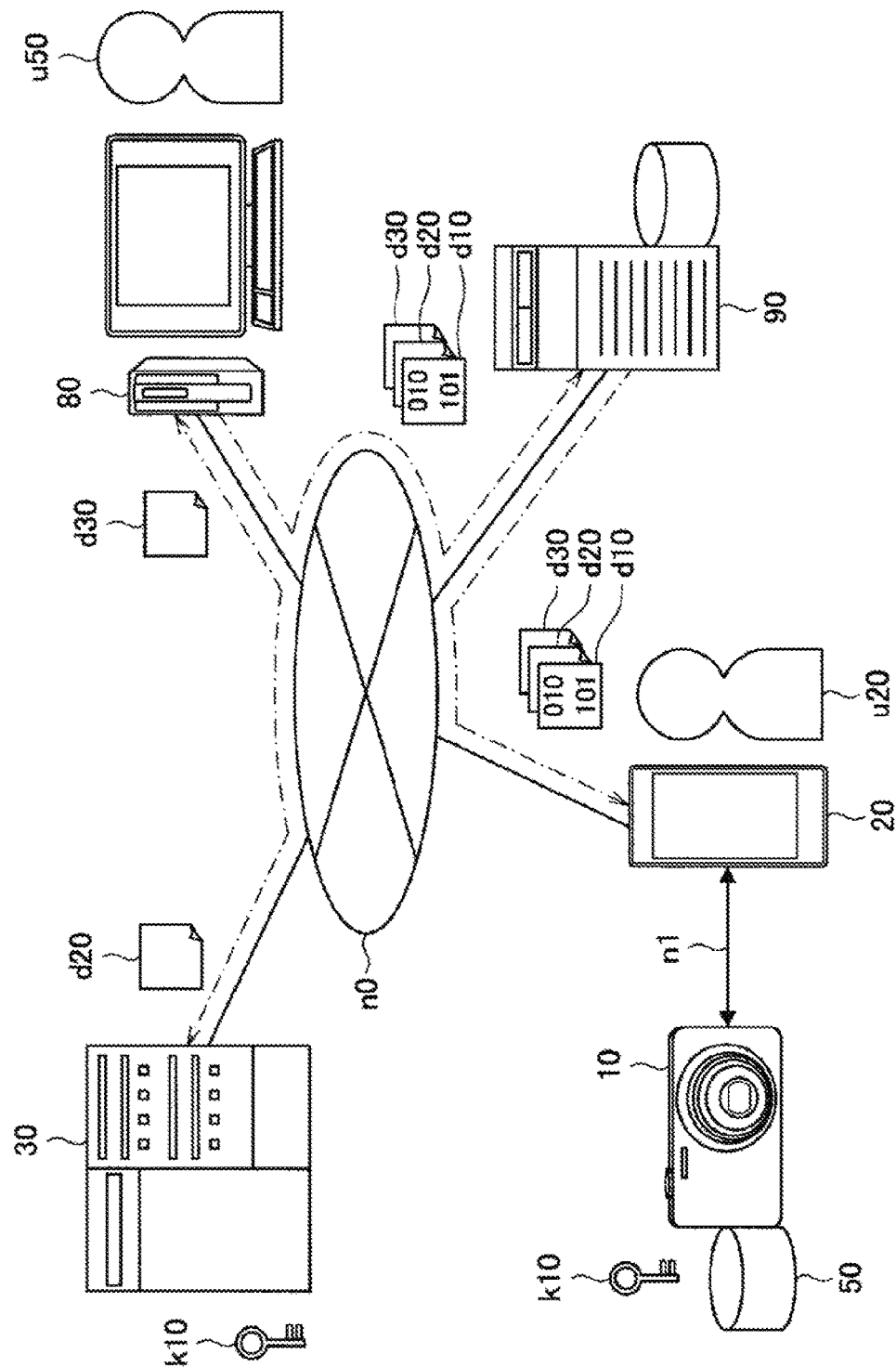
FIG. 4 is an explanatory diagram for describing an overview of a process involved in control of access to an API in the information processing system of the embodiment.

Firstly, an overview of a process involved in the control of access to an API in the information processing system of this embodiment will be described with reference to FIG. 4. FIG. 4 is an explanatory diagram for describing an overview of a process involved in the control of access to an API in the information processing system of this embodiment. Note that, in the example shown in FIG. 4, only a portion of the components shown in FIG. 2 that are involved in the control of access to an API are shown, and the other components are not shown.

In the information processing system of this embodiment, based on the request for authorization for use from the developer 1150, the management server 30 issues, to the developer u50, access control information d30 for cancelling a limitation on one or more of the APIs 50 for which the request for authorization for use has been approved.

Specifically, the management server 30 acquires a developer name d20 of the developer u50 specified by the developer u50, and a list of one or more of the APIs 50 which are to be used, from the developer terminal 80 operated by the developer u50. The management server 30 issues identification information d22 to the developer u50 indicated by the developer name d20.

The management server 30 generates, based on the acquired API list, the access control information d30 for controlling (permitting) access to APIs on the list. Note that the content of the access control information d30 will be described below along with a specific configuration for generating the access control information d30.

The management server 30 stores previously generated key information k10, and based on the key information k10, encodes the developer name d20, the identification information d22, and the access control information d30 to generate encoded information d32.

The management server 30 transmits the issued identification information d22 and the generated access control information d30 and encoded information d32 to the developer terminal 80 of the developer u50. Thus, the advance request of the developer u50 has been completed for development of the application d10 using one or more of the APIs 50 for which authorization for use has been requested.

Note that, in the information processing system of this embodiment, the developer u50, when employing APIs for which authorization for use in the application d10 to be developed has been requested, embeds the developer name d20, the identification information d22, the access control information d30, and the encoded information d32 in the application d10. Note that, in the description that follows, the developer name d20 and the identification information d22 may be collectively referred to as "developer identification information."

The developer identification information, the access control information d30, and the encoded information d32 may be collectively referred to as "authentication information." With such a configuration, the information processing device 10, when executing the application d10, acquires the authentication information embedded in the application d10, and based on the acquired authentication information, can determine whether or not the developer u50 has been authorized to use APIs. Note that the operation of the information processing device 10 to determine the presence or absence of authorization to use APIs based on the authentication information will be described in detail below.

Note that the rule of embedding of the authentication information in the application d10 may be made based on an operation of APIs. As a specific example, for one or more of the APIs 50 for which it is necessary to request authorization for use, a process may be defined so that when the application d10 is executed, then if the authentication information embedded in the application d10 is not presented, a limitation on use is not cancelled.

Note that the application d10, developed by the developer u50, having the embedded authentication information, for example, is published on the application providing server 90. As a result, the user u20 can download the application d10 developed by the developer u50 from the application providing server 90 and installs the application d10 into their own user terminal 20.

Next, an operation will be described which is performed when the user terminal 20 accesses the information processing device 10 via the network n1 by execution of the application d10 installed in the user terminal 20.

The information processing device 10 of this embodiment, when receiving access from the user terminal 20 during execution of the application d10, acquires the authentication information embedded in the application d10 from the user terminal 20.

At this time, the user terminal 20 transmits the developer identification information and the access control information d30 of the authentication information to the information processing device 10 without performing an irreversible process thereon. The user terminal 20 may transmit at least the developer identification information of the authentication information to the information processing device 10 without performing an encryption process or an encoding process thereon. Note that, here, the encryption process and the encoding process refer to an encryption process and an encoding process for protection of data, but not to an encryption process and an encoding process for communication based on a predetermined communication scheme.

The user terminal 20 may further encode the encoded information d32 included in the authentication information before transmitting it to the information processing device 10. In this case, the user terminal 20 may acquire key information (e.g., a random number) for encoding the encoded information d32 from the information processing device 10. Note that a process of encoding the encoded information d32 which is performed by the user terminal 20 will be described in detail below.

The information processing device 10 determines, based on the authentication information acquired from the user terminal 20, whether or not the developer u50 indicated by the developer identification information included in the authentication information is a developer who has requested authorization to use APIs.

As a specific example, the information processing device 10 may encode the developer name d20, the identification information d22, and the access control information d30 acquired from the user terminal 20 to generate encoded information d42, and based on the encoded information d42, identify the developer u50.

In this case, the information processing device 10 previously acquires and stores the key information k10 stored in the management server 30. The information processing device 10 encodes the developer identification information and the access control information d30 acquired from the user terminal 20 based on the key information k10 to generate the encoded information d42. Thereafter, the information processing device 10 may compare the generated encoded information d42 with the acquired encoded information d32, and based on whether or not the generated encoded information d42 and the acquired encoded information d32 match, determine whether or not the developer u50 indicated by the developer identification information is a developer who has requested authorization to use APIs.

Note that the above determination technique is only for illustrative purposes. Any determination technique may be used that allows the information processing device 10 to determine, based on the acquired authentication information, whether or not the developer u50 indicated by the developer identification information is a developer who has requested authorization to use APIs.

After it has been confirmed that the developer u50 is a developer who has requested authorization to use APIs, the information processing device 10 recognizes APIs for which authorization for use has been requested, based on the access control information d30 included in the authentication information. Thereafter, the information processing device 10 controls its own execution of APIs which are called during execution of the application d10, depending on whether or not the APIs are among those which can be recognized based on the access control information d30.

Figure 5:
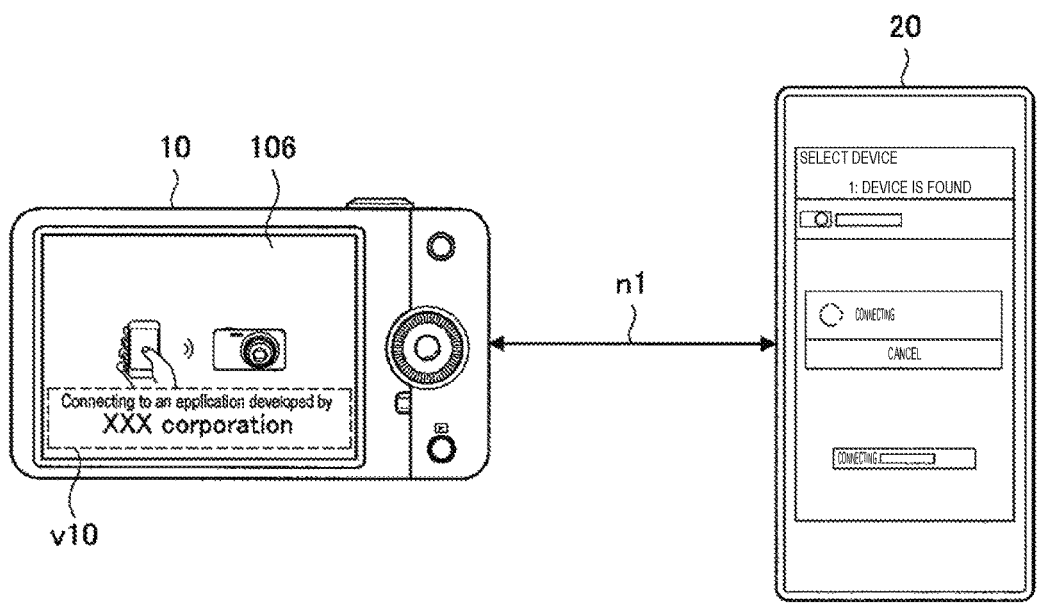
FIG. 5 is a diagram for describing an overview of a process involved in control of access to an API.

If it has been confirmed that the developer u50 is a developer who has requested authorization to use APIs, the information processing device 10 may cause, for example, a display unit to identifiably display the developer u50 indicated by the developer identification information. For example, FIG. 5 is a diagram for describing an example application of the information processing system of this embodiment, showing a case where information indicating the developer of the application d10 is displayed when connection between the information processing device 10 and the user terminal 20 is established. As shown in FIG. 5, the information processing device 10 causes the notification unit 106 configured to be a display to display developer information v10 which identifiably presents the developer u50 indicated by the developer identification information.

Note that the form of the developer information v10 is not particularly limited, if the developer information v10 can identifiably present the developer u50 indicated by the developer identification information. As a specific example, when the information processing device 10 or the user terminal 20 includes an output unit (e.g., a loudspeaker) which can output audio information, the information processing device 10 may output the developer information v10 as audio information through the output unit. Note that when the developer information v10 is output as audio information, the notification unit 106 may, of course, be configured as the output unit, for example.

Suppose that the developer u50 has embedded, in the application d10, authentication information in which the developer u50 pretends to be another developer who has made an advance request for authorization for use, without making an advance request for authorization for use. In this case, a developer indicated on a download site etc. when the application d10 is provided, and a developer displayed during execution of the application d10, do not match. For example, FIG. 6 is a diagram for describing an example application of the information processing system of this embodiment, showing an example download site v90.

Figure 6:
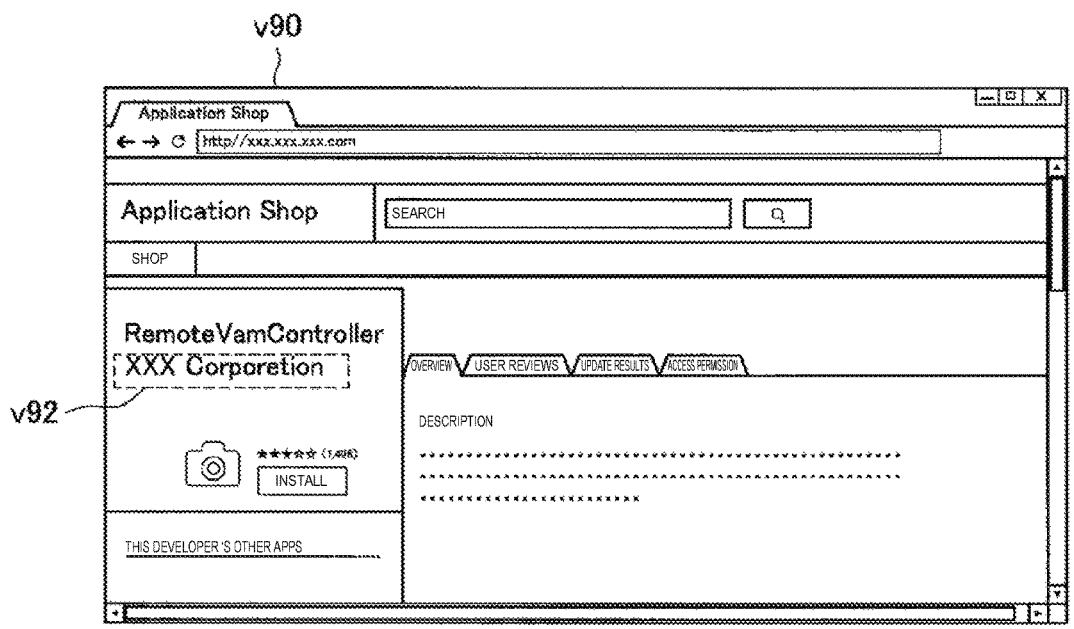
FIG. 6 is a diagram for describing an overview of a process involved in control of access to an API.

As shown in FIG. 6, on the download site v90, developer information v92 indicating development of the application d10 is displayed as information about the application d10 to be provided. As described above, if in the authentication information, the developer u50 pretends to be another developer who has made an advance request for authorization for use, the developer information v10 notified on the notification unit 106 of FIG. 5 and the developer information v92 presented on the download site v90 of FIG. 6 do not match. Note that when a portable medium is used for installing, the authentic developer can, for example, be verified based on a description on the package of the portable medium or information published on a web site etc.

Also, during execution of the application d10, the developer identification information is transmitted to the information processing device 10 without being encrypted or encoded. Therefore, the developer identification information is exposed on the network n1 between the user terminal 20 and the information processing device 10.

As described above, in the information processing system of this embodiment, during execution of the application d10, the developer information v10 indicated by the developer identification information embedded in the application d10 is presented on the user terminal 20. As a result, even if APIs are used without authorization, by a developer who pretends to be another developer who is authorized, a user who uses the application d10 can be caused to find that the developer pretends to be another developer who is authorized. If a user who uses the application d10 thus detects that the developer pretends to be another developer who is authorized, the user finds the unauthorized use by the developer, and concomitantly, the unauthorized use of APIs by a developer who pretends to be another developer who is authorized can be deterred.

Note that the timing at which the information processing device 10 presents the developer information v10 is not particularly limited. As a specific example, the information processing device 10 may cause the notification unit 106 to notify the user u20 of the developer information v10 when the operation is being controlled based on the application d10 executed in the user terminal 20.

Figure 7:
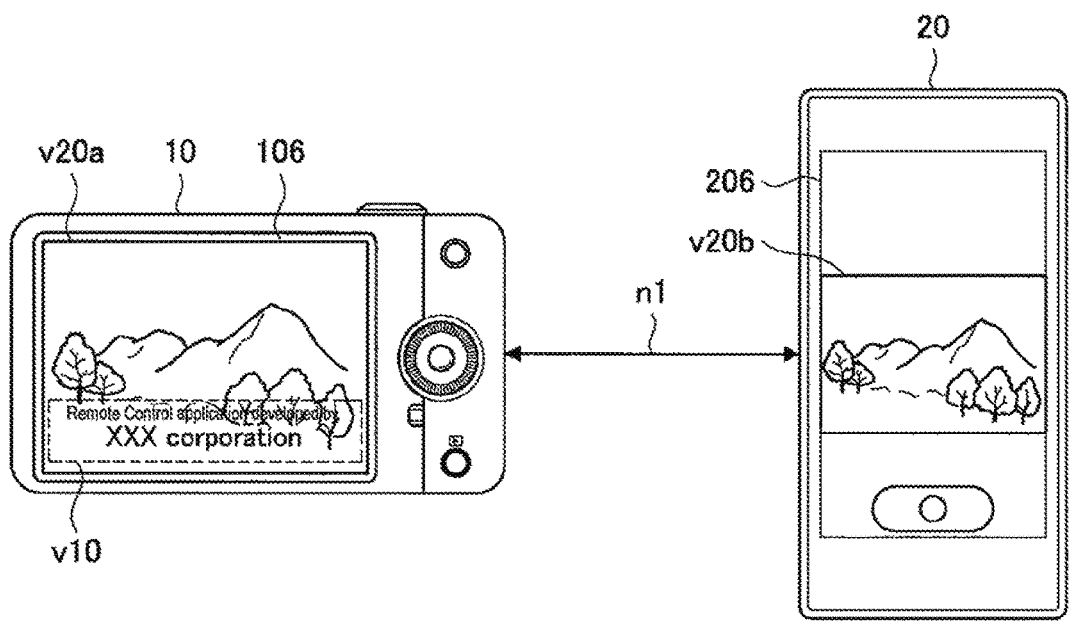
FIG. 7 is a diagram for describing an overview of a process involved in control of access to an API.

For example, FIG. 7 is a diagram for describing an example application of the information processing system of this embodiment, showing an example in which a digital camera is used as the information processing device 10, and image capture by the digital camera is controlled based on an operation from the user terminal 20.

In the example of FIG. 7, as a result of image capture by the digital camera, a captured image v20a is displayed on the notification unit 106 configured to be a display unit, and the image v20a is transferred to the user terminal 20 and displayed as an image v20b on a display unit 206 of the user terminal 20. At this time, the digital camera may display the developer information v10 together with the image v20a displayed on the notification unit 106. Thus, by displaying the developer information v10 when the application d10 is operating, the user u20 can be caused to be more conscious of a relationship between the operating application d10 and the developer indicated by the developer information v10.

3.2. Configuration of Management Server

Figure 8:
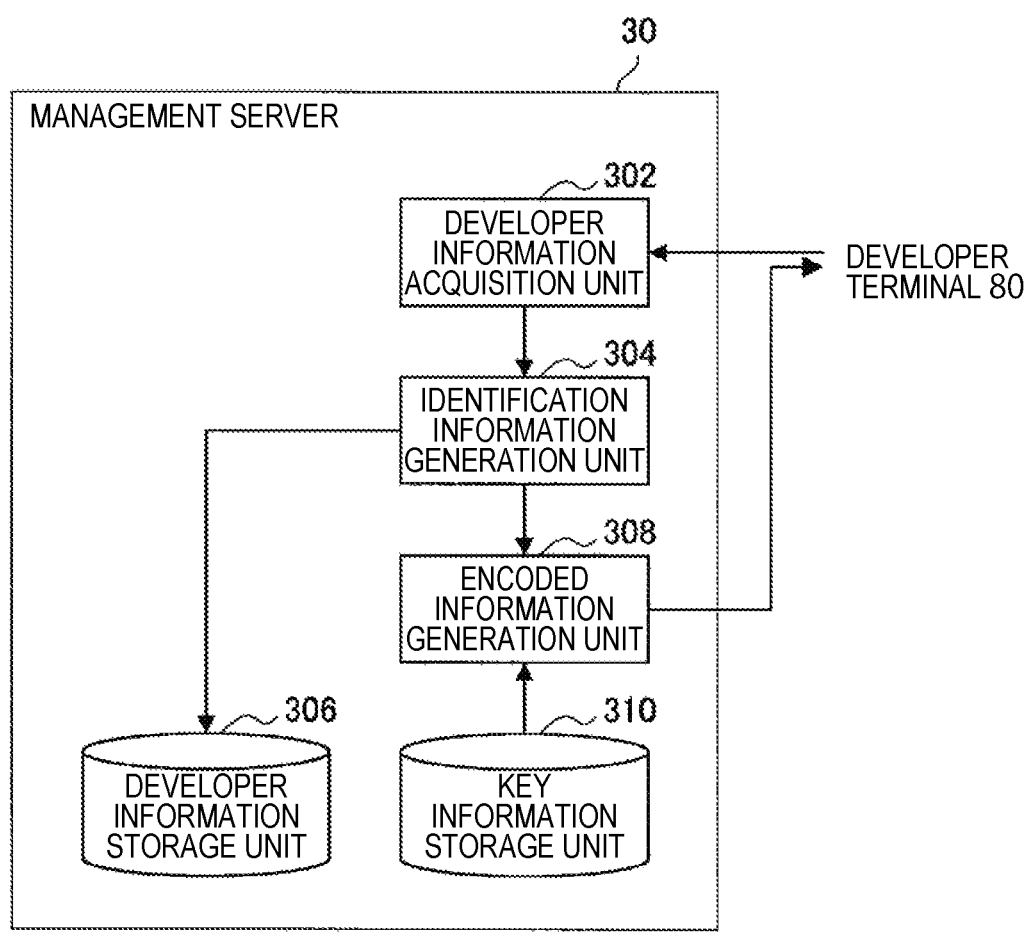
FIG. 8 is a block diagram showing an example of a configuration of a management server according to the embodiment.

Next, configurations of the management server 30 will be described in detail with reference to FIG. 8. FIG. 8 is a block diagram showing an example of a configuration of the management server 30 of this embodiment.

As shown in FIG. 8, the management server 30 includes a developer information acquisition unit 302, an identification information generation unit 304, a developer information storage unit 306, an encoded information generation unit 308, and a key information storage unit 310.

The developer information acquisition unit 302 acquires the developer name d20 of the developer u50 which is specified by the developer u50, and a list of one or more of the APIs 50 which are used, from the developer terminal 80 operated by the developer u50.

Note that the technique by which the developer information acquisition unit 302 acquires the developer name d20 and the API list is not particularly limited. For example, the developer information acquisition unit 302 may acquire the developer name d20 and the API list from the developer terminal 80 using a mail.

As another example, the developer information acquisition unit 302 may generate a screen for specifying the developer name d20 and the API list. In this case, for example, the developer u50 may operate the developer terminal 80 to access the management server 30, and operate the screen presented by the developer information acquisition unit 302 to specify the developer name d20 and the API list.

The developer information acquisition unit 302 outputs the acquired developer name d20 and API list to the identification information generation unit 304.

The identification information generation unit 304 acquires the developer name d20 and the API list from the developer information acquisition unit 302. The identification information generation unit 304 issues the identification information d22 to the developer u50 indicated by the developer name d20.

The identification information generation unit 304 generates, based on the acquired API list, the access control information d30 for controlling (permitting) access to APIs on the list.

The access control information d30 may be, for example, a list of the names of APIs which a developer has been authorized to use, or a list of identification information (e.g., numbers indicating APIs) indicating the names of APIs. The content of the access control information may be changed in API management units as appropriate. For example, when APIs are managed in packages, the access control information d30 may be a list of the names of packages which a developer has been authorized to use. When developers may be divided into predetermined categories, and available APIs are designated for each developer category, the access control information d30 may be information indicating a developer category. Thus, the access control information d30 may be in any form that allows APIs which a developer has been authorized to use to be identifiable.

The identification information generation unit 304 stores the acquired developer name d20, the issued identification information d22, and the generated access control information d30 as developer information in the developer information storage unit 306 in association with each other. Note that when receiving a request for registration of APIs which are newly used, from the developer u50 for which the developer information has already been registered, the identification information generation unit 304 may operate to update the developer information of the developer u50 stored in the developer information storage unit 306.

The identification information generation unit 304 outputs the acquired developer name d20, the issued identification information d22, and the generated access control information d30 to the encoded information generation unit 308.

The encoded information generation unit 308 acquires the developer name d20, the identification information d22, and the access control information d30 from the identification information generation unit 304.

The encoded information generation unit 308 encodes the developer name d20, the identification information d22, and the access control information d30 based on the previously generated key information k10 to generate the encoded information d32. Note that the key information k10 is stored in the key information storage unit 310.

At this time, the encoded information generation unit 308 may employ an irreversible encoding technique as the encoding technique. Note that any encoding technique based on key information may be employed to generate the encoded information d32. An example encoding technique for generating the encoded information d32 is keyed hashing.

The encoded information generation unit 308 transmits the identification information d22, the access control information d30, and the encoded information d32 to the developer terminal 80 of the developer u50. As a result, the developer u50 is notified of information based on which the developer u50 develops the application d10 using APIs for which authorization for use has been requested by the developer u50, i.e., the identification information d22, the access control information d30, and the encoded information d32.

Thus, the advance request has been completed which allows the developer u50 to generate the application d10 using one or more of the APIs 50 for which authorization for use has been requested by the developer u50. Note that, in order to allow the application d10 to use the APIs 50 included in the information processing device 10, it is not necessary that the information processing device 10 be notified of the developer identification information, the access control information d30, and the encoded information d32. Therefore, for example, the developer identification information, the access control information d30, and the encoded information d32 which the developer u50 has been notified of by the management server 30 are embedded in the application d10 developed by the developer u50. Note that if the information processing device 10 is notified of the developer identification information, the access control information d30, and the encoded information d32, these items of information may not necessarily have to be embedded in the application d10.

3.3. Configurations of Information Processing Device and User Terminal

Figure 9:
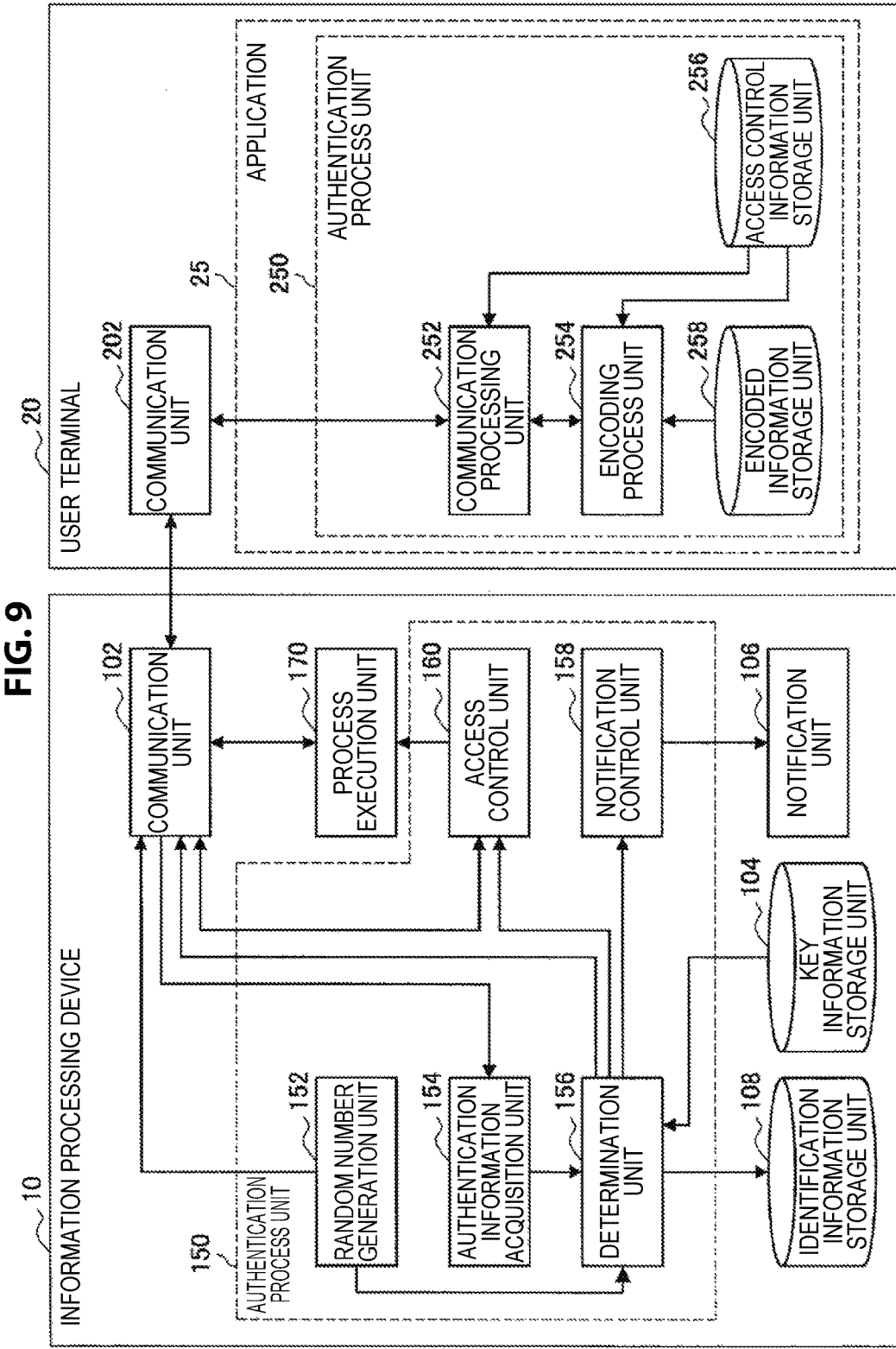
FIG. 9 is a block diagram showing an example of functional configurations of the information processing device and the user terminal of the embodiment, focusing on a process involved in control of access to an API.

Next, detailed configurations of the information processing device 10 and the user terminal 20 involved in the control of access to an API will be described with reference to FIG. 9. FIG. 9 is a block diagram showing an example of functional configurations of the information processing device 10 and the user terminal 20 of this embodiment, focusing on a process involved in the control of access to an API, where the other components are not shown. Note that it is assumed that the application d10 developed by the developer u50 is installed as the "application 25" in the user terminal 20.

Firstly, the user terminal 20 will be described. As shown in FIG. 9, the application 25 is installed in the user terminal 20. By the installation of the application 25, the authentication process unit 250 is incorporated as a function into the user terminal 20. The authentication process unit 250 includes a communication process unit 252, an encoding processing unit 254, an access control information storage unit 256, and an encoding information storage unit 258.

The access control information storage unit 256 is a storage unit which stores the developer identification information (i.e., the developer name d20 and the identification information d22) and the access control information d30. The encoded information storage unit 258 is a storage unit which stores the encoded information d32.

The communication process unit 252 acquires and transmits data from and to the information processing device 10. A specific operation of the communication process unit 252 will now be described.

Among the application d10, a function corresponding to the authentication process unit 250 is launched, the communication process unit 252 requests the information processing device 10 to generate key information for encoding, and acquires key information k20 as a response from the information processing device 10. Note that the key information k20 will be described in detail below along with a configuration of the information processing device 10.

When receiving the key information k20 from the information processing device 10, the communication process unit 252 outputs the acquired key information k20 to the encoding process unit 254. The communication process unit 252 acquires, from the encoding process unit 254, encoded information d52 as a response to the output of the key information k20. The encoded information d52 is information which is obtained by encoding the encoded information d32 based on the key information k20. Note that a process involved in generating the encoded information d52 will be described below along with an operation of the encoding process unit 254.

The communication process unit 252 reads the developer identification information and the access control information d30 from the access control information storage unit 256. The communication process unit 252 transmits the acquired encoded information d52, and the developer identification information and the access control information d30 read from the access control information storage unit 256, as authentication information, to the information processing device 10.

At this time, the communication process unit 252 transmits, to the information processing device 10, the developer identification information and the access control information d30 of the authentication information without performing an irreversible process thereon. The communication process unit 252 may transmit, to the information processing device 10, at least the developer identification information of the authentication information without performing an encryption process or an encoding process thereon. Note that, here, the encryption process and the encoding process refer to an encryption process and an encoding process for protection of data, but not to an encryption process and an encoding process for communication based on a predetermined communication scheme.

The encoding process unit 254 acquires the key information k20 from the communication process unit 252. When acquiring the key information k20, the encoding process unit 254 reads the encoded information d32 from the encoded information storage unit 258. The encoding process unit 254 encodes the read encoded information d32 based on the acquired key information k20 to generate the encoded information d52.

At this time, the encoding process unit 254 employs an irreversible encoding technique as the encoding technique. Note that any irreversible encoding technique based on key information may be employed to generate the encoded information d52. An example encoding technique for generating the encoded information d52 is keyed hashing.

The encoding process unit 254 outputs the generated encoded information d52 to the communication process unit 252.

Next, a configuration of the information processing device 10 will be described, particularly focusing on a configuration of the authentication process unit 150. As shown in FIG. 9, the authentication process unit 150 includes a random number generation unit 152, an authentication information acquisition unit 154, a determination unit 156, a notification control unit 158, and an access control unit 160.

The key information storage unit 104 is a storage unit which stores the key information k10. The key information storage unit 104 stores the key information k10 similar to the above key information which is stored in the key information storage unit 310 of the management server 30.

The random number generation unit 152, when receiving a request for generation of key information from the user terminal 20, generates the key information k20 for encoding. A specific example of the key information k20 is information which is randomly generated, such as a random number. Note that the key information k20 is not limited to a random number and may be in any form that can provide the functionality of a key for performing an encoding process.

The random number generation unit 152 transmits the generated key information k20 to the user terminal 20. As a result, the user terminal 20 can encode the encoded information d32 based on the key information k20 to generate the encoded information d52.

The random number generation unit 152 outputs the generated key information k20 to the determination unit 156.

The authentication information acquisition unit 154 acquires the developer identification information, the access control information d30, and the encoded information d52 as authentication information from the information processing device 10. The authentication information acquisition unit 154 outputs the acquired authentication information to the determination unit 156.

The determination unit 156 acquires the authentication information transmitted from the user terminal 20, and based on the acquired authentication information, determines whether or not a developer indicated by the developer identification information included in the authentication information is a developer who has made an advance request for authorization for use. Note that a developer indicated by the developer identification information indicates the developer of the application d10 executed in the user terminal 20. An example determination process performed by the determination unit 156 will now be described.

The determination unit 156 acquires the key information k20 from the random number generation unit 152. The determination unit 156 also acquires the authentication information from the authentication information acquisition unit 154. The determination unit 156 also reads the key information k10 from the key information storage unit 310.

The determination unit 156 encodes the developer identification information and the access control information d30 included in the acquired authentication information based on the key information k10 to generate the encoded information d42. Note that, at this time, the determination unit 156 generates the encoded information d42 based on an encoding process similar to that of the encoded information generation unit 308 of the management server 30. Specifically, when the encoded information d32 which is a generation source of the encoded information d52 has been generated by the encoded information generation unit 308 based on the developer identification information and the access control information d30 included in the authentication information, the encoded information d32 and d42 match.

After generating the encoded information d42, the determination unit 156 encodes the generated encoded information d42 based on the key information k20 to generate encoded information d62. Note that, at this time, the determination unit 156 generates the encoded information d62 based on an encoding process similar to that of the encoding process unit 254 of the user terminal 20.

The determination unit 156 compares the generated encoded information d62 with the acquired encoded information d52, and when the information d62 and d52 match, recognizes a developer indicated by the developer identification information as a developer who has made an advance request for authorization for use. Note that, at this time, when the encoded information d32 and d42 match, the encoded information d52 and d62 encoded by a similar encoding process based on similar key information k20 match.

Note that the above process of the determination unit 156 is only for illustrative purposes. The operation of the determination unit 156 is not limited, if it can be determined based on the acquired authentication information whether or not a developer indicated by the developer identification information included in the authentication information is a developer who has made an advance request for authorization for use. For example, if the determination unit 156 can communicate with the management server 30 via an external network, such as the Internet, the determination unit 156 may inquire of the management server 30, via the external network, whether the developer identification information included in the acquired authentication information is correct.

Although an example has been described above in which the encoded information d32 is encoded based on the key information k20 before being transmitted from the user terminal 20 to the information processing device 10, the encoded information d32 may be transmitted from the user terminal 20 to the information processing device 10 without being encoded based on the key information k20. In this case, needless to say, none of the processes involved in the generation and transmission of the key information k20 and the process of encoding the encoded information d32 based on the key information k20 is necessary. The information processing device 10 may acquire the encoded information d32 from the user terminal 20, and make a determination based on whether or not the acquired encoded information d32 match the encoded information d42 generated based on the key information k10.

When recognizing a developer indicated by the developer identification information as a developer who has made an advance request for authorization for use, the determination unit 156 outputs the access control information d30 to the access control unit 160. Of the authentication information indicating that the developer indicated by the developer identification information is a developer who has made an advance request for authorization for use, the determination unit 156 also stores at least the developer identification information (or information about a developer indicated by the developer identification information) in the identification information storage unit 108. Note that, at this time, the determination unit 156 may store pieces of information contained in the authentication information in the identification information storage unit 108.

The determination unit 156 may also notify the user terminal 20 that the developer indicated by the developer identification information has been determined to be a developer who has made an advance request for authorization for use. When receiving the notification, the user terminal 20 may call APIs for which an advance request for authorization for use has been made.

The determination unit 156 may also output information indicating the developer indicated by the developer identification information, e.g., at least one of the developer name d20 and the identification information d22, to the notification control unit 158. Note that, in the description that follows, it is assumed that the determination unit 156 outputs both the developer name d20 and the identification information d22 to the notification control unit 158.

The access control unit 160 acquires the access control information d30 from the determination unit 156. The access control unit 160, when the process execution unit 260 (see FIG. 3, see below for more details) of the user terminal 20 executes the application d10 to call APIs, permits or limits execution of the APIs based on the access control information d30.

As a specific example, when there is not a particular limitation on the use of the called APIs, and an advance request for authorization for use is not necessary, the access control unit 160 permits execution of the APIs. If the execution of the APIs is permitted, the APIs are executed by the process execution unit 170 of the information processing device 10 (see FIG. 3, see below for more details).

When there is a limitation on the use of the called APIs, and the use of the APIs is permitted based on the access control information d30, the access control unit 160 permits execution of the APIs.

On the other hand, when there is a limitation on the use of the called APIs and the use of the APIs is not permitted based on the access control information d30, the access control unit 160 limits or forbids execution of the APIs. At this time, the access control unit 160 may notify the user terminal 20 that execution of the called APIs is not permitted.

Thus, the access control unit 160 controls execution of each of the APIs 50 based on the access control information d30.

The notification control unit 158 acquires the developer name d20 and the identification information d22 from the determination unit 156. The notification control unit 158 causes the notification unit 106 to identifiably notify the user u20 of the acquired developer name d20 and identification information d22, i.e., information indicating the developer of the executed application d10.

The notification unit 106 may be configured to be a display medium, such as a display etc. As a specific example, when the information processing device 10 is a digital camera, the notification unit 106 may be a display etc. which is provided in order to check information or see a captured image.

Also, as another example, the notification unit 106 may be configured as an output medium for outputting audio information, such as a loudspeaker etc. In this case, information indicating the developer of the executed application d10 is, of course, output as audio information from the notification unit 106.

Thus, by identifiably displaying information indicating the developer of the executed application d10, for example, when APIs are used without authorization, by a developer who pretends to be another developer who is authorized, this unauthorized use can be detected.

Specifically, when a developer pretends to be another developer who is authorized, information notified by the notification unit 106 does not match a developer which is displayed on a download site etc. when the corresponding application is acquired. Therefore, by identifiably displaying the acquired information indicating a developer during execution of an application, if the developer pretends to be another developer who is authorized, it can be suggested to the user u20 using the information processing device 10 that the developer pretends to be another developer who is authorized.

Note that when information indicating a developer is identifiably presented, the presentation itself of the information indicating a developer can also deter the unauthorized use of APIs by a developer who pretends to be another developer who is authorized. Therefore, when information indicating a developer is identifiably presented, a reversible encryption process or encoding process may be performed on the developer name d20 or the identification information d22 before being transmitted from the user terminal 20 to the information processing device 10. In this case, the determination unit 156 may decode the developer name d20 or the identification information d22 which has been encrypted or encoded, and based on the decoded developer name d20 or identification information d22, execute the above determination process.

Although an example in which available APIs are limited for each developer has been described above, the management units in which the use of APIs is limited may be changed, depending on actual operation, as appropriate. For example, when available APIs are limited for each application, different pieces of access control information d30 may be issued for different applications. In this case, the access control information d30 issued for each application may be managed in association with a single piece of identification information d22, or different pieces of identification information d22 may be issued for each piece of access control information d30. Note that when different pieces of access control information d30 are issued, there are different pieces of encoded information d32 which are generated based on the respective corresponding pieces of access control information d30, and therefore, the control of access to APIs can be changed on an application-by-application basis.

Note that, in the above example, the information processing device 10 uses the access control information d30 to identify a portion of the APIs whose use is limited, and executes the control to access to the portion of APIs. Meanwhile, when it is only determined whether or not the APIs are available, without distinguishing the APIs from each other, the information processing device 10 does not necessarily use the access control information d30. Also, in this case, processes involved in the generation of the access control information d30, the transmission and reception of the access control information d30 between the management server 30 and the developer terminal 80, and the embedding of the access control information d30 in the application d10 are, of course, not always necessary.

3.4. Processes

Next, the flow of processes involved in the control of access to an API in the information processing system of this embodiment will be described. Note that, in the description that follows, particularly, an operation involved in an advance request for authorization for use of the APIs 50 by the developer u50, and an operation of the information processing device 10 to control the use of the APIs 50 based on information from the user terminal 20, will be described.

{3.3.1. Operation Involved in Making Advance Request for Authorization for Use}

Figure 10:
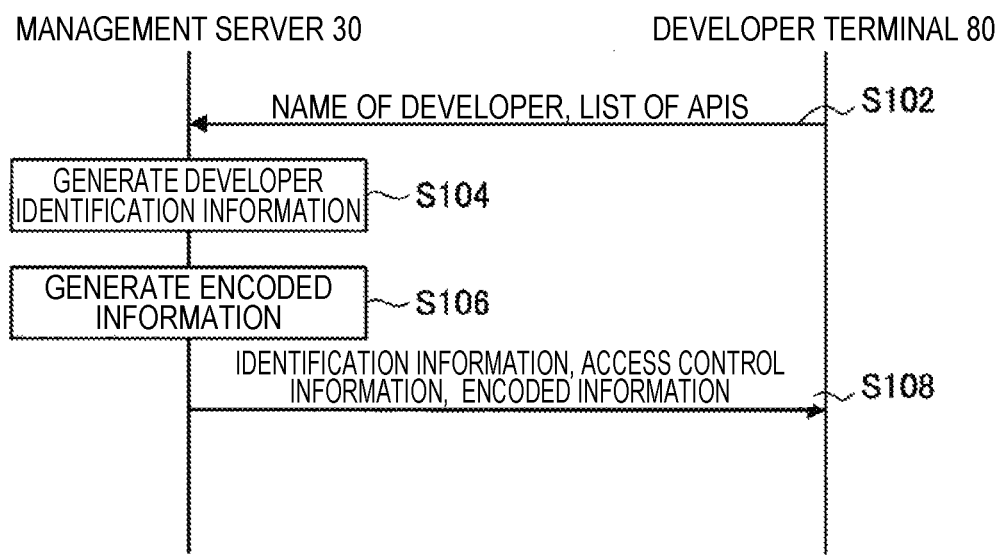
FIG. 10 is a sequence diagram showing a series of operations of a management server according to the embodiment.

Firstly, a flow of a process of the management server 30 which is performed when the developer u50 makes an advance request for authorization to use the APIs 50 from the management server 30 will be described with reference to FIG. 10. FIG. 10 is a sequence diagram showing a series of operations of the management server 30 of this embodiment.

(Step S102)

The developer information acquisition unit 302 acquires the developer name d20 of the developer u50 specified by the developer u50, and a list of one or more of the APIs 50 which are used by the developer u50, from the developer terminal 80 operated by the developer u50. The developer information acquisition unit 302 outputs the acquired developer name d20 and API list to the identification information generation unit 304.

(Step S104)

The identification information generation unit 304 acquires the developer name d20 and the API list from the developer information acquisition unit 302. The identification information generation unit 304 issues the identification information d22 to the developer u50 indicated by the developer name d20.

The identification information generation unit 304 also generates, based on the acquired API list, the access control information d30 for controlling (permitting) access to APIs on the list.

The identification information generation unit 304 outputs the acquired developer name d20, the issued identification information d22, and the generated access control information d30 to the encoded information generation unit 308.

(Step S106)

The encoded information generation unit 308 acquires the developer name d20, the identification information d22, and the access control information d30 from the identification information generation unit 304.

The encoded information generation unit 308 encodes the developer name d20, the identification information d22, and the access control information d30 based on the previously generated key information k10 to generate the encoded information d32. Note that the key information k10 is stored in the key information storage unit 310.

At this time, the encoded information generation unit 308 employs an irreversible encoding technique as the encoding technique. Note that any irreversible encoding technique based on key information may be employed to generate the encoded information d32. An example encoding technique for generating the encoded information d32 is keyed hashing.

(Step S108)

The encoded information generation unit 308 transmits the identification information d22, the access control information d30, and the encoded information d32 to the developer terminal 80 of the developer u50. As a result, the developer u50 is notified of information based on which the developer u50 develops the application d10 using APIs for which authorization for use has been requested by the developer u50, i.e., the identification information d22, the access control information d30, and the encoded information d32.

{3.3.2. Operation Involved in Control of Access to API}

Figure 11:
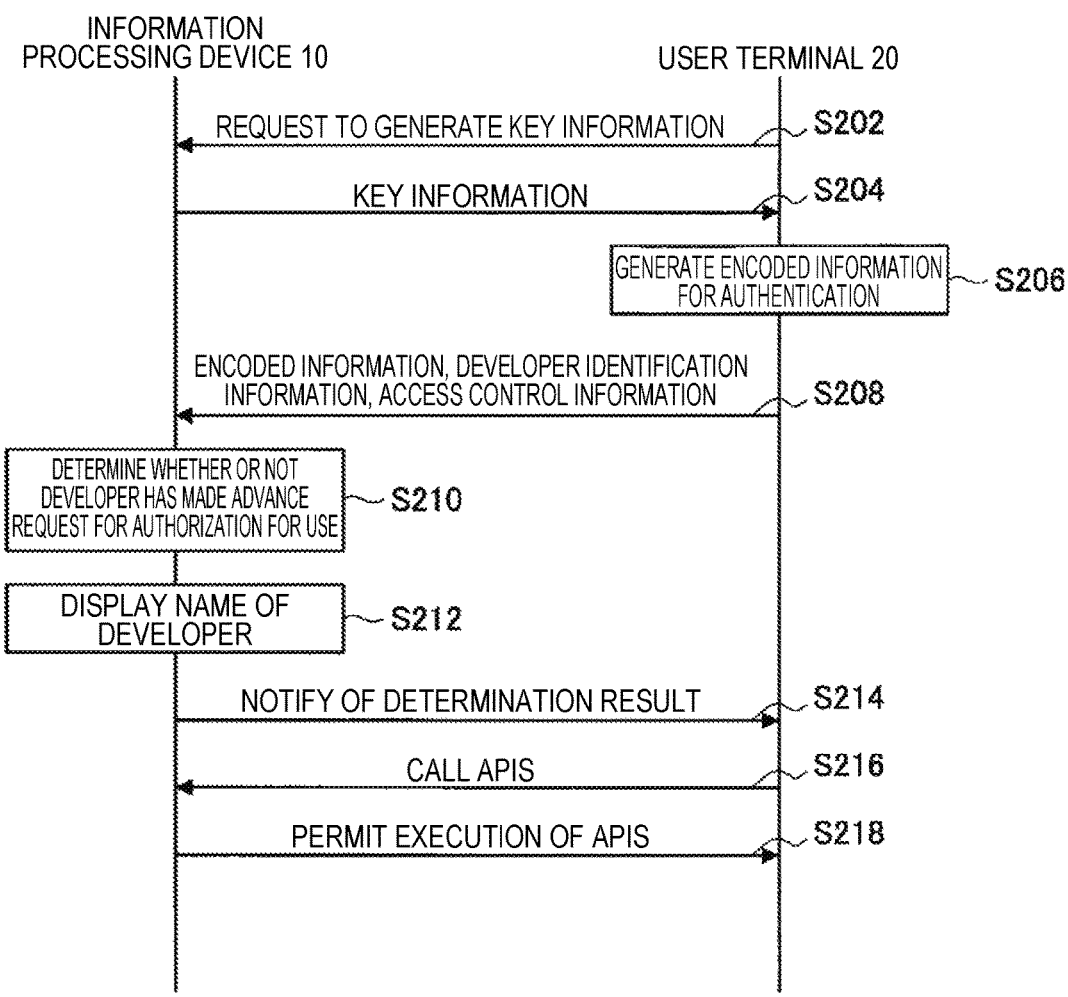
FIG. 11 is a sequence diagram showing an example of a series of operations involved in control of access to an API in the information processing device of the embodiment.

Next, a flow of a process which is performed by the information processing device 10 and the user terminal 20 when the information processing device 10 receives an instruction from the user terminal 20, and then confirms authorization to use the APIs 50 and performs control of access to the APIs 50, will be described with reference to FIG. 11. FIG. 11 is a sequence diagram showing an example of a series of access operations on API of the information processing device 10 of this embodiment.

(Step S202)

When a function corresponding to the authentication process unit 250 of the application d10 is launched, the communication process unit 252 requests the information processing device 10 to generate key information for encoding.

The random number generation unit 152, when receiving a request for generation of key information from the user terminal 20, generates the key information k20 for encoding. A specific example of the key information k20 is information which is randomly generated, such as a random number. Note that the key information k20 is not limited to a random number and may be in any form that can provide the functionality of a key for performing an encoding process.

(Step S204)

The random number generation unit 152 transmits the generated key information k20 to the user terminal 20. The random number generation unit 152 also outputs the generated key information k20 to the determination unit 156. When receiving the key information k20 from the information processing device 10, the communication process unit 252 outputs the acquired key information k20 to the encoding process unit 254.

(Step S206)

The encoding process unit 254 acquires the key information k20 from the communication process unit 252. When acquiring the key information k20, the encoding process unit 254 reads the encoded information d32 from the encoded information storage unit 258. The encoding process unit 254 encodes the read encoded information d32 based on the acquired key information k20 to generate the encoded information d52.

At this time, the encoding process unit 254 employs an irreversible encoding technique as the encoding technique. Note that any irreversible encoding technique based on key information may be employed to generate the encoded information d52. An example encoding technique for generating the encoded information d52 is keyed hashing.

The encoding process unit 254 outputs the generated encoded information d52 to the communication process unit 252. The communication process unit 252 acquires the encoded information d52 from the encoding process unit 254 as a response from the output of the key information k20.

(Step S208)

The communication process unit 252 reads the developer identification information (i.e., the developer name d20 and the identification information d22) and the access control information d30 from the access control information storage unit 256. The communication process unit 252 transmits the acquired encoded information d52, and the developer identification information and the access control information d30 read from the access control information storage unit as authentication information, to the information processing device 10.

At this time, the communication process unit 252 transmits, to the information processing device 10, the developer identification information and the access control information d30 of the authentication information without performing an irreversible process thereon. The communication process unit 252 may transmit, to the information processing device 10, at least the developer identification information of the authentication information without performing an encryption process or an encoding process thereon.

(Step S210)

The authentication information acquisition unit 154 acquires the developer identification information, the access control information d30, and the encoded information d52 as authentication information from the information processing device 10. The authentication information acquisition unit 154 outputs the acquired authentication information to the determination unit 156.

The determination unit 156 acquires the key information k20 from the random number generation unit 152. The determination unit 156 also acquires the authentication information from the authentication information acquisition unit 154. The determination unit 156 also reads the key information k10 from the key information storage unit 310.

The determination unit 156 encodes the developer identification information and the access control information d30 included in the acquired authentication information based on the key information k10 to generate the encoded information d42. Note that, at this time, the determination unit 156 generates the encoded information d42 based on an encoding process similar to that of the encoded information generation unit 308 of the management server 30.

After generating the encoded information d42, the determination unit 156 encodes the generated encoded information d42 based on the key information k20 to generate encoded information d62. Note that, at this time, the determination unit 156 generates the encoded information d62 based on an encoding process similar to that of the encoding process unit 254 of the user terminal 20.

The determination unit 156 compares the generated encoded information d62 with the acquired encoded information d52, and when the information d62 and d52 match, recognizes a developer indicated by the developer identification information as a developer who has made an advance request for authorization for use.

(Step S212)

When recognizing the developer indicated by the developer identification information as a developer who has made an advance request for authorization for use, the determination unit 156 outputs the access control information d30 to the access control unit 160. Of the authentication information indicating that the developer indicated by the developer identification information is a developer who has made an advance request for authorization for use, the determination unit 156 also stores at least the developer identification information (or information about a developer indicated by the developer identification information) in the identification information storage unit 108. Note that, in this case, the determination unit 156 may store pieces of information contained in the authentication information in the identification information storage unit 108.

Note that when not recognizing the developer indicated by the developer identification information as a developer who has made an advance request for authorization for use, the determination unit 156 may deny access from the user terminal 20. In this case, the user terminal 20 may receive notification of the denial of access from the determination unit 15, and end the application d10. Alternatively, for example, the determination unit 156, when not recognizing the developer indicated by the developer identification information as a developer who has made an advance request for authorization for use, may output, to the access control unit 160, access control information indicating permission of access only to an API(s) for which an advance request for authorization for use is not necessary.

The determination unit 156 may output information indicating a developer indicated by the developer identification information, e.g., at least one of the developer name d20 and the identification information d22, to the notification control unit 158. Note that, in the description that follows, it is assumed that the determination unit 156 outputs both the developer name d20 and the identification information d22 to the notification control unit 158.

The notification control unit 158 acquires the developer name d20 and the identification information d22 from the determination unit 156. The notification control unit 158 causes the notification unit 106 to identifiably notify the user u20 of the acquired developer name d20 and identification information d22, i.e., information indicating the developer of the executed application d10.

(Step S214)

The determination unit 156 may also notify the user terminal 20 that a developer indicated by the developer identification information has been determined to be a developer who has made an advance request for authorization for use. When receiving the notification, the user terminal 20 may call APIs for which an advance request for authorization for use has been made.

(Steps S216 and S218)

The access control unit 160 acquires the access control information d30 from the determination unit 156. The access control unit 160, when an execution unit (not shown) of the user terminal 20 executes the application d10 to call APIs (step S216), permits or limits execution of the APIs based on the access control information d30 (step S218).

As a specific example, if there is not a particular limitation on the use of the called APIs, and it is not necessary to have made an advance request for authorization to use the APIs, the access control unit 160 permits execution of the APIs. When the execution of the APIs is permitted, the APIs are executed by an execution unit (not shown) of the information processing device 10.

When there is a limitation on the use of the called APIs, and the use of the APIs is permitted based on the access control information d30, the access control unit 160 permits execution of the APIs.

On the other hand, when there is a limitation on the use of the called APIs and the use of the APIs is not permitted based on the access control information d30, the access control unit 160 limits or forbids execution of the APIs. At this time, the access control unit 160 may notify the user terminal 20 that execution of the called APIs is not permitted.

Thus, the access control unit 160 controls execution of each of the APIs 50 based on the access control information d30.

4. ACQUISITION OF CONTENTS

Next, a process involved in acquisition of a content in the information processing device 10 of this embodiment will be described. The information processing device 10 of this embodiment, when acquiring a content in response to access from the application 25 to each of the APIs 50, associates, with the content, information of a developer indicated by the developer identification information that it has been determined has made an advance request for authorization for use. With such a configuration, the information processing system of this embodiment provides a scheme in which, for example, when the application 25 uses APIs without authorization while pretending to be another developer who is authorized to use the APIs, the pretending is detected based on the information of the developer associated with the content.

Figure 12:
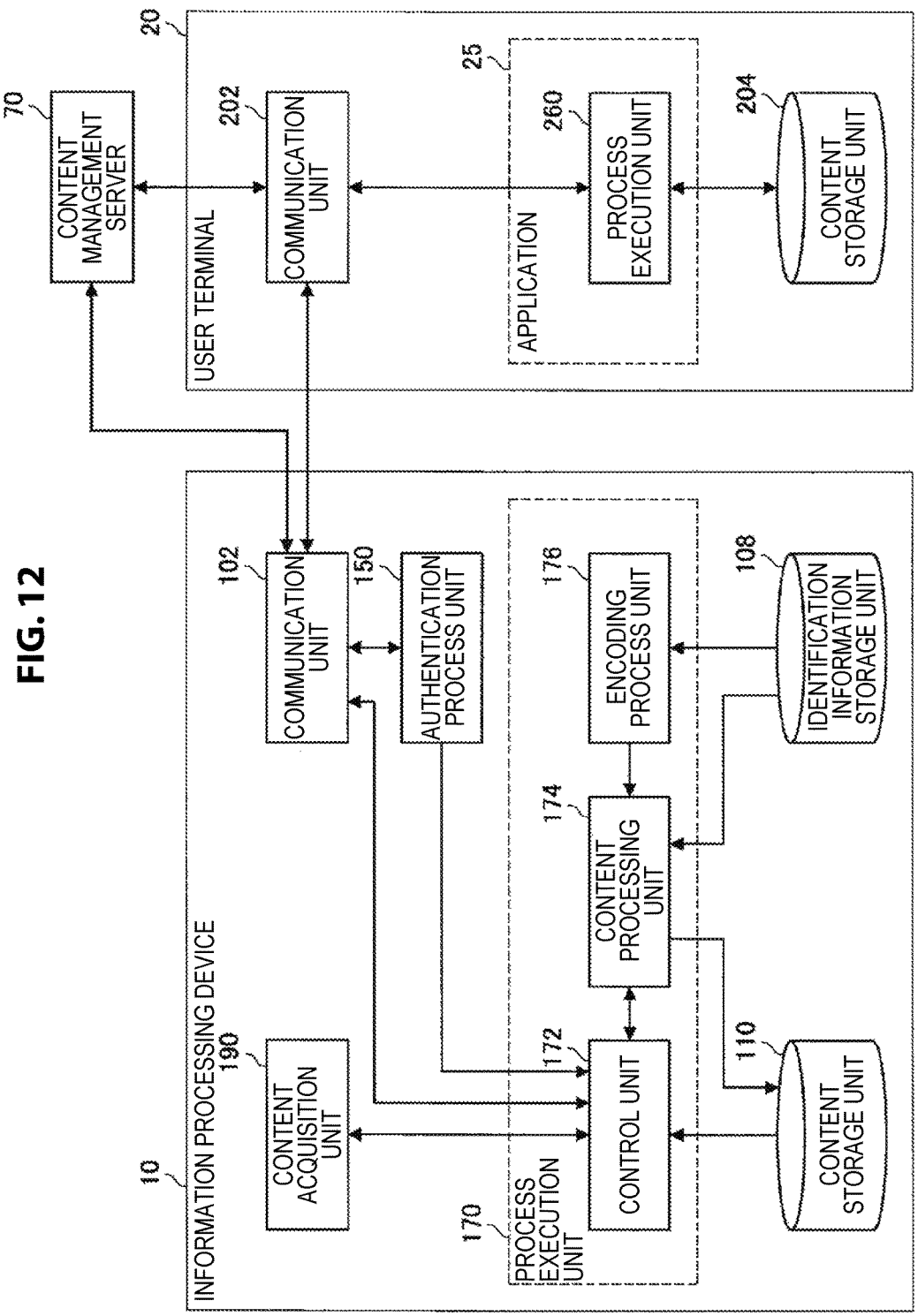
FIG. 12 is a block diagram showing an example of functional configurations of the information processing device and the user terminal of the embodiment, focusing on a process involved in acquisition of a content.

Therefore, in the description that follows, a configuration of the information processing device 10 will be particularly described with reference to FIG. 12. FIG. 12 is a block diagram showing an example of functional configurations of the information processing device 10 and the user terminal 20 of this embodiment, focusing on a process involved in acquisition of a content, where the other components are not shown. Note that it is assumed that an application d10 developed by the developer u50 is installed as the "application 25" in the user terminal 20.

As shown in FIG. 12, the process execution unit 170 of the information processing device 10 includes a control unit 172, a content processing unit 174, and an encryption processing unit 176.

When one of the processes specified in the application 25 that is involved in control of the information processing device 10 is executed by the process execution unit 260, the process execution unit 260 calls an API for performing the control, with respect to the information processing device 10. When the process execution unit 260 calls an API, the authentication process unit 150 (specifically, the access control unit 160) performs control of access to the target API. At this time, when, according to the above authentication process performed by the authentication process unit 150, it has been determined that the developer of the application 25 is a developer who has made an advance request for authorization for use, the authentication process unit 150 permits the control unit 172 to execute the called API.

The control unit 172, when permitted by the authentication process unit 150, extracts the API called by the process execution unit 260 from the APIs 50, and executes the extracted API. In this case, the control unit 172 may return the result of the execution of the API to the process execution unit 260.

The control unit 172 may also cause the content acquisition unit 190 to acquire a content, based on execution of the API called by the process execution unit 260. Note that the API executed at this time may be a function for acquiring a content, or a function which is executed in a series of functions for acquiring a content instead of acquisition of a content. Examples of such a function executed by an API include the function of determining settings involved in acquisition of a content such as exposure conditions, white balance, exposure sensitivity, etc., the function of notifying of management information such as a list of APIs supported by the information processing device 10, etc., and the like.

When the control unit 172 acquires a content from the content acquisition unit 190 based on execution of the called API, the control unit 172 outputs the content to the content processing unit 174, and instructs the content processing unit 174 to associate the content with information of the developer. In response to this, the control unit 172 may acquire the content associated with information of the developer (i.e., a developer who has made an advance request for authorization for use) from the content processing unit 174, and output the content to the process execution unit 260.

The content processing unit 174, when receiving a content from the control unit 172, extracts developer identification information stored in the identification information storage unit 108, i.e., developer identification information indicating the developer that it has been confirmed is a developer who has made an advance request for authorization for use. Thereafter, the content processing unit 174 associates the extracted developer identification information or information of a developer indicated by the developer identification information, with the acquired content. Note that the information of a developer indicated by the developer identification information is information in which the developer is identifiably presented. Such information may hereinafter be simply referred to as "developer information."

Also, the method of associating the extracted developer identification information, or developer information indicated by the developer identification information, with the acquired content is not particularly limited. As a specific example, the content processing unit 174 may associate the acquired content with the developer information by causing the developer information to accompany the content, serving as attribution information of the content. Also, as another example, the content processing unit 174 may associate the content with the developer information recorded in a file different from that of the content. Note that, in the description that follows, for ease of understanding, it is assumed that the content processing unit 174 associates the acquired content with the developer information indicated by the extracted developer identification information.

Alternatively, the content processing unit 174 may associate the acquired content with the encrypted developer information (may also hereinafter referred to as "encrypted information"). In this case, the encryption processing unit 176 extracts developer identification information stored in the identification information storage unit 108, and encrypts developer information indicated by the extracted developer identification information to generate the encrypted information. Thereafter, the encryption processing unit 176 outputs the generated encrypted information to the content processing unit 174. The content processing unit 174 may associate the encrypted information acquired from the encryption processing unit 176 with the content. Note that the encryption processing unit 176 may, of course, encrypt the developer identification information to generate the encrypted information.

Note that key information for encrypting developer information is, for example, previously stored in a place from which the key information can be read by the encryption processing unit 176. The key information may also hereinafter be referred to as "key information k30."

Also, a configuration for processing encrypted information (e.g., the content management server 70, see below for details) may, of course, be configured to be capable of reading out the key information k30 or key information for decryption corresponding to the key information k30.

Thus, in the information processing system of this embodiment, provided is the scheme of associating developer information with an acquired content, and based on the developer information associated with the content, detecting the unauthorized use of an API by a developer who pretends to be another developer who is authorized to use the API. Note that a specific example of the method of associating developer information with an acquired content, and details of the scheme of detecting the unauthorized use of an API based on the developer information, will be described in examples below.

The control unit 172 may also transmit a content associated with developer information to the user terminal 20 (e.g., the process execution unit 260). When the information processing device 10 is configured to be capable of communicating with the content management server 70, the control unit 172 may also transmit (transfer) a content associated with developer information to the content management server 70. A content associated with developer information may also be stored in a storage medium provided in the information processing device 10, such as the content storage unit 110. At this time, a content associated with developer information is stored in the content storage unit 110 by either the control unit 172 or the content processing unit 174. Also, only one or both of the above process of transmitting a content associated with developer information to the user terminal 20, and the above process of storing the content into the content storage unit 110 may, of course, be executed.

Note that the information processing device 10 may manage the above period of time when the control to access to an API whose use is limited is enabled based on the result of determination of a developer, according to a predetermined rule. For example, the information processing device 10 may enable access to an API whose use is limited, only during a period of time when the network n1 between the information processing device 10 and the user terminal 20 is active (i.e., a period of time when connection is established), and disable the access after the network n1 is disconnected. Note that, after the access to the API is disabled, when access to the API is requested again, the information processing device 10 may execute determination of an application developer again.

The information processing device 10 may also issue a session for each application that accesses an API whose use is limited, and enable access to the API only during a period of time when the session is active, and disable the access after the session is ended. With such a configuration, even when a plurality of applications access the API, the information processing device 10 can perform access control for each application based on the issued session.

Note that the information processing device 10 may disable access to an API by, for example, deleting the developer identification information stored in the identification information storage unit 108.

In the foregoing, the process of acquiring a content in the information processing device 10 of this embodiment has been described with reference to FIG. 12. Next, in the description that follows, as examples of the information processing device 10 of this embodiment, a specific example of the method of associating developer information indicated by developer identification information with an acquired content, and details of the scheme of detecting the unauthorized use of an API based on the developer information, will be described.

5. EXAMPLES

5.1. Example 1: A First Example in which Developer Information is Recorded as Attribute Information of a Content Firstly, as Example 1, an example of the scheme of detecting the unauthorized use of an API by a developer Who pretends to be another developer who is authorized to use the API in a case where a content is accompanied by developer information and encrypted information as attribute information, will be described.

Figure 13:
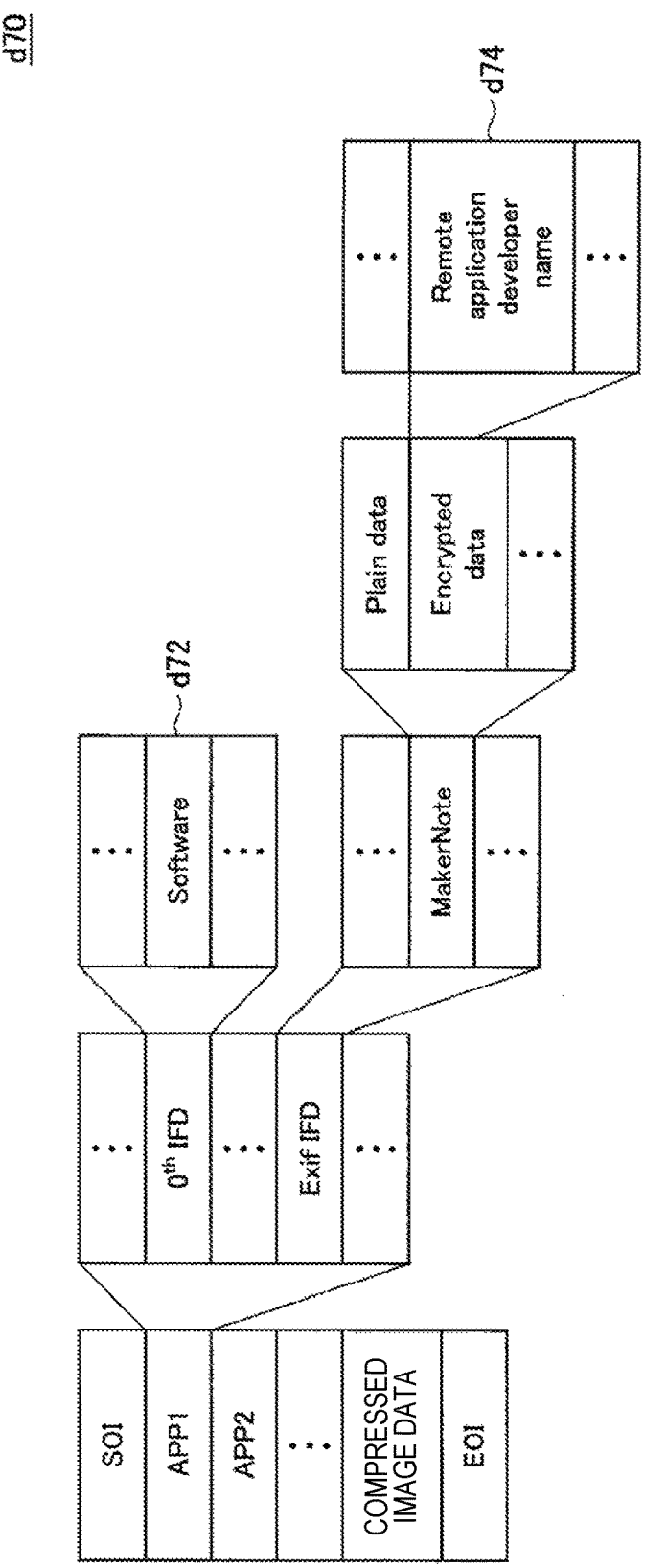
FIG. 13 is a diagram showing an example of data of a content generated by the information processing device of the embodiment.

Firstly, refer to FIG. 13. FIG. 13 is a diagram showing an example of the data of a content d70 generated by the information processing device 10 of this embodiment, indicating an example of the data structure of a header for associating the content with attribute information.

As shown in FIG. 13, the header of the content d70 has an area for recording each item of attribute information along with a tag, which is called an image file directory (IFD). For example, the "$0^{th}$ IFD" is an area for recording a predetermined item of information. The $0^{th}$ IFD has, for example, a tag "Software" for recording information of software which has been used to acquire the content d70. The information processing device 10 according to Variation 1 records, for example, developer information to the tag "Software."

The header of the content d70 may also have an IFD called an "Exif IFD." The "Exif IFD" is an IFD specified according to a format called an exchangeable image file format (EXIF). In this IFD, an IFD called a "Makernote" is specified. The "MakerNote" is an example of an IFD for which the maker of the information processing device 10, from which contents are acquired, can arbitrarily define a tag which is to be associated. The information processing device 10 of Variation 1 has, for example, an IFD for recording encrypted information represented by "Encrypted data" in the "MakerNote," and records the encrypted information in the tag "Remote application developer name" of the IFD.

Thus, the information processing device 10 of Variation 1 (specifically, the content processing unit 174) records, for example, developer information in the tag "Software," and records encrypted information in the "Remote application developer name," to associate the content d70 with the developer information.

Figure 14:
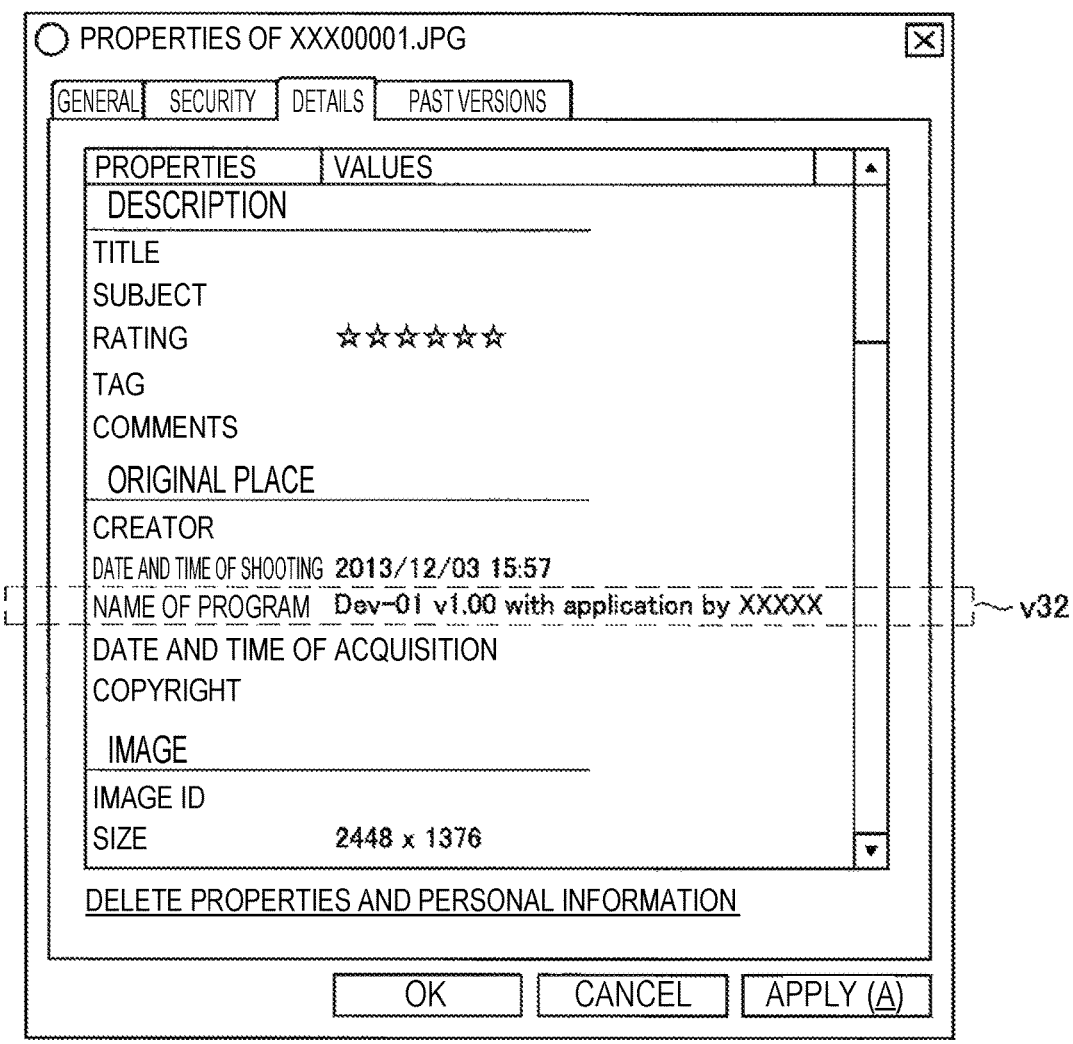
FIG. 14 shows an example of display of information about a content.

Note that information recorded in the $0^{th}$ IFD can be referenced as information (property) about the content d70 by, for example, a function of an operating system (OS). For example, FIG. 14 shows an example of a display screen v30 of information about a content, where properties of a content are displayed by a function of Windows (registered trademark). As shown in FIG. 14, the display screen v30 displays developer information recorded in the tag "Software" of the $0^{th}$ IFD as a program name v32. As a result, for example, the user u20 of the user terminal 20 can check the developer of an application which has been used to acquire the content d70.

Meanwhile, information recorded in the $0^{th}$ be altered by for example, a process of an application. Therefore, for example, when an application executed by the user terminal 20 uses an API without authorization by pretending to be another developer who is authorized to use the API, to acquire a content, the unauthorized use may be concealed by altering the developer information recorded in the tag "Software" of the content.

Figure 15:
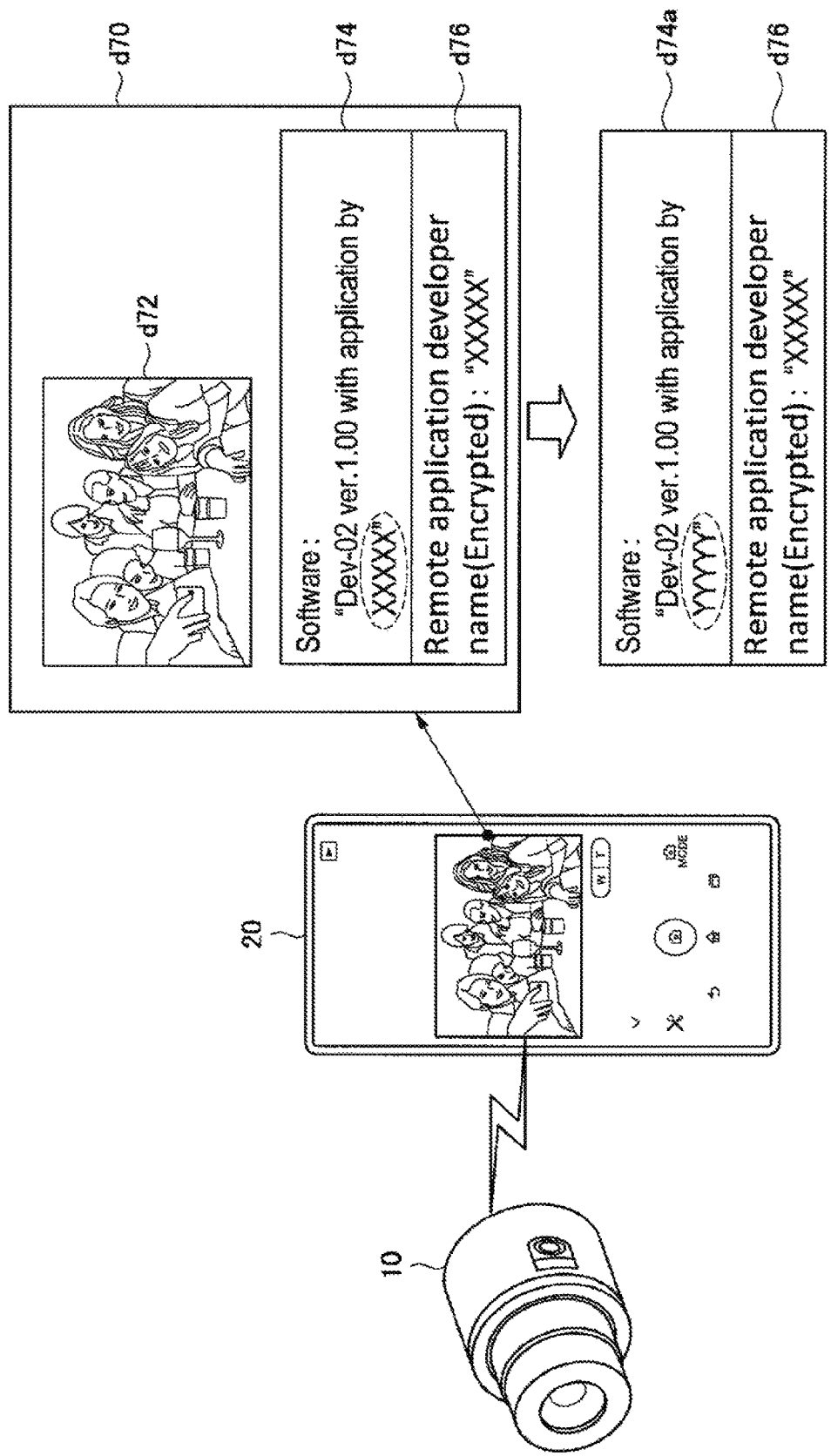
FIG. 15 is a diagram for describing an overview of an information processing system according to Example 1 of the embodiment.

Here, refer to FIG. 15. FIG. 15 is a diagram for describing an overview of the information processing system of Example 1, showing an example in which developer information recorded in the tag "Software" is altered. Note that the example shown in FIG. 15 indicates a case where the information processing device 10 is configured as a so-called digital camera, which acquires image data as the content d70.

For example, it is assumed that, in the user terminal 20, an application of a developer "YYYYY" who is not authorized to use an API, pretends to be another developer "XXXXX" who is authorized to use the API, and causes the information processing device 10 to acquire the content d70, in this case, the content d70 transmitted from the information processing device 10 to the user terminal 20 contains an image d72, developer information d74 indicating that the developer is "XXXXX," and encrypted information d76 obtained by encrypting the developer information d74.

It is assumed that an application of the developer "YYYYY" has altered the developer information d74 indicating the developer "XXXXX" to developer information d74a indicating the developer "YYYYY" with respect to the content d70 transmitted from the information processing device 10. In this case, for example, the developer information of the developer "YYYYY" is displayed in the program name v32 of the screen v30 shown in FIG. 14. Therefore, the user u20 of the user terminal 20 may continue to use the application without knowing that the application is an application which uses an API without authorization.

Therefore, in the information processing system of Variation 1, for example, when the content is uploaded (i.e., transmitted or transferred) to the content management server 70, the content management server 70 detects the unauthorized use of an API. An operation of the content management server 70 will now be described with reference to FIGS. 16-18.

Figure 16:
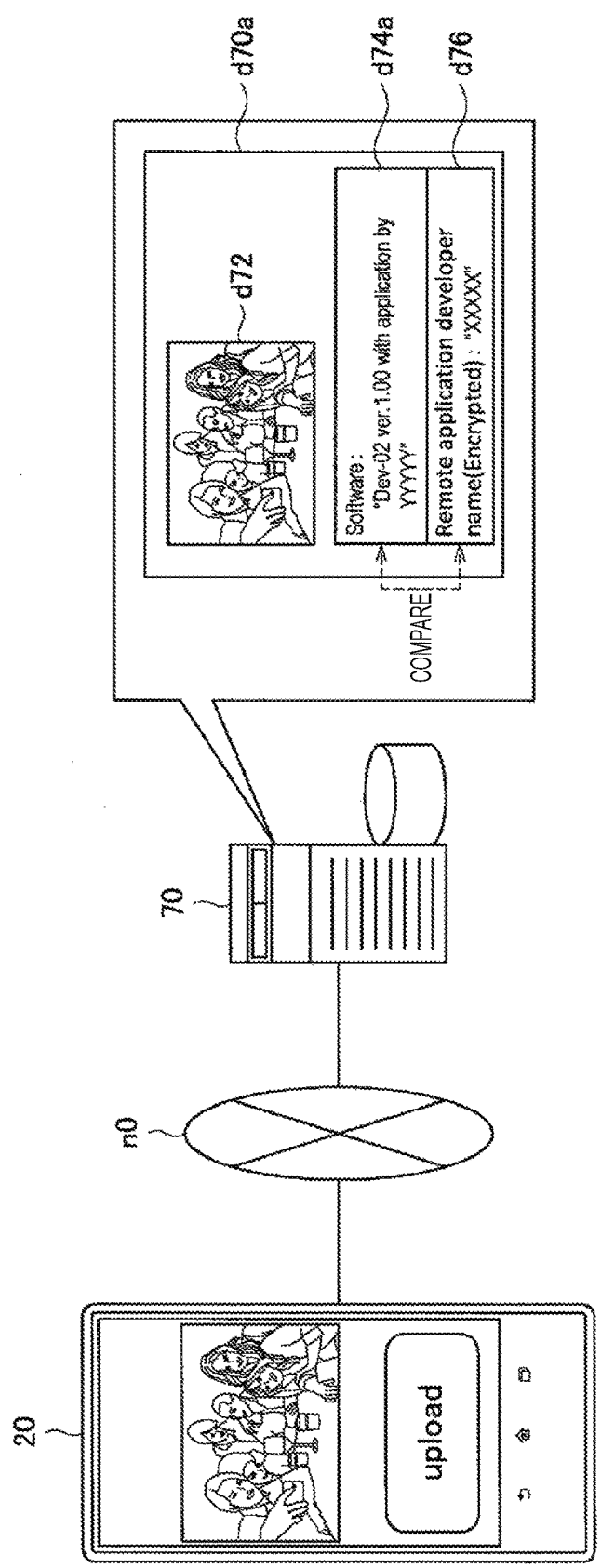
FIG. 16 is a diagram for describing an overview of an information processing system according to Example 1 of the embodiment.

Firstly, refer to FIG. 16. FIG. 16 shows a schematic system configuration, focusing on a case where a content is uploaded from the user terminal 20 to the content management server 70 via the network n1. Specifically, the example shown in FIG. 16 indicates a case where a content d70a for which the developer information d74a indicating the developer "YYYYY" pretends to be the developer information d74 indicating the developer "XXXXX" is uploaded to the content management server 70. Note that one of the components of the content management server 70 that acquires the content d70 from the user terminal 20 corresponds to an example of the "content acquisition unit."

The content management server 70 of Variation 1 compares the developer information d74 accompanying the content d70 acquired from the user terminal 20 with the encrypted information d76, to determine whether the developer information d74 has been altered. Note that one of the components of the content management server 70 that compares the developer information d74 accompanying the content d70 with the encrypted information d76 to determine whether or not the developer information d74 has been altered, corresponds to an example of the "determination unit."

Specifically, the content management server 70 previously stores key information for decrypting the encrypted information d76, i.e., key information for decryption corresponding to the key information k30 which has been used to generate the encrypted information d76. Thereafter, the content management server 70 decrypts the encrypted information d76 based on the key information for decryption, and compares the decrypted developer information with the developer information d74 accompanying the content d70. At this time, when the developer information d74 accompanying the content d70 has been altered (i.e., the altered developer information d74a is accompanying), the comparison result indicates a mismatch.

Also, as another example, the content management server 70 may previously store the key information k30 which has been used to generate the encrypted information d76. In this case, the content management server 70 may encrypt the developer information d74 accompanying the content d70 based on the key information k30, and compare the encrypted developer information d74 with the encrypted information d76. At this time, when the developer information d74 accompanying the content d70 has been altered, the comparison result indicates a mismatch.

Thus, the content management server 70 can detect an alteration to the developer information d74, and the unauthorized use of an API by a developer who pretends to be another developer who is authorized to use the API, based on the result of comparison of the developer information d74 accompanying the content d70 with the encrypted information d76.

Also, the content management server 70, when detecting the unauthorized use of an API by a developer who pretends to be another developer who is authorized to use the API, may notify the user u20 that the application which has been used to acquire the content d70 is an unauthorized application, via the user terminal 20.

Figure 17:
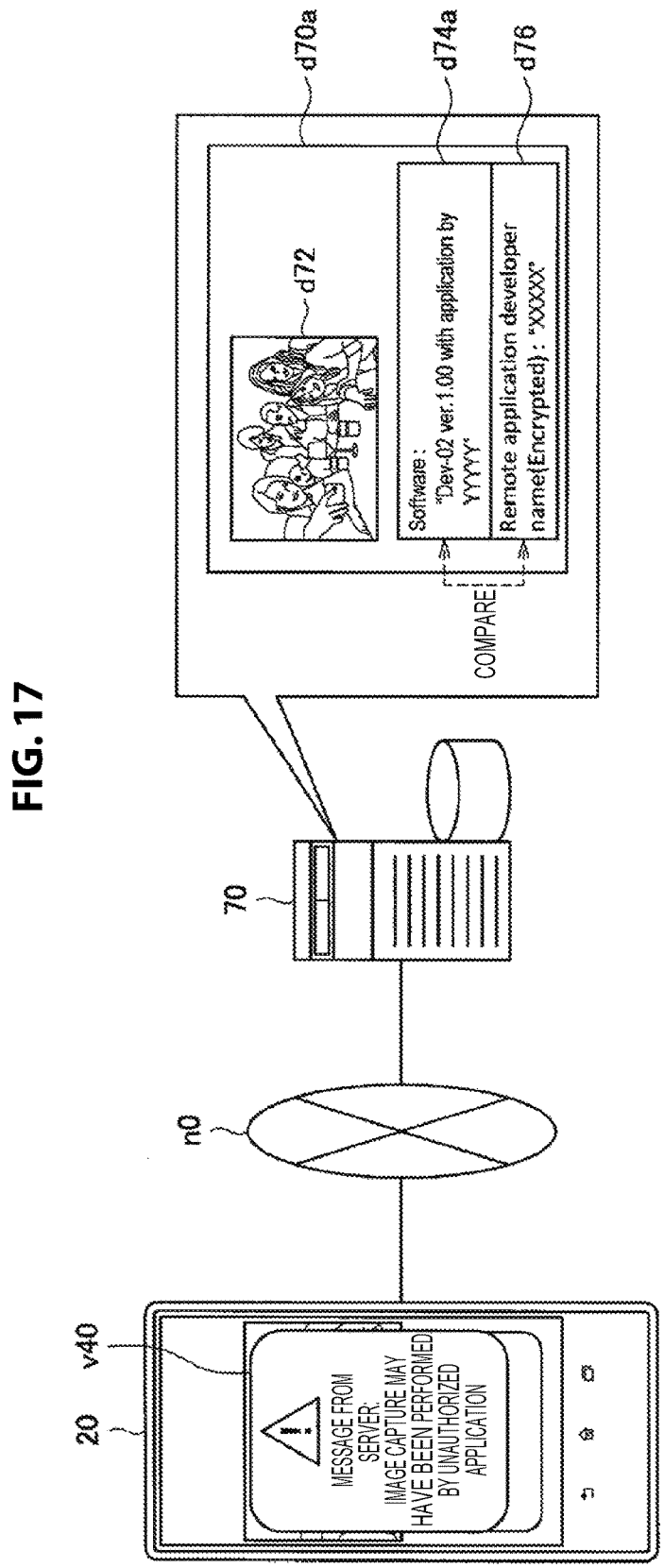
FIG. 17 is a diagram for describing an overview of an information processing system according to Example 1 of the embodiment.

For example, in the example shown in FIG. 17, the user terminal 20 presents the notified information as a message v40 to the user u20 in response to the uploading of the content d70a. As a result, the user u20 can recognize that the application which has been used to acquire the content d70a uploaded to the content management server 70 is an unauthorized application.

Also, as another example, the content management server 70, when detecting the unauthorized use of an API by a developer who pretends to be another developer who is authorized to use the API, may record and manage a developer indicated by the altered developer information d74a.

Figure 18:
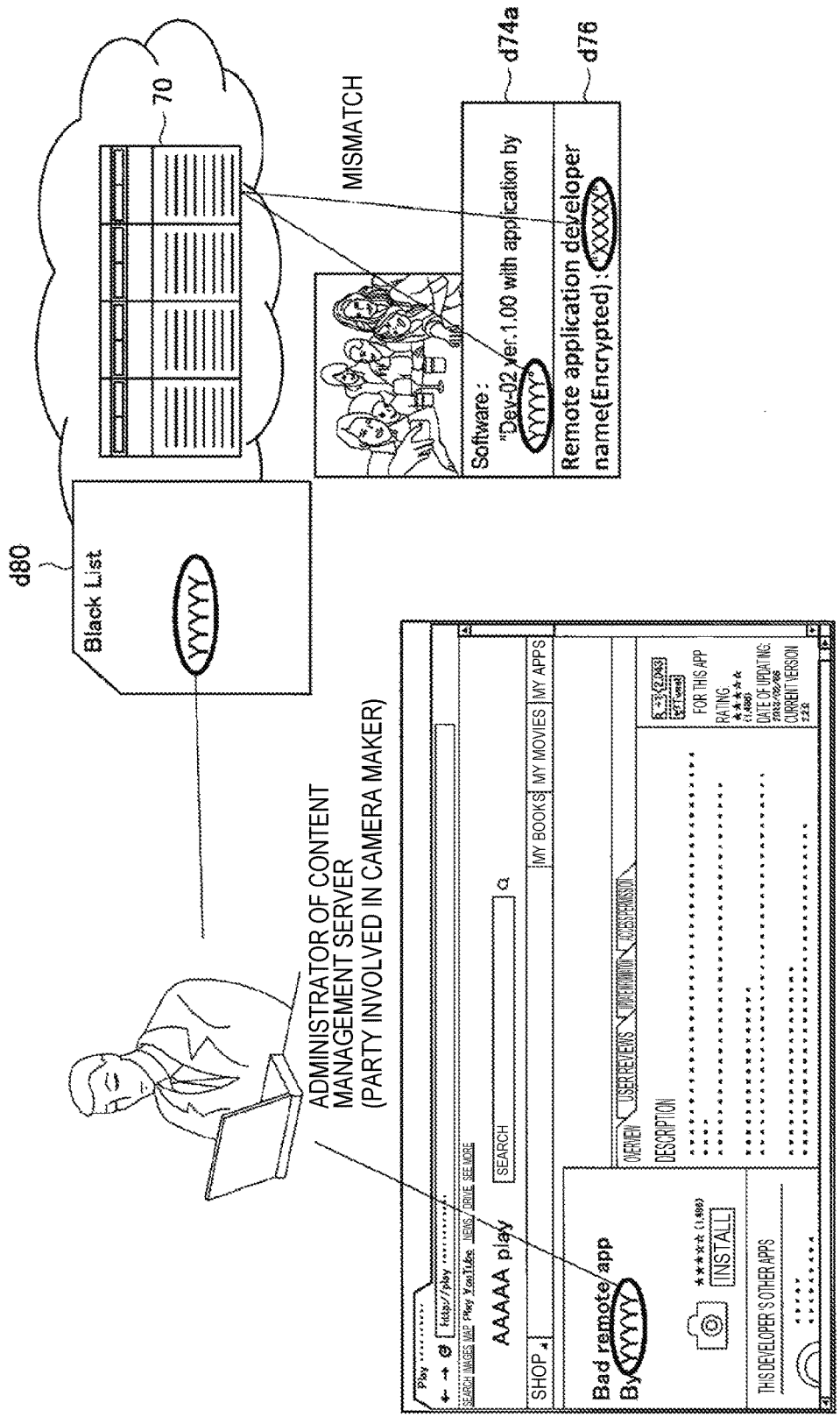
FIG. 18 is a diagram for describing an application example of the information processing system of Example 1 of the embodiment.

For example, in the example shown in FIG. 18, the content management server 70 records the developer "YYYYY" indicated by the altered developer information d74a to a blacklist d80 for management. With such a configuration, for example, the administrator (or a party involved in a camera maker) of the content management server 70 can identify a developer who pretends to be another developer indicated by the developer information d74, i.e., a developer who has used an API without authorization by pretending to be another developer who is authorized to use the API, by referencing the blacklist d80.

Also, as another example, when the user u20 accesses the content management server 70 to reference the content d70 stored in the content management server 70, the content management server 70 may present developer information indicated in the encrypted information d76.

Figure 19:
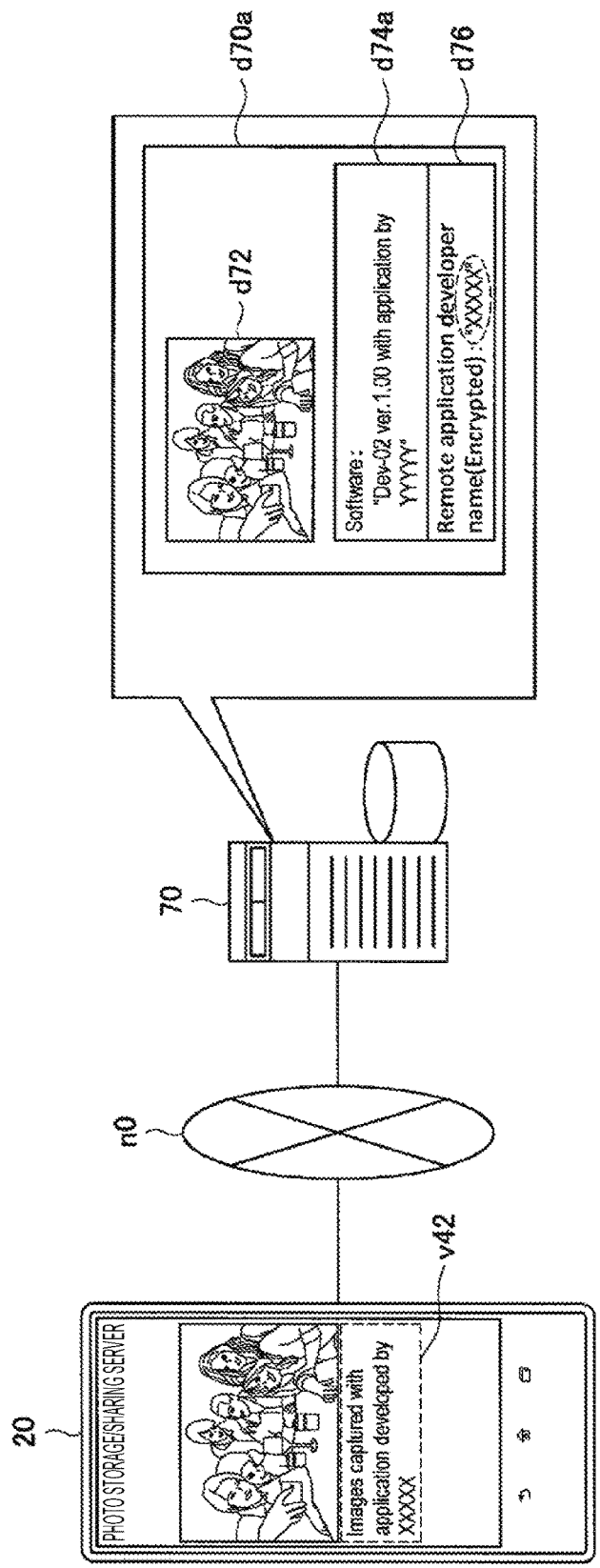
FIG. 19 is a diagram for describing an application example of the information processing system of Example 1 of the embodiment.

For example, FIG. 19 shows an example of a case where the user u20 activates a browser on the user terminal 20, and references the content d70a stored in the content management server 70 via the browser. In the example shown in FIG. 19, the content management server 70 decrypts the encrypted information d76 in the content d70a, and notifies the user terminal 20 of the decrypted developer information together with the image d72 in the content d70a. Reference sign v42 indicates developer information of which the user terminal 20 is notified by the content management server 70, i.e., developer information obtained by decrypting the encrypted information d76.

Here, unless the developer information indicated in the encrypted information d76 has the key information k30 which has been used for encryption and the key information for decryption corresponding to the key information k30, it is difficult to alter the developer information. In other words, even when the developer information d74 accompanying the content d70 has been altered, the content management server 70 presents the developer information d74 before the alteration, as the developer information indicated in the encrypted information d76.

Therefore, when the developer information d74 has been altered, the user u20 can recognize that the developer information d74a of the content d70 stored in the user terminal 20 is different from the developer information presented by the content management server 70. In other words, the user u20 can recognize, based on the developer information presented by the content management server 70, that the application which has been used to acquire the content d70a uploaded to the content management server 70 is an unauthorized application.

Figure 20:
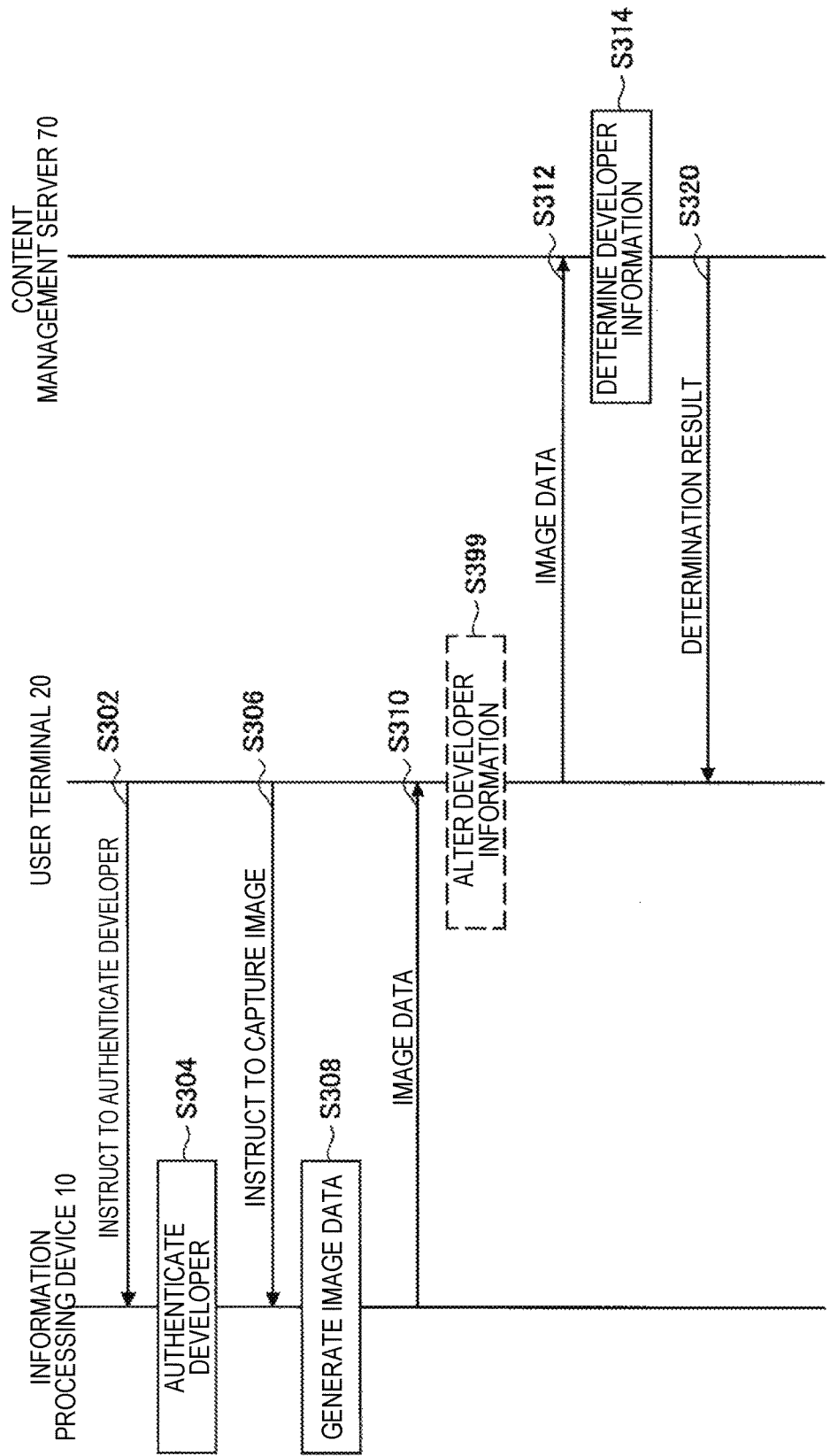
FIG. 20 is a sequence diagram showing an example of a series of operations of the information processing system of Example 1 of the embodiment.

Next, the flow of a series of operations of the information processing system of Variation 1 will be described with reference to FIG. 20. FIG. 20 is a sequence diagram showing an example of a series of operations of the information processing system of Example 1. Note that the example shown in FIG. 20 indicates a case where an API in the information processing device 10 is used by execution of an application d10 installed in the user terminal 20 so that image data is acquired as a content by the information processing device 10.

(Steps S302 and S304)

When the application d10 is executed in the user terminal 20, a process involved in authentication of a developer is initially executed in the information processing device 10. Specifically, the information processing device 10 determines whether or not the developer of the application d10 is a developer who has made an advance request for authorization for use, and based on the determination result, controls access to an API in the information processing device 10. Also, at this time, the information processing device 10 stores the developer identification information of the developer that the information processing device 10 has determined is a developer who has made an advance request for authorization for use. Note that the process involved in the authentication of the developer is similar to that which has been described above with reference to FIG. 11, and will not be described in detail.

(Step S306)

When the process involved in the developer authentication has been completed to permit access to an API whose use is limited, the user terminal 20 controls an operation of the information processing device 10 by accessing the permitted API. Here, it is assumed that the user terminal 20 instructs the information processing device 10 to capture an image by accessing the API whose use is limited.

(Step S308)

The information processing device 10, when receiving the instruction involved in image capture from the user terminal 20 based on execution of the application d10, captures an image d72, and generates image data (i.e., a content) d70 based on the captured image d72.

The information processing device 10 also generates encrypted information d76 by encrypting the developer information d74 indicated by the developer identification information which is stored during the authentication of the developer. Thereafter, the information processing device 10 causes the developer information d74 and the encrypted information d76 as attribute information to accompany the image data d70.

(Step S310)

The information processing device 10 outputs the image data d70 accompanied by the developer information d74 and the encrypted information d76 to the user terminal 20.

(Step S399)

Here, it is assumed that the application d10 has accessed an API of the information processing device 10 while pretending to be another developer who is authorized to use the API, and the developer information d74 in the image data d70 has been altered into the developer information d74a by the process of the application d10. Note that the image data d70 for which the developer information d74 has been altered into the developer information d74a may hereinafter be referred to as the "image data d70a."

(Step S312)

The user terminal 20 uploads the image data d70 which has been acquired from the information processing device 10 based on execution of the application d10, to the content management server 70. Here, it is assumed that the image data d70a for which the developer information d74 in the image data d70 has been altered into the developer information d74a by the application d10, is uploaded to the content management server 70.

(Step S314)

The content management server 70, when acquiring the image data d70a from the user terminal 20, compares the developer information d74a accompanying the image data d70a with the encrypted information d76, based on the previously stored key information. At this time, the encrypted information d76 is generated based on the developer information d74 before alteration, and therefore, the result of the comparison with the altered developer information d74a indicates a mismatch, and therefore, based on the comparison result, the content management server 70 detects the unauthorized use of an API by a developer who pretends to be another developer who is authorized to use the API.

(Step S316)

The content management server 70, when detecting the unauthorized use of an API by a developer who pretends to be another developer who is authorized to use the API, notifies the user u20 via the user terminal 20 that the application which has been used to acquire the content d70 is an unauthorized application. As a result, the user u20 can recognize that the application which has been used to acquire the content d70a uploaded to the content management server 70 is an unauthorized application.

Also, the content management server 70, when detecting the unauthorized use of an API by a developer who pretends to be another developer who is authorized to use the API, may record a developer indicated by the altered developer information d74a to the blacklist d80 for management. With such a configuration, for example, the administrator (or a party involved in a camera maker) of the content management server 70 can identify a developer who pretends to be the developer of the developer information d74, i.e., a developer who uses an API without authorization while pretending to be another developer who is authorized to use the API, by referencing the blacklist d80.

As described above, in the information processing system of Variation 1, the information processing device 10 causes the developer information of a developer who it has been determined is a developer who has made an advance request for authorization for use, and encrypted information obtained by encrypting the developer information, as attribute information, to accompany an acquired content. At this time, it is difficult to alter the developer information indicated in the encrypted information unless the developer information has key information used during the encryption and key information for decryption corresponding to that key information. Therefore, according to the information processing system of Variation 1, even when developer information accompanying a content is altered, the alteration of the developer information, and the unauthorized use of an API by a developer who pretends to be another developer who is authorized to use the API, can be detected based on comparison with the encrypted information.

Note that, in the foregoing, an example in which the content management server 70 detects the unauthorized use of an API by a developer who pretends to be another developer who is authorized to use the API, has been described. The process involved in the detection may not be necessarily performed by the content management server 70. Note that, of course, when a configuration other than the content management server 70 detects the unauthorized use of an API by a developer who pretends to be another developer who is authorized to use the API, the configuration needs to store key information for processing encrypted information (i.e., the key information k30, or key information for decryption corresponding to the key information k30).

5.2. Example 2: A Second Example in which Developer Information is Recorded as Attribute Information of a Content Next, an information processing system according to Example 2 will be described. In Example 1 above, a scheme example of detecting the unauthorized use of an API by a developer who pretends to be another developer who is authorized to use the API, where developer information and encrypted information are caused as attribute information to accompany a content, has been described. In Example 2, a scheme example of detecting the unauthorized use of an API by a developer who pretends to be another developer who is authorized to use the API, where only developer information is caused as attribute information to accompany a content (i.e., encrypted information does not accompany), will be described. An overview of the information processing system of Example 2 will now be described with reference to FIG. 21.

Figure 21:
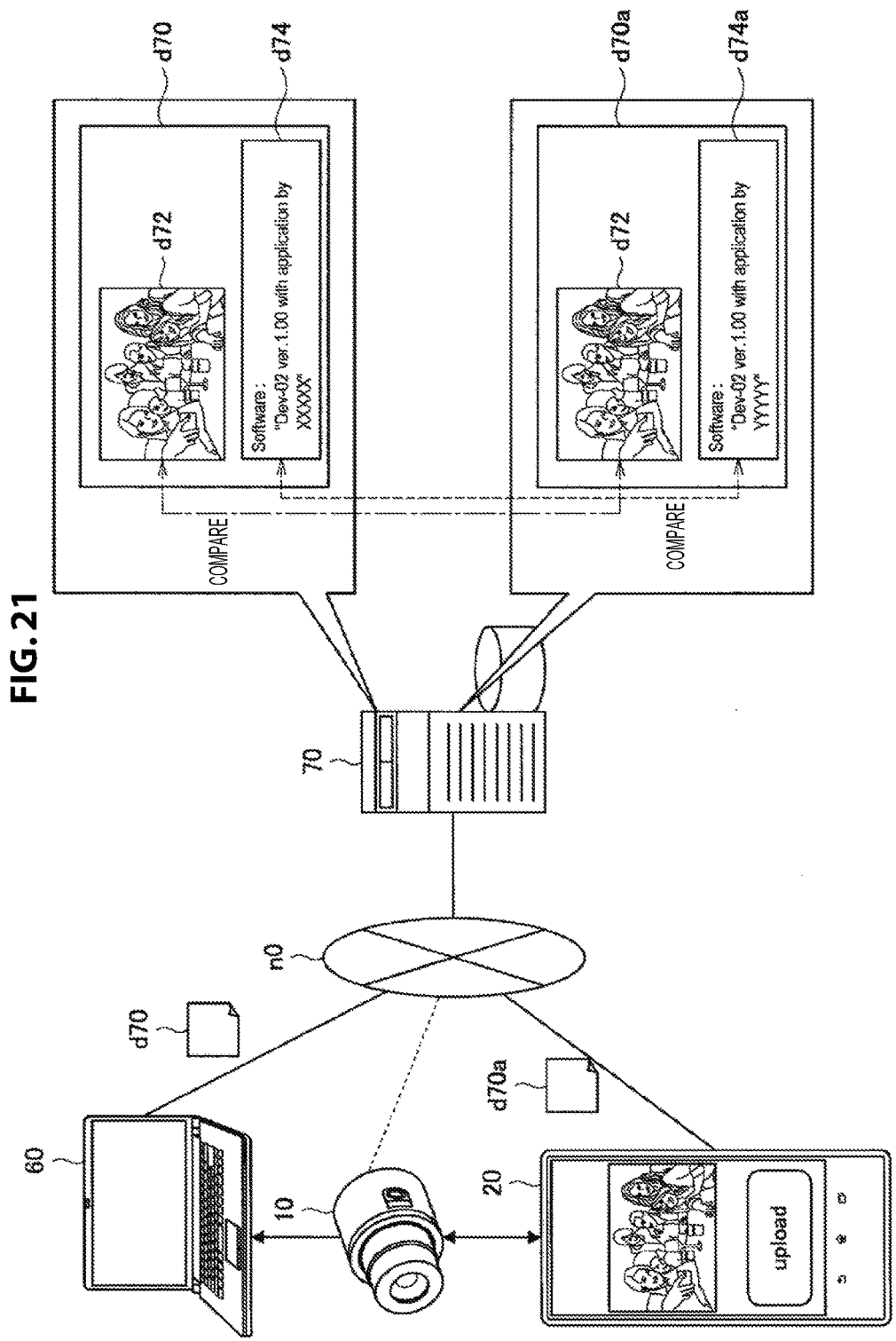
FIG. 21 is a diagram for describing an overview of an information processing system according to Example 2 of the embodiment.

FIG. 21 shows an example in which a content d70 acquired by the information processing device 10 based on execution of an application in the user terminal 20, is uploaded to the content management server 70 from the user terminal 20 and a terminal 60 different from the user terminal 20. Note that the terminal 60 shows a terminal different from the user terminal 20, such as a personal computer (PC) etc.

For example, the terminal 60 acquires a content d70 recorded in a portable medium by the information processing device 10 reading the content d70 from the portable medium, and uploads the acquired content d70 to the content management server 70 via a network n0. Also, when the information processing device 10 can access the network n0, the information processing device 10 itself may upload the content d70 to the content management server 70.

For example, the content management server 70, when acquiring the content d70 from the terminal 60, checks whether or not a content containing the same image as the image d72 contained in the content d70 has already been acquired.

Here, it is assumed that, in the user terminal 20, an application has altered the developer information d74 in the content d70 into the developer information d74a, and uploaded the altered content d70a from the user terminal 20 to the content management server 70. In this case, the content management server 70 extracts the content d70a, and compares the extracted content d70a with the content d70 acquired from the terminal 60, in terms of developer information accompanying as attribute information.

At this time, as in the example of FIG. 21, when, in the user terminal 20, an application has altered the developer information d74 into the developer information d74a, the result of comparison of developer information by the content management server 70 indicates a mismatch.

In other words, when the result of comparison of developer information indicates a mismatch, the developer information d74 has been altered for at least one of the contents d70 and d70a thus compared. Therefore, when the result of comparison of developer information indicates a mismatch, the content management server 70 can recognize that the unauthorized use of an API by a developer who pretends to be another developer who is authorized to use the API may have been performed during acquisition of the image d72.

Note that when the result of comparison of developer information indicates a mismatch, the content management server 70 may notify one or both of the senders of the contents d70 and d70a compared (i.e., the terminal 60 and the user terminal 20) that the content may have been acquired by an unauthorized application.

As described above, in the information processing system of Variation 2, the content management server 70, when acquiring the content d70 containing the same image d72 as that of a content already acquired, compares developer information of the contents. At this time, when the result of comparison of developer information indicates a mismatch, the developer information of at least one of the contents compared has been altered. Therefore, according to the information processing system of Variation 2, by comparing the developer information of different contents having the same image, an alteration to the developer information, and the unauthorized use of an API by a developer who pretends to be another developer who is authorized to use the API, can be detected.

Although, in the foregoing, an example in which the content d70 is image data containing the image d72 has been described, the type of the content d70 is not limited to image data as described above, if real data of a content can be compared as with the image d72. For example, the content d70 may be audio data containing audio information as real data.

Figure 22:
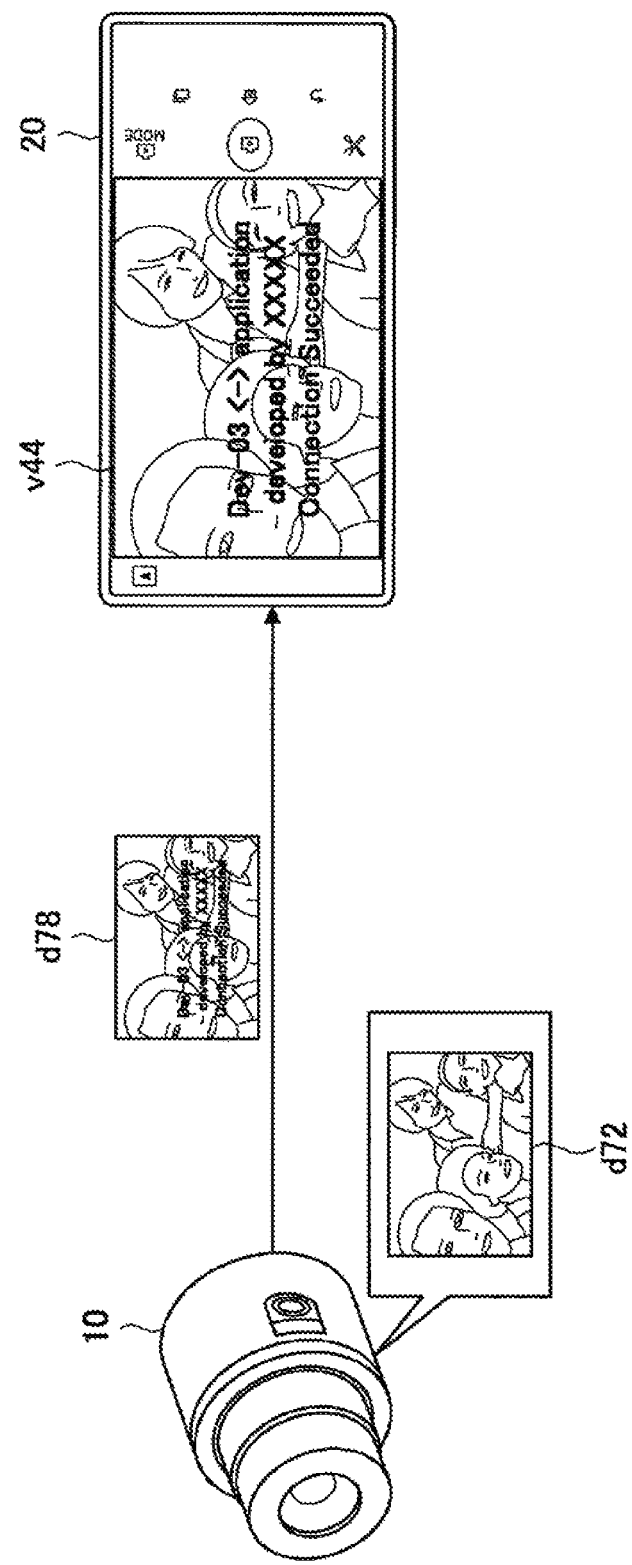
FIG. 22 is a diagram for describing an overview of an information processing system according to Example 3 of the embodiment.

5.3. Example 3: An Example in which Developer Information is Superimposed on a Preview Image Next, as Example 3, a scheme example of detecting the unauthorized use of an API by a developer who pretends to be another developer who is authorized to use the API, where a preview image is acquired as a content during acquisition of image data, and developer information is superimposed and displayed on the preview image, will be described. For example, FIG. 22 is a diagram for describing an overview of an information processing system according to Example 3. Note that as used herein, the "preview image" refers to an image acquired or generated separately from image data captured according to the user's capture instruction, such as a live view image updated in real time.

As shown in FIG. 22, in the information processing system of Example 3, the information processing device 10, when receiving an instruction involved in displaying of a preview image from the user terminal 20 during image capture of the image d72, superimposes developer information onto a generated preview image d78. As a result, the user u20 can check developer information which has been determined during use of an API in the information processing device 10, through a preview image v44 displayed on a display unit 206 of the user terminal 20.

Note that the information processing device 10 may randomly change the position or time where or when the developer information is superimposed on the preview image d78.

Figure 23:
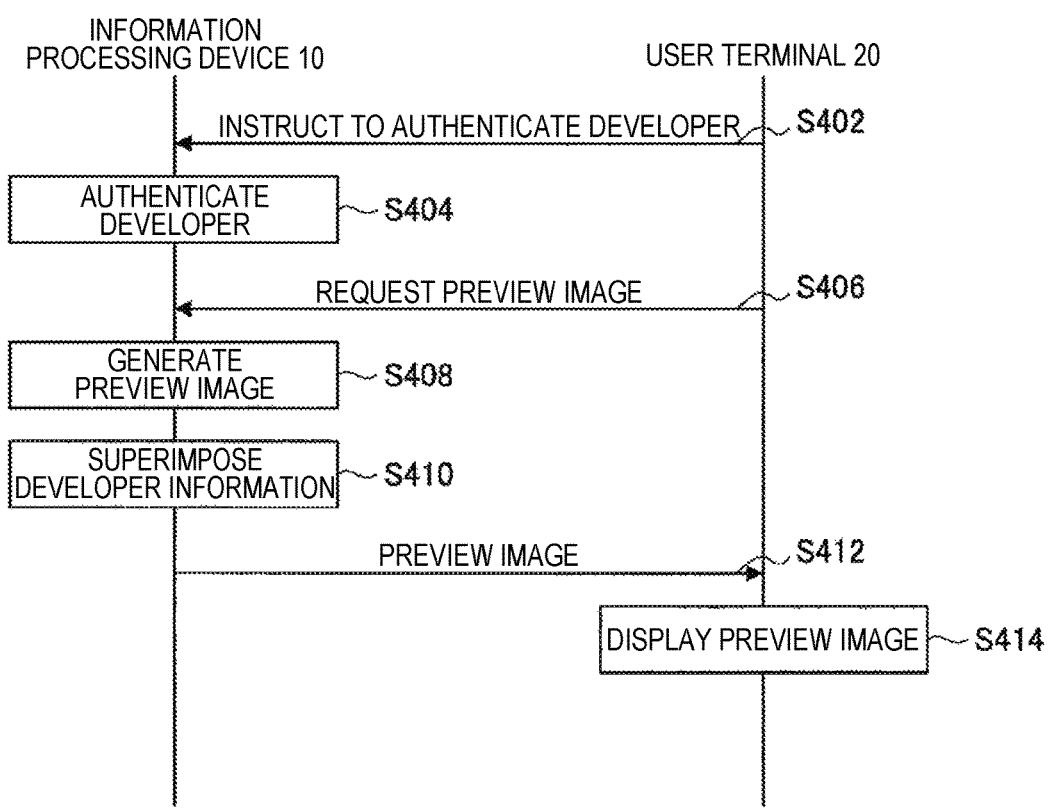
FIG. 23 is a sequence diagram showing an example of a series of operations of the information processing system of Example 3 of the embodiment.

Next, the flow of a series of processes of the information processing system of Example 3 will be described with reference to FIG. 23. FIG. 23 is a sequence diagram showing an example of the series of processes of the information processing system of Example 3. Note that the example shown in FIG. 23 indicates a case where an API in the information processing device 10 is used by execution of an application d10 installed in the user terminal 20 so that the information processing device 10 acquires a preview image as a content.

(Steps S402 and S404)

When the application d10 is executed in the user terminal 20, a process involved in authentication of a developer is initially executed in the information processing device 10. Specifically, the information processing device 10 determines whether or not the developer of the application d10 is a developer who has made an advance request for authorization for use, and based on the determination result, controls access to an API in the information processing device 10. Also, at this time, the information processing device 10 stores the developer identification information of a developer that it has been determined is a developer who has made an advance request for authorization for use. Note that the process involved in authentication of a developer is similar to that which has been described with reference to FIG. 11 and therefore will not be described in detail.

(Step S406)

When the process involved in authentication of a developer has been completed to permit access to an API whose use is limited, the user terminal 20 accesses the permitted API to control an operation of the information processing device 10. Here, it is assumed that the user terminal 20 accesses an API whose use is limited, and instructs the information processing device 10 to present a preview image.

(Step S408)

The information processing device 10, when receiving an instruction to present a preview image from the user terminal 20 based on the execution of the application d10, captures a preview image d78. Note that, at this time, the information processing device 10 nay capture an image d72, and generates the preview image d78 based on the captured image d72.

(Step S410)

Next, the information processing device 10 extracts the developer identification information which has been stored during authentication of a developer, and superimposes developer information indicated by the extracted developer identification information onto the generated preview image d78.

(Step S412)

Thereafter, the information processing device 10 outputs the preview image d78 on which the developer information is superimposed, to the user terminal 20. Note that, at this time, the information processing device 10 may change the position or time where or when the developer information is superimposed on the preview image d78.

(Step S414)

In response to the instruction to present a preview image, the user terminal 20 acquires the preview image d78 from the information processing device 10, and causes the display unit 206 (e.g., a display) to display the acquired preview image d78. As a result, the user u20 can check information of a developer (i.e., a developer who has made an advance request for authorization for use) for which the determination has been performed during the use of an API in the information processing device 10, through the preview image v44 displayed on the user terminal 20.

As described above, in the information processing system of Example 3, the information processing device 10 superimposes developer information on a generated preview image. As a result, the user u20 can check information of a developer for which the determination has been performed during the use of an API in the information processing device 10, through the preview image displayed on the display unit 206 of the user terminal 20.

Here, when an application installed in the user terminal 20 uses an API without authorization while pretending to be another developer who is authorized to use the API, the user u20 checks information of a developer who is different from a developer indicated during downloading of the application. In other words, in the information processing system of Example 3, even when an application uses an API without authorization while pretending to be another developer who is authorized to use the API, such a scheme can be used to cause the user using the application to be aware of the pretending.

Note that, in the information processing system of Example 3, as described above, the information processing device 10 superimposes developer information onto a preview image. With such a configuration, in the information processing system of Example 3, it is necessary to, for example, subject a preview image to image processing in order to alter developer information superimposed on a preview image in an application, and therefore, it is difficult to alter developer information.

Also, when the information processing device 10 changes the position or time where or when developer information is superimposed on a preview image, it is substantially difficult for an application to identify the position or time where or when the developer information is superimposed. Therefore, in the information processing system of Example 3, it is considerably difficult for an application to alter developer information which is superimposed on a preview image. By using the above scheme, the information processing system of Example 3 can detect and deter the unauthorized use of an API by a developer who pretends to be another developer who is authorized to use the API.

5.4. Example 4: An Example in which Developer Information is Superimposed on Real Image Next, an information processing system according to Example 4 will be described. In the information processing system of Example 3, a preview image is acquired as a content, and developer information is superimposed and displayed on the preview image. In the information processing system of Example 4, a scheme example of detecting the unauthorized use of an API by a developer who pretends to be another developer who is authorized to use the API, where a captured image (e.g., a real image) is a content, and developer information is superimposed and displayed on the real image, will be described. For example, FIG. 24 is a diagram for describing an overview of the information processing system of Example 4.

Figure 24:
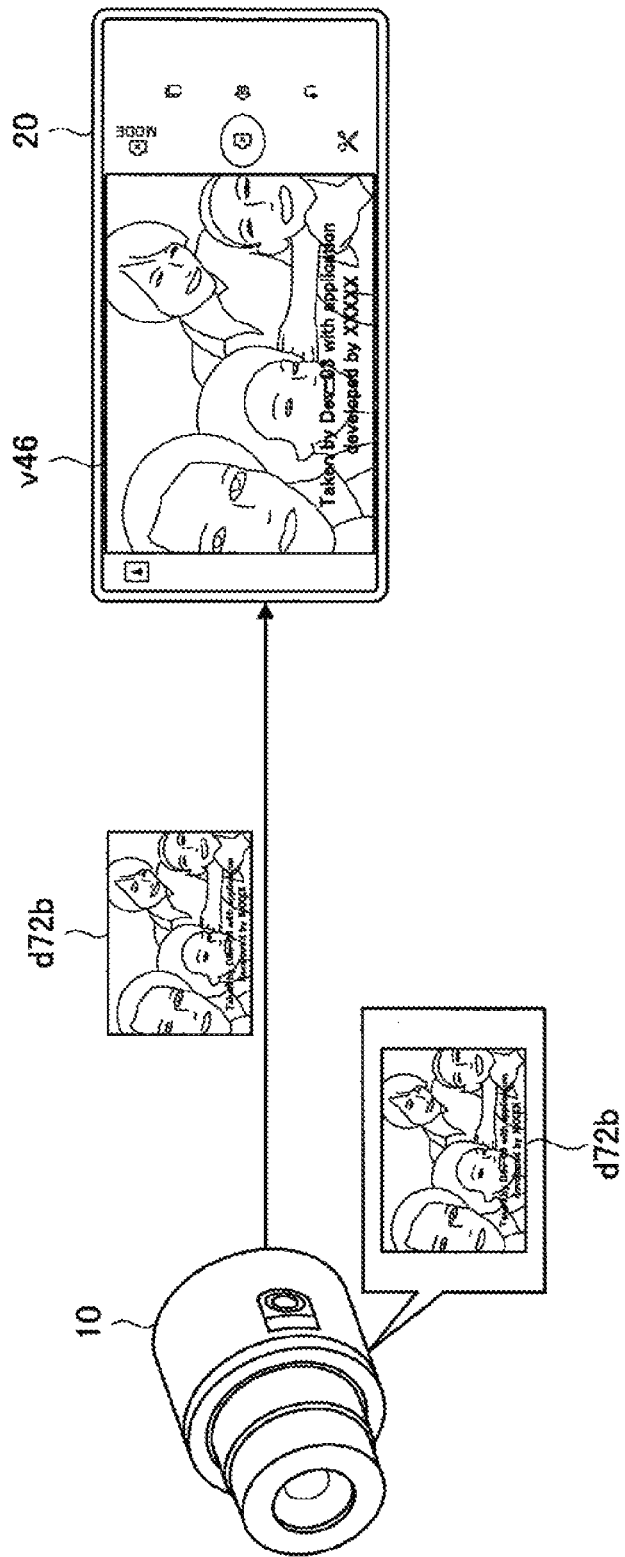
FIG. 24 is a diagram for describing an overview of an information processing system according to Example 4 of the embodiment.

As shown in FIG. 24, in the information processing system of Example 4, the information processing device 10, when receiving an instruction to capture an image d72 from the user terminal 20, superimposes developer information onto the capture image d72 (i.e., a real image). Thereafter, the information processing device 10 outputs the image d72 on which the developer information is superimposed (may hereinafter be referred to as the "image d72b") to the user terminal 20. With such a configuration, the user u20 can check information of a developer for which the determination has been performed during the use of an API in the information processing device 10, for example, through an image v46 displayed on the display unit 206 of the user terminal 20, by referencing the acquired image d72b.

Note that the information processing device 10 may store the image d72b on which developer information is superimposed, in the content storage unit 110 (e.g., a portable medium etc.).

Also, the image d72 is not limited to a still image and may be a moving image. When the image d72 is acquired as a moving image, the information processing device 10 may superimpose developer information onto a portion (e.g., the last frame) of the frames contained in the moving image, for example.

Figure 25:
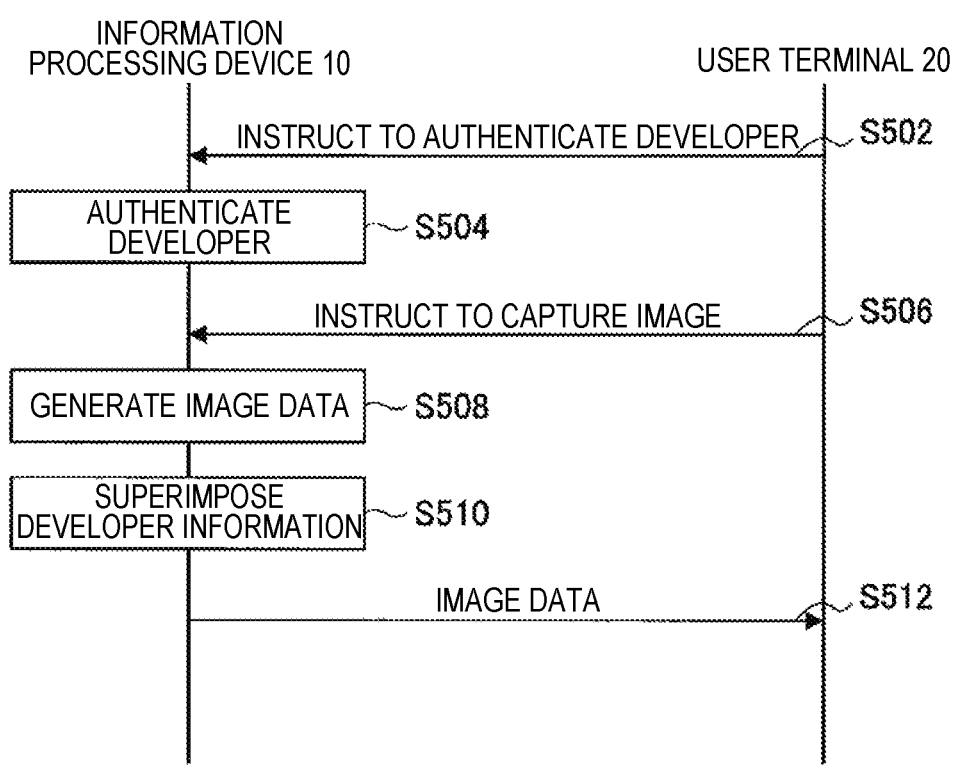
FIG. 25 is a sequence diagram showing an example of a series of operations of the information processing system of Example 4 of the embodiment.

Next, the flow of a series of operations of the information processing system of Example 4 will be described with reference to FIG. 25. FIG. 25 is a sequence diagram showing an example of the series of operations of the information processing system of Example 4. Note that, in the example shown in FIG. 25, an application d10 installed in the user terminal 20 is executed so that an API in the information processing device 10 is used, and the information processing device 10 acquires an image (real image) as a content.

(Steps S502 and S504)

When the application d10 is executed in the user terminal 20, a process involved in authentication of a developer is initially executed in the information processing device 10. Note that the operation involved in authentication of a developer is similar to that of Example 3 (see FIG. 23) and therefore will not be described in detail.

(Step S506)

When the process involved in authentication of a developer has been completed to permit access to an API whose use is limited, the user terminal 20 accesses the permitted API to control an operation of the information processing device 10. Here, it is assumed that the user terminal 20 accesses an API whose use is limited, and instructs the information processing device 10 to capture an image.

(Step S408)

The information processing device 10, when receiving an instruction to capture an image from the user terminal 20 based on execution of the application d10, captures an image d72.

(Step S410)

Next, the information processing device 10 extracts the developer identification information which has been stored during authentication of a developer, and superimposes developer information indicated by the extracted developer identification information onto the captured image d72.

(Step S412)

Thereafter, the information processing device 10 outputs the image d72 on which the developer information is superimposed, to the user terminal 20. Note that, at this time, the information processing device 10 may store the image d72b to the content storage unit 110 (e.g., a portable medium etc.).

With such a configuration, the user u20 can check information of a developer for which the determination has been performed during the use of an API in the information processing device 10, for example, through an image v46 displayed on the display unit 206 of the user terminal 20, by referencing the acquired image d72b.

As described above, in the information processing system of Example 4, the information processing device 10 superimposes developer information onto a captured image. As a result, the user u20 can check information of a developer for which the determination has been performed during the use of an API in the information processing device 10, through an image displayed on the display unit 206 of the user terminal 20, for example.

Here, when an application installed in the user terminal 20 uses an API without authorization while pretending to be another developer who is authorized to use the API, the user u20 checks information of a developer who is different from a developer indicated during downloading of the application. In other words, in the information processing system of Example 4, even when an application uses an API without authorization while pretending to be another developer who is authorized to use the API, such a scheme can be used to cause the user using the application to be aware of the pretending.

Note that, in the information processing system of Example 4, as described above, the information processing device 10 superimposes developer information onto an image. With such a configuration, in the information processing system of Example 4, for example, it is necessary for an application to subject an image to image processing in order to alter developer information superimposed on the image, and therefore, it is difficult to alter developer information. By using the above scheme, the information processing system of Example 4 can detect and deter the unauthorized use of an API by a developer Who pretends to be another developer who is authorized to use the API.

Figure 26:
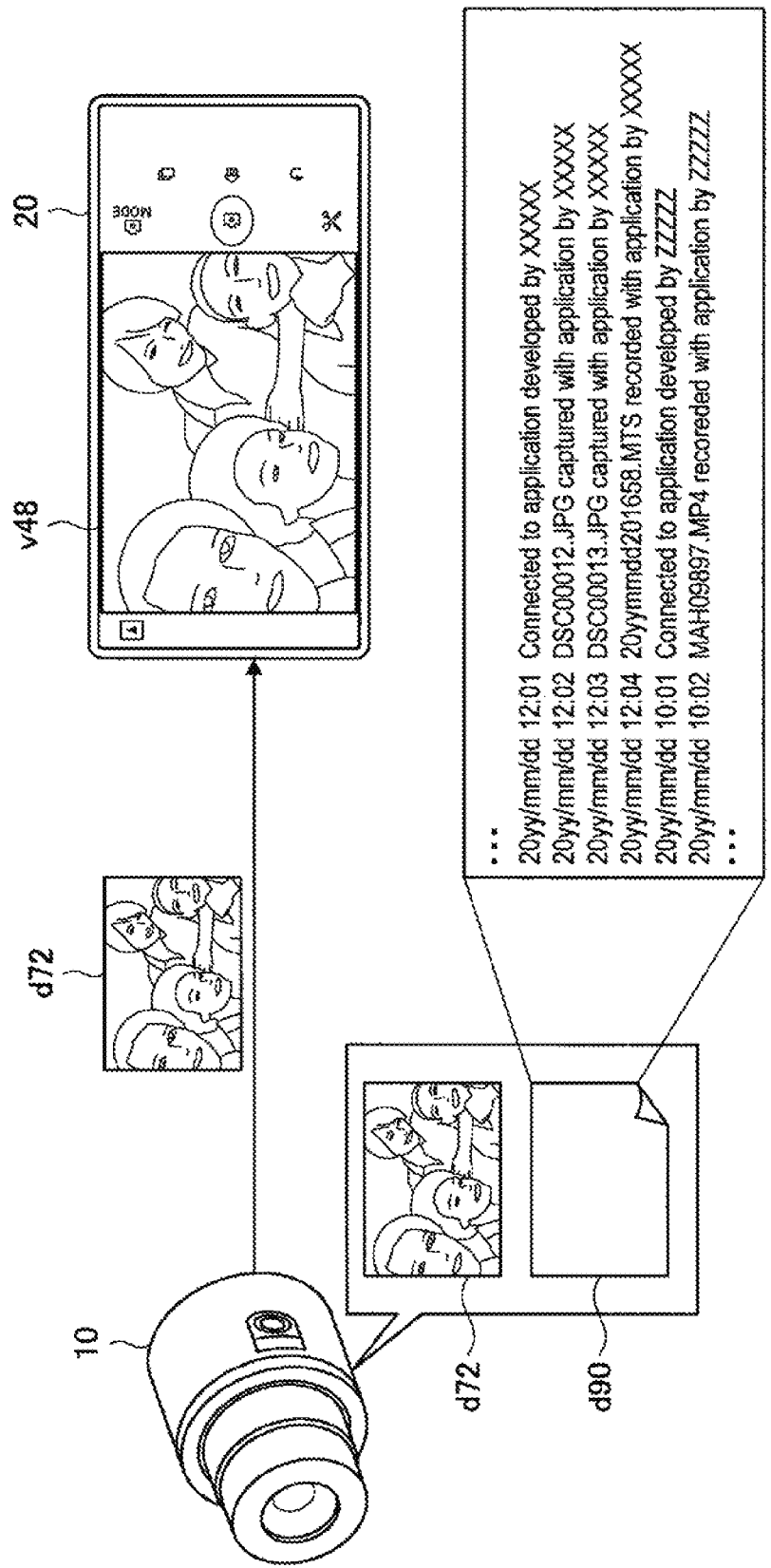
FIG. 26 is a diagram for describing an overview of an information processing system according to Example 5 of the embodiment.

5.5. Example 5: An Example in which Developer Information is Recorded as History Information Next, as Example 5, a scheme example of detecting the unauthorized use of an API by a developer who pretends to be another developer who is authorized to use the API, where an acquired content is associated with history information about acquisition of the content or connection between the information processing device 10 and the user terminal 20, will be described. For example, FIG. 26 is a diagram for describing an overview of an information processing system according to Example 5. Note that the example shown in FIG. 26 indicates a case where an image d72 is acquired as a content.

As shown in FIG. 26, in the information processing system of Example 5, the information processing device 10, when capturing the image d72 according to an instruction of an application installed in the user terminal 20, records history information of each process to, for example, management data d90. At this time, the information processing device 10 embeds, in the history information recorded in the management data d90, the developer information of a developer that it has been confirmed has made an advance request for authorization for use. Also, the information processing device 10 may additionally embed, in the history information about acquisition of the image d72, information indicating the image d72 (e.g., identification information).

With such a configuration, for example, as indicated by reference sign v48, even when the image d72 captured by the information processing device 10 is transmitted to the user terminal 20 and displayed on the display unit 206 of the user terminal 20, the management data d90 itself is managed by the information processing device 10. Therefore, for example, even when an application in the user terminal 20 alters the developer information associated with the image d72, a developer who has been used in accessing an API (i.e., a developer who has made an advance request for authorization for use) can be checked by referencing the management data d90.

Figure 27:
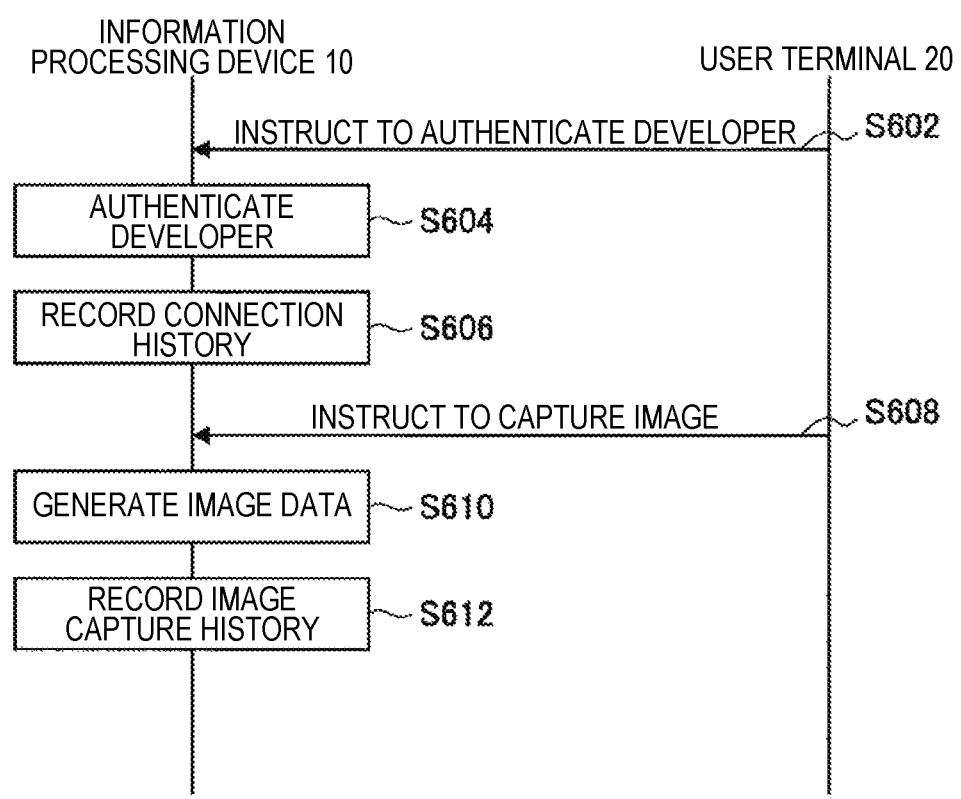
FIG. 27 is a sequence diagram showing an example of a series of operations of the information processing system of Example 5 of the embodiment.

Next, the flow of a series of operations of the information processing system of Example 5 will be described with reference to FIG. 27. FIG. 27 is a sequence diagram showing an example of the series of operations of the information processing system of Example 5. Note that, in the example shown in FIG. 27, an API in the information processing device 10 is used by execution of an application d10 installed in the user terminal 20, and image data is acquired as a content by the information processing device 10.

(Step S602 and S604)

When the application d10 is executed in the user terminal 20, a process involved in authentication of a developer is initially executed in the information processing device 10. Note that the operation involved in authentication of a developer is similar to that of Example 3 (see FIG. 23) and therefore will not be described in detail.

(Step S606)

When the process involved in authentication of a developer has been completed, the information processing device 10 generates history information about the process, and embeds, in the history information, the developer information of a developer that it has been confirmed has made an advance request for authorization for use. Thereafter, the information processing device 10 records the history information in which the developer information is embedded, to the management data d90.

(Step S608)

When the process involved in authentication of a developer has been completed to permit access to an API whose use is limited, the user terminal 20 accesses the permitted API to control an operation of the information processing device 10. Here, it is assumed that the user terminal 20 accesses an API whose use is limited, and instructs the information processing device 10 to capture an image.

(Step S610)

The information processing device 10, when receiving an instruction to capture an image from the user terminal 20 based on the execution of the application d10, captures an image d72.

(Step S612)

After completing the capture of the image d72, the information processing device 10 generates history information about the capture of the image d72, and embeds, in the history information, information indicating the image d72 and the developer information of a developer that it has been confirmed has made an advance request for authorization for use. Thereafter, the information processing device 10 records the history information in which the developer information is embedded, to the management data d90.

Thus, the captured d72 is associated with the history information recorded in the management data d90.

Note that the management data d90 is data different from contents managed by the information processing device 10, and is not limited to data for managing history information, if the management data d90 is data in which information about the contents is recorded.

As described above, in the information processing system of Example 5, the information processing device 10. When executing a process involved in acquisition of a content, embeds, in history information about the process, developer information indicating a developer that it has been confirmed has made an advance request for authorization for use, and records the history information to the management data d90.

With such a configuration, for example, even if the user terminal 20 alters developer information associated with a content, a developer who has been used in accessing an API (i.e., a developer who has made an advance request for authorization for use) can be checked by referencing the management data d90 managed by the information processing device 10.

Figure 28:
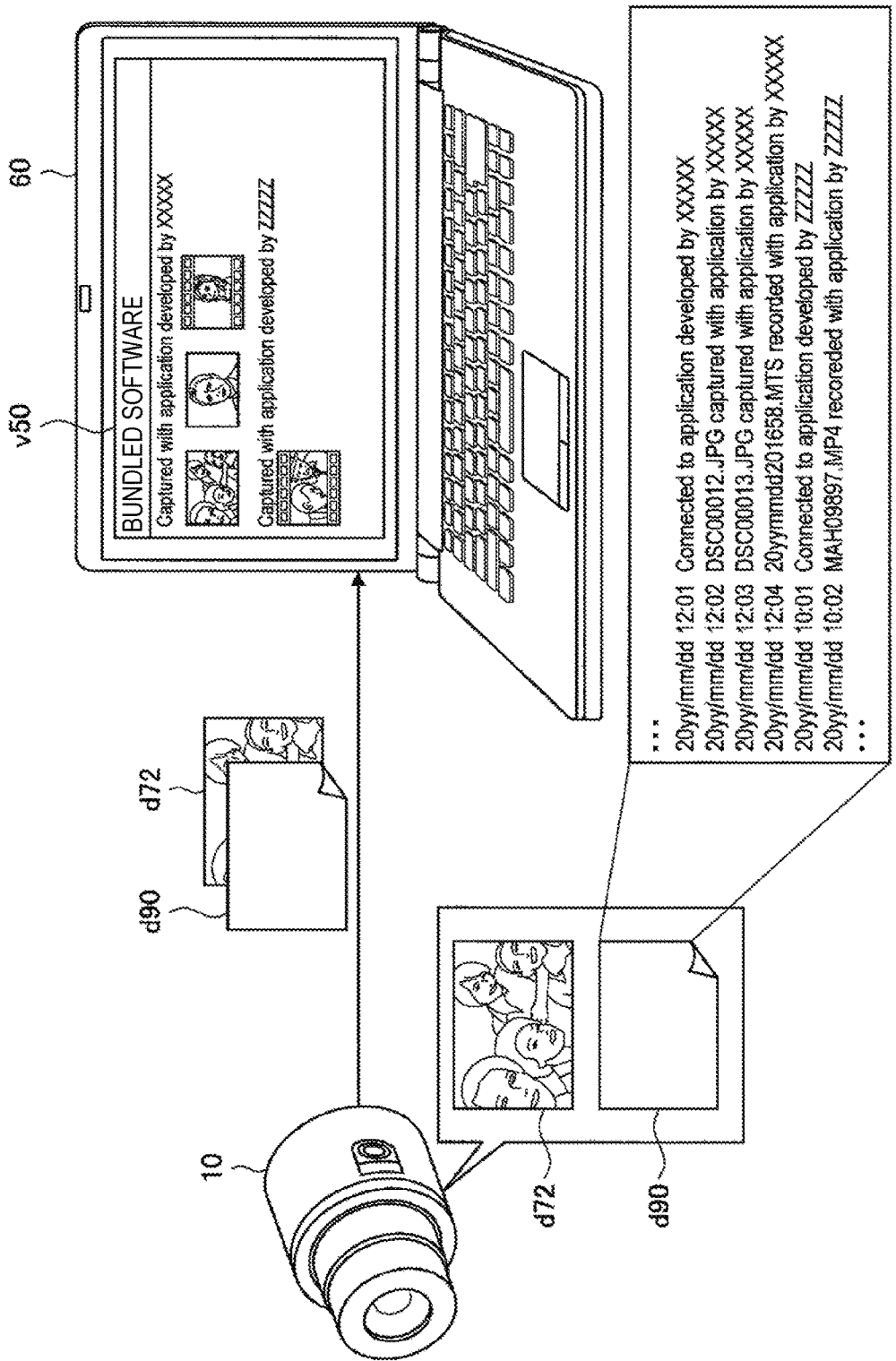
FIG. 28 is a diagram for describing an overview of an information processing system according to Example 6 of the embodiment.

5.6. Example 6: An Example in which Developer Information Recorded as History Information is Displayed Next, a scheme example of detecting the unauthorized use of an API by a developer who pretends to be another developer who is authorized to use the API, where when a content recorded in the information processing device 10 is referenced by the terminal 60, such as a PC, developer information recorded in the management data d90 as shown in Example 5 is presented, will be described. For example, FIG. 28 is a diagram for describing an overview of the information processing system of Example 5. Note that the example shown in FIG. 28 indicates a case where an image d72 is acquired as a content.

In the example shown in FIG. 28, the image d72 acquired by the information processing device 10 is transferred together with the management data d90 to the terminal 60. Note that the transfer of the image d72 and the management data d90 from the information processing device 10 to the terminal 60 may, for example, be carried out by communication via a network, or movement of data via a portable medium.

The terminal 60, when acquiring the image d72 and the management data d90, finds history information about acquisition of the image d72 from the management data d90, and extracts developer information embedded in the found history information. Thereafter, as indicated by reference sign v80, the terminal 60 presents the acquired image d72 in association with the developer information extracted from the history information.

Figure 29:
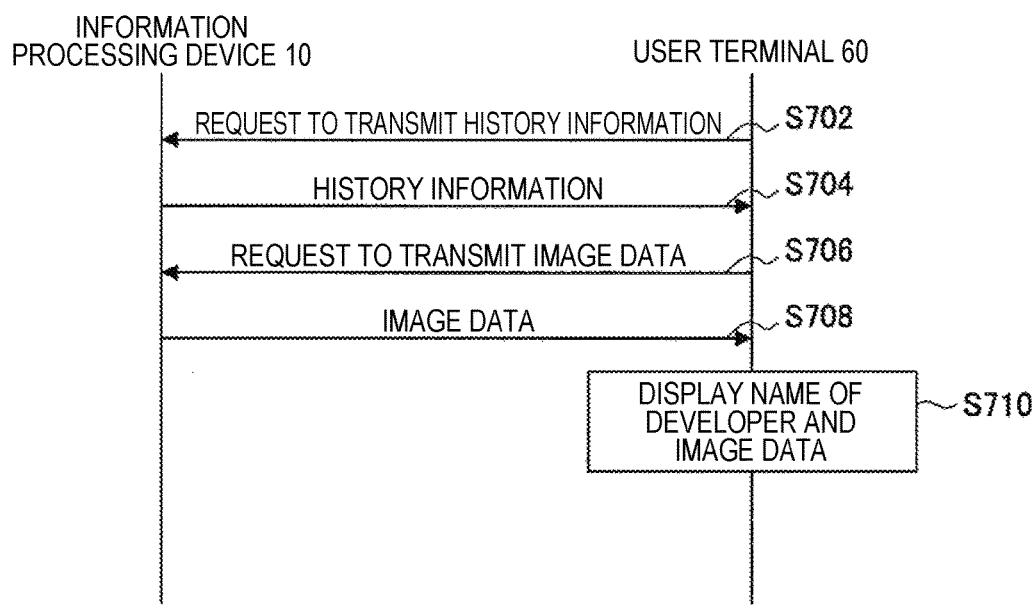
FIG. 29 is a sequence diagram showing an example of a series of operations of the information processing system of Example 6 of the embodiment.

Next, the flow of a series of operations of the information processing system of Example 6 will be described with reference to FIG. 29. FIG. 29 is a sequence diagram showing an example of the series of operations of the information processing system of Example 6. Note that, in the example shown in FIG. 29, an API in the information processing device 10 is used by execution of an application d10 installed in the user terminal 20 so that an image acquired by the information processing device 10 is displayed on the terminal 60.

(Steps S702 and S704)

The information processing device 10, when requested by the terminal 60 to transmit the management data d90 in which history information is recorded (step S702), transmits the management data d90 to the terminal 60 according to the request (step S704).

(Steps S706 and S708)

Next, the information processing device 10, when requested by the terminal 60 to transmit the image d72 recorded in the information processing device 10 (step S706), transmits the image d72 to the terminal 60 according to the request (step S708).

(Step S710)

The terminal 60, when acquiring the image d72 and the management data d90, finds history information about acquisition of the image d72 from the management data d90, and extracts developer information embedded in the found history information. Thereafter, the terminal 60 presents the acquired image d72 association with the developer information extracted from the history information.

Note that the above series of operations may, for example, be carried out by an application (e.g., an application provided by the maker of the information processing device 10) installed in the terminal 60.

As described above, in the image processing system of Example 6, the information processing device 10 transfers, to the terminal 60, the acquired image d72 together with the management data d90 in which history information involved in acquisition of the image d72 is recorded. Thereafter, the terminal 60 presents the acquired image d72 in association with developer information which is recorded as history information in the management data d90.

At this time, the presented developer information is information recorded in the management data d90 managed by the information processing device 10, and therefore, it is difficult for an application operating in the user terminal 20 to alter the developer information. In other words, according to the image processing system of Example 6, during acquisition of the image d72, the user u20 can check developer information (i.e., information of a developer who has made an advance request for authorization for use) used in accessing an API, and therefore, can detect the unauthorized use of an API by a developer who pretends to be another developer who is authorized to use the API.

Figure 30:
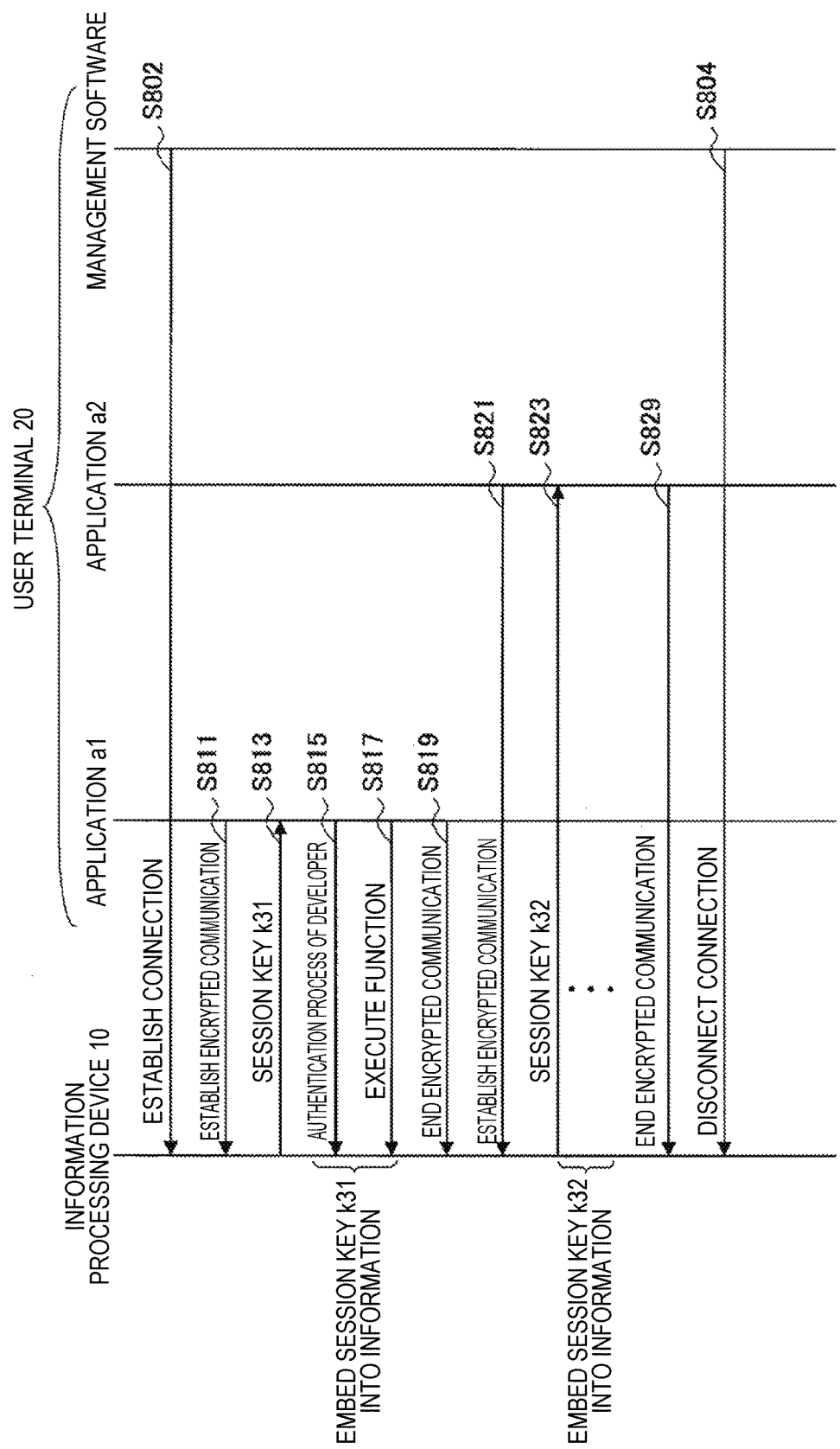
FIG. 30 is a sequence diagram showing an example of a series of operations of the information processing system of Example 7 of the embodiment.

5.7. Example 7: An Example in which a Plurality of Applications are Operated Next, as Example 7, an operation example in a case where an API in the information processing device 10 is accessed by each of a plurality of applications operated in the user terminal 20, will be described with reference to FIG. 30. FIG. 30 is a sequence diagram showing an example of a series of operations in the information processing system of Example 7, indicating an example of a case where encrypted communication is performed between the information processing device 10 and the user terminal 20 for each of the plurality of applications.

Note that, in this description, it is assumed that, as shown in FIG. 30, management software (e.g., an OS) establishes connection between the user terminal 20 and the information processing device 10, and applications a1 and a2 access an API in the information processing device 10 through the connection.

(Step S802)

Initially, connection (i.e., a communication channel) is established between the user terminal 20 and the information processing device 10 so that the user terminal 20 and the information processing device 10 exchange information with each other. In this case, for example, a connection request is transmitted from the management software of the user terminal 20 to the information processing device 10, and based on the connection request, connection is established between the user terminal 20 and the information processing device 10. Note that an example of the connection established between the user terminal 20 and the information processing device 10 is a wireless communication channel between devices, such as Wi-Fi.

(Step S811)

Next, an operation in a case where the application a1 accesses an API in the information processing device 10 will be described. Initially, the application a1 requests the information processing device 10 to establish an encrypted communication channel. The information processing device 10 establishes an encrypted communication channel between itself and the application a1 according to the request from the application a1. Note that examples of a technique for encrypting a communication channel include Secure Sockets Layer (SSL) and Transport Layer Security (TLS).

(Step S813)

After establishing the encrypted communication channel, the information processing device 10 issues a session key k31 to the application a1 via the established communication channel. Thereafter, the application a1 exchanges information with the information processing device 10 using the session key k31 issued from the information processing device 10 during a period of time when a communication channel is established between the application a1 and the information processing device 10.

(Step S815)

For example, the application a1, when executing a process involved in authentication of a developer, transmits the session key k31 together with authentication information to the information processing device 10 via the encrypted communication channel.

The information processing device 10 recognizes, based on the session key k31 transmitted from the application a1, that information or an instruction transmitted together with the session key k31 is transmitted from the application a1.

(Step S817)

The information processing device 10 may also execute a process involved in authentication of a developer based on authentication information transmitted from the application a1, and associates developer identification information transmitted as authentication information with the session key k31 for management.

With such a configuration, when an API is accessed by the application a1, the information processing device 10 can perform access control corresponding to developer identification information associated with the similar session key k31, based on the session key k31 transmitted together.

Note that the information processing device 10 continues the access control corresponding to the developer identification information associated with the session key k31 as long as the session key k31 is valid.

(Step S819)

Note that the information processing device 10, when instructed by the application a1 to end communication, disconnects the communication channel (i.e., the encrypted communication channel) between the information processing device 10 and the application a1. At this time, the information processing device 10 may invalidate (discard) the session key k31. The information processing device 10, when invalidating the session key k31, may also invalidate (discard) developer identification information which is associated with the session key k31 for management.

(Step S821)

Also, a case where the application a2 accesses an API in the information processing device 10 is similar to the case of the application a1. Specifically, the information processing device 10 receives a request from the application a2, and establishes an encrypted communication channel between the information processing device 10 and the application a2.

(Step S823)

After establishing the encrypted communication channel, the information processing device 10 also issues a session key to the application a2 via the established communication channel. Note that, at this time, the information processing device 10 issues, to the application a2, a session key k32 different from that for the application a1. Thereafter, the application a2 exchanges information with the information processing device 10 using the session key k32 issued from the information processing device 10 during a period of time when a communication channel is established between the application a2 and the information processing device 10.

(Step S829)

Thereafter, the information processing device 10, when instructed by the application a2 to end communication, disconnects the communication channel (i.e., the encrypted communication channel) between the information processing device 10 and the application a2. At this time, as in the case of the application a1, the information processing device 10 may invalidate (discard) the session key k32 and developer identification information which is associated with the session key k32 for management.

(Step S804)

Also, the information processing device 10, when receiving an instruction to disconnect the connection from the management software of the user terminal 20, disconnects the connection established between the user terminal 20 and the information processing device 10.

As described above, in the information processing system of Variation 7, the information processing device 10 issues different session keys for the different applications a1 and a2. Thereafter, the information processing device 10 identifies an application which is the sender of the information and the instruction, based on a session key which is transmitted together with the information and application from each application, and performs access control corresponding to the application.

Note that a session key corresponding to each application is issued from the information processing device 10 to the application via an encrypted communication channel, and therefore, it is difficult for another application to recognize the session key. Also, when a session key is not transmitted from an application or when a session key different from the session key issued to the application is transmitted, the information processing device 10 can also refuse an instruction from the application.

With such a configuration, in the information processing system of Variation 7, for example, in the user terminal 20, the process of a normal application can be protected from an application which uses an API without authorization while pretending to be another developer who is authorized to use the API.

6. HARDWARE CONFIGURATION

An embodiment of the present disclosure has been described above. The above information process performed by the information processing device 10 is achieved by cooperation with the following hardware of the information processing device 10.

Figure 31:
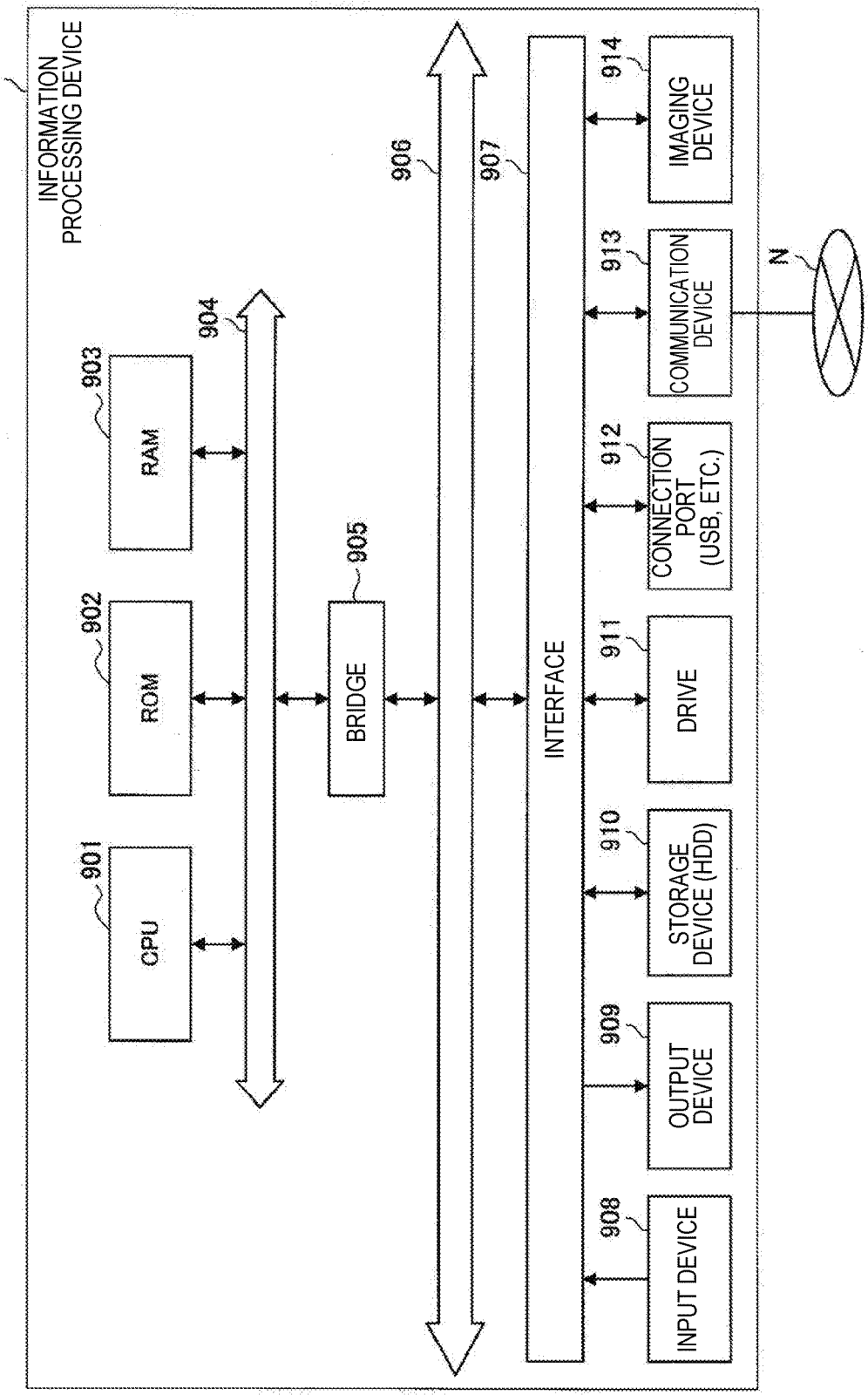
FIG. 31 is an explanatory diagram showing an example of a hardware configuration of an information processing device according to an embodiment of the present disclosure.

FIG. 31 is an explanatory diagram showing an example of a hardware configuration of the information processing device 10. As shown in FIG. 31, the information processing device 10 includes a central processing unit (CPU) 901, a read only memory (ROM) 902, a random access memory (RAM) 903, an input device 908, an output device 910, a storage device 911, a drive 912, a communication device 913, and an imaging device 914.

The CPU 901 functions as a calculation process device and a control device to control all operations in the information processing device 10 according to various programs. The CPU 901 may, for example, include a circuit for executing various calculation processes. Alternatively, the CPU 901 may be a microprocessor. The CPU 901 can carry out various functions according to various programs. For example, the processes of the processing unit 130, i.e., the authentication process unit 150 and the process execution unit 170, of the above information processing device 10 may be carried out by the CPU 901.

The ROM 902 stores programs, calculation parameters, etc. which are used by the CPU 901. The RAM 903 temporarily stores programs used in execution by the CPU 901, parameters changed when necessary during the execution, etc. These components are connected together by a host bus including a CPU bus etc.

The input device 908 includes an input unit for allowing the user to input information, such as a button, a switch etc., an input control circuit which generates an input signal based on the user's input and outputs the input signal to the CPU 901, etc. The user of the information processing device 10 can instruct the information processing device 10 to perform a process by operating the input device 908.

The output device 910 includes, for example, a display device, such as a liquid crystal display (LCD) device, an organic light emitting diode (OLED) device, a lamp, etc. The output device 910 also includes an audio output device, such as a loudspeaker, a headphone, etc. For example, the display device displays a captured image, a generated image, etc. On the other hand, the audio output device converts audio data etc. into sound, and outputs the sound. Note that the above notification unit 106 in the information processing device 10 may be implemented by the output device 910.

The storage device 911 is a device for storing data which is configured as an example storage unit of the information processing device 10 of this embodiment. The storage device 911 may include a storage medium, a recording device which records data to the storage medium, a reading device which reads data from the storage medium, an erasure device which erases data from the storage medium, etc. The storage device 911 stores programs executed by the CPU 901 and various items of data.

The drive 912 is a reader/writer for a storage medium, and is internal or external to the information processing device 10. The drive 912 reads information from a removable storage medium mounted therein, such as a magnetic disk, an optical disk, a magneto-optical disk, a semiconductor memory, etc., and outputs the information to the RAM 903. The drive 912 can also write information to a removable storage medium.

Note that the above key information storage unit 104, identification information storage unit 108, and content storage unit 110 in the information processing device 10 may be implemented by the RAM 903, the storage device 911, or a removable storage medium attached to the drive 912.

The communication device 915 is, for example, a communication interface including a communication device for connecting to a network N, etc. In particular, the communication device 915 of the embodiment of the present disclosure includes a wireless (local area network) LAN-compliant communication device. Note that the communication device 915 may include a long term evolution (LTE)-compliant communication device, or a wired communication device which performs communication via a wire. Note that the above communication unit 102 in the information processing device 10 may be implemented by the communication device 913.

The imaging device 914 has the function of capturing a still image or a moving image through a lens under the control of the CPU 901. The imaging device 914 may store a captured image to the storage device 911 or a removable storage medium attached to the drive 912. Note that the above content acquisition unit 190 in the information processing device 10 may be implemented by, for example, the imaging device 914.

The CPU 901, the ROM 902, and the RAM 903 are connected to each other via a bus 904. Also, the input device 908, the output device 910, the storage device 911, the drive 912, the communication device 913, and the imaging device 914 are connected to a bus 906 via an interface 907. The bus 90 and the bus 904 are connected together via a bridge 905. As a result, the CPU 901, the ROM 902, the RAM 903, the input device 908, the output device 910, the storage device 911, the drive 912, the communication device 913, and the imaging device 914 are connected to each other.

Note that network N is a wired or wireless transmission channel for information transmitted from a device connected to the network N. For example, the network N may include a public network such as the Internet, a telephone network, a satellite communication network, etc., various local area networks (LANs) such as Ethernet (registered trademark) etc., various wide area networks (WANs), etc. The network N may also include a dedicated network such as the Internet protocol-virtual private network (IP-VPN) etc.

The hardware configuration of FIG. 10 is only for illustrative purposes. The present disclosure is not limited to the hardware configuration of FIG. 10. Any hardware configuration may be employed that can achieve the operation of the information processing device 10 of the embodiment of the present disclosure.

A program for causing hardware such as a CPU, a ROM, a RAM etc. which are included in a computer to provide functions similar to those of components of the above information processing device can be created. A computer-readable storage medium storing the program may be provided.

7. CONCLUSION

As described above, according to the information processing device system of this embodiment, the information processing device 10 acquires developer identification information related to the application d10 from the user terminal 20, and controls execution of APIs, depending on whether or not a developer indicated by the acquired developer identification information is a developer who has made an advance request for authorization for use. With such a configuration, the information processing device 10 can limit the use of APIs, depending on developers.

Also, according to the information processing device system of this embodiment, the information processing device 10 associates an acquired content with the developer information of a developer that it has been determined has made an advance request for authorization for use. With such a configuration, the information processing device system of this embodiment can provide a scheme of detecting the unauthorized use of an API by a developer who pretends to be another developer who is authorized to use the API, based on developer information associated with a content, and thereby deter the unauthorized use.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally conic under the technical scope of the present disclosure.

In addition, the effects described in the present specification are merely illustrative and demonstrative, and not limitative. In other words, the technology according to the present disclosure can exhibit other effects that are evident to those skilled in the art along with or instead of the effects based on the present specification.

Additionally, the present technology may also be configured as below.

(1)

An information processing device including:

an acquisition unit configured to acquire developer identification information associated with an application program possessed by a user terminal, from the user terminal;

an authentication process unit configured to perform a process of authenticating a developer of the application program, based on the developer identification information;

a control unit configured to control execution of a function possessed by the information processing device, according to an instruction from the user terminal, after the authentication process; and a content processing unit configured to acquire a content based on the execution of the function, and associate the acquired content with information of the developer on which the authentication process has been performed.

(2)

The information processing device according to (1), wherein the content processing unit associates the content with the information of the developer by causing the information of the developer on which the authentication process has been performed to accompany the acquired content.

(3)

The information processing device according to (2), wherein the content processing unit associates the content with the information of the developer by causing encrypted information obtained by encrypting the information of the developer on which the authentication process has been performed to accompany the acquired content.

(4)

The information processing device according to (3), wherein the encrypted information associated with the content is information for determining whether or not the information of the developer accompanying the content has been altered.

(5)

The information processing device according to (2), wherein the content accompanied by the information of the developer is transmitted to the user terminal.

(6)

The information processing device according to any one of (1) to (5), wherein the content is image data, and wherein the content processing unit associates the image data with the information of the developer on which the authentication process has been performed, by superimposing the information of the developer on an image displayed based on the image data.

(7)

The information processing device according to (6), wherein the image displayed based on the image data is real data of an image contained in the image data.

(8)

The information processing device according to (6), wherein the image displayed based on the image data is a preview image based on real data of an image contained in the image data.

(9)

The image processing device according to any one of (1) to (8), wherein the content processing unit associates the content with the information of the developer on which the authentication process has been performed, by recording the information of the developer in management data associated with the content.

(10)

The image processing device according to (9), wherein the management data associated with the content is data for managing history involved in acquisition of the content.

(11)

The information processing device according to any one of (1) to (10), wherein the authentication process unit determines, based on the developer identification information, whether or not the developer of the application program is a developer who has made an advance request for authorization.

(12)

The information processing device according to (11), wherein when the developer of the application program indicated by the developer identification information is a developer who has made an advance request for authorization, the control unit controls execution of a function possessed by the information processing device, according to an instruction from the user terminal.

(13)

The image processing device according to any one of (1) to (12), including:

a notification control unit configured to identifiably notify of the developer of the application program indicated by the information of the developer on which the authentication process has been performed.

(14)

The image processing device according to (13), including:

an audio output unit configured to output audio information, wherein the notification control unit causes the audio output unit to output the information of the developer on which the authentication process has been performed, as audio information.

(15)

The image processing device according to (13), including:

a display unit, wherein the notification control unit causes the display unit to display the information of the developer on which the authentication process has been performed.

(16)

An information processing method including:

acquiring developer identification information associated with an application program possessed by a user terminal, from the user terminal;

causing a processor to perform a process of authenticating a developer of the application program, based on the developer identification information;

controlling execution of a function possessed by the information processing device, according to an instruction from the user terminal, after the authentication process; and acquiring a content based on the execution of the function, and associating the acquired content with information of the developer on which the authentication process has been performed.

(17)

A program causing a computer to execute:

acquiring developer identification information associated with an application program possessed by a user terminal, from the user terminal;

performing a process of authenticating a developer of the application program, based on the developer identification information;

controlling execution of a function possessed by the information processing device, according to an instruction from the user terminal, after the authentication process; and acquiring a content based on the execution of the function, and associating the acquired content with information of the developer on which the authentication process has been performed.

(18)

A server including:

a content acquisition unit configured to acquire a content acquired by an information processing device and associated with information of a developer associated with an application program involved in the acquisition of the content, and encrypted information obtained by encrypting the information of the developer corresponding to a developer authenticated by the information processing device, the application program being possessed by a user terminal; and a determination unit configured to determine whether or not the information of the developer associated with the content has been altered, by comparing the information of the developer associated with the application program with the information of the developer indicated by the encrypted information.

(19)

The server according to (18), including:

a notification unit configured to notify the information processing device of a result of the determination.

REFERENCE SIGNS LIST 10 information processing device
15 determination unit
20 user terminal
25 application
30 management server
70 content management server
80 developer terminal
80 terminal
90 application providing server
102 communication unit
104 key information storage unit
106 notification unit
108 identification information storage unit
110 content storage unit
130 processing unit
150 authentication process unit
152 random number generation unit
154 authentication information acquisition unit
156 determination unit
158 notification control unit
160 access control unit
170 process execution unit
172 control unit
174 content processing unit
176 encryption processing unit
190 content acquisition unit
202 communication unit
204 content storage unit
206 display unit
250 authentication process unit
252 communication process unit
254 encoding processing unit
256 access control information storage unit
258 encoding information storage unit
260 process execution unit
302 developer information acquisition unit
304 identification information generation unit
306 developer information storage unit
308 encoding information generation unit
310 key information storage unit

The invention claimed is:

1. An information processing device comprising:

a communication unit configured to receive a request to authenticate a developer of an application program installed on a user terminal, the application program having embedded therein developer identification information, access control information and encoded information of the developer, the encoded information of the developer having been previously generated using a first key information in a registration of the developer at a management server;

an authentication process unit configured to perform an authentication process of the developer of the application program;

a control unit configured to control execution of a function of the information processing device controlled by the application program, according to an instruction from the user terminal, after the authentication process is successful; and a content processing unit configured to acquire a content based on the execution of the function, and associate the acquired content with information of the developer on which the authentication process has been performed, wherein the authentication process comprises sending a second key information to the user terminal;

receiving the developer identification information, the access control information and further-encoded information of the developer from the user terminal, the further-encoded information of the developer having been generated according to the second key information;

obtaining the first key information corresponding to the registration of the developer from the management server;

generating a generated encoded information of the developer by applying the first key information to at least the developer identification information received from the user terminal; and authenticating the developer when the generated encoded information of the developer matches the encoded information of the developer obtained from the further-encoded information of the developer.

2. The information processing device according to claim 1, wherein the content processing unit associates the content with the information of the developer by causing the information of the developer on which the authentication process has been performed to accompany the acquired content.

3. The information processing device according to claim 2, wherein the content accompanied by the information of the developer is transmitted to the user terminal.

4. The information processing device according to claim 1, wherein the content is image data, and wherein the content processing unit associates the image data with the information of the developer on which the authentication process has been performed, by superimposing the information of the developer on an image displayed based on the image data.

5. The information processing device according to claim 4, wherein the image displayed based on the image data is an image acquired by the information processing device.

6. The information processing device according to claim 4, wherein the image displayed based on the image data is an image acquired by the information processing device.

7. The information processing device according to claim 1, wherein the content processing unit associates the content with the information of the developer on which the authentication process has been performed, by recording the information of the developer in management data associated with the content.

8. The information processing device according to claim 7, wherein the management data associated with the content is data for managing history involved in acquisition of the content.

9. The information processing device according to claim 1, comprising:

a notification control unit configured to identifiably notify of the developer of the application program indicated by the information of the developer on which the authentication process has been performed.

10. The information processing device according to claim 9, comprising:

an audio output unit configured to output audio information, wherein the notification control unit causes the audio output unit to output the information of the developer on which the authentication process has been performed, as audio information.

11. The information processing device according to claim 9, comprising:

a display unit, wherein the notification control unit causes the display unit to display the information of the developer on which the authentication process has been performed.

12. An information processing method for executing in an information processing device, the method comprising:

receiving a request to authenticate a developer of an application program installed on a user terminal, the application program having embedded therein developer identification information, access control information and encoded information of the developer, the encoded information of the developer having been previously generated using a first key information in a registration of the developer at a management server;

performing, by a processor, an authentication process of the developer of the application program;

controlling execution of a function of the information processing device controlled by the application program, according to an instruction from the user terminal, after the authentication process is successful; and acquiring a content based on the execution of the function, and associating the acquired content with information of the developer on which the authentication process has been performed, wherein the authentication process comprises sending a second key information to the user terminal;

receiving the developer identification information, the access control information and further-encoded information of the developer from the user terminal, the further-encoded information of the developer having been generated according to the second key information;

obtaining the first key information corresponding to the registration of the developer from the management server;

generating a generated encoded information of the developer by applying the second key information to at least the developer identification information received from the user terminal; and authenticating the developer when the generated encoded information of the developer matches the encoded information of the developer obtained from the further-encoded information of the developer.

13. A non-transitory computer readable medium storing program code for developer authentication, the program code being executable by an information processing device to perform operations comprising:

receiving a request to authenticate a developer of an application program installed on a user terminal, the application program having embedded therein developer identification information, access control information and encoded information of the developer, the encoded information of the developer having been previously generated using a first key information in a registration of the developer at a management server;

performing an authentication process of the developer of the application program;

controlling execution of a function of the information processing device controlled by the application program, according to an instruction from the user terminal, after the authentication process is successful; and acquiring a content based on the execution of the function, and associating the acquired content with information of the developer on which the authentication process has been performed, wherein the authentication process comprises
sending a second key information to the user terminal;
receiving the developer identification information, the access control information and further-encoded information of the developer from the user terminal, the further-encoded information of the developer having been generated according to the second key information;
obtaining the first key information corresponding to the registration of the developer from the management server;
generating a generated encoded information of the developer by applying the second key information to at least the developer identification information received from the user terminal; and
authenticating the developer when the generated encoded information of the developer matches the encoded information of the developer obtained from the further-encoded information of the developer.

14. An information processing device comprising:
a processor; and
a memory configured to store program code, the program code being executable by the processor to perform operations comprising:
receiving a request to authenticate a developer of an application program installed on a user terminal, the application program having embedded therein developer identification information, access control information and encoded information of the developer, the encoded information of the developer having been previously generated using a first key information in a registration of the developer at a management server;
performing an authentication process of the developer of the application program;
controlling execution of a function of the information processing device corresponding to the application program, according to an instruction from the user terminal, after the authentication process is successful; and
acquiring a content based on the execution of the function, and associating the acquired content with information of the developer on which the authentication process has been performed,
wherein the authentication process comprises
sending a second key information to the user terminal;
receiving the developer identification information, the access control information and further-encoded information of the developer from the user terminal, the further-encoded information of the developer having been generated according to the second key information;
obtaining the first key information corresponding to the registration of the developer at the management server;
generating a generated encoded information of the developer by applying the second key information to at least the developer identification information received from the user terminal; and
authenticating the developer when the generated encoded information of the developer matches the encoded information of the developer obtained from the further-encoded information of the developer.

* * * * *